United States Patent [19]

Egawa et al.

[11] Patent Number: 4,930,087
[45] Date of Patent: May 29, 1990

[54] IMAGE FORMING APPARATUS

[75] Inventors: Jiro Egawa, Yokosuka; Koji Tanimoto, Yokohama; Kunihiko Miura, Hiratsuka, all of Japan

[73] Assignee: Kabushiki Kaisha Toshiba, Kawasaki, Japan

[21] Appl. No.: 230,021

[22] Filed: Aug. 9, 1988

[30] Foreign Application Priority Data

Aug. 10, 1987 [JP] Japan ............................. 62-198335
Aug. 13, 1987 [JP] Japan ............................. 62-200995

[51] Int. Cl.⁵ ......................................... G01D 15/00
[52] U.S. Cl. ................................. 364/518; 346/154
[58] Field of Search ............... 346/160, 107 R, 108, 346/154; 358/300, 302; 364/518, 519, 520, 521

[56] References Cited

U.S. PATENT DOCUMENTS 4,779,106 10/1988 Mills ................................. 346/154

Primary Examiner—Arthur G. Evans
Attorney, Agent, or Firm—Cushman, Darby & Cushman

[57] ABSTRACT

An image forming apparatus has a printing side and a host side. Status signals are transmitted from the printing side to the host side and, according to the status signals, commands are transmitted from the host side to the printing side to execute printing operations. One exclusive line is added to status lines and used to inform the host side of changes in urgent statuses of the printing side.

According to another aspect, an image forming apparatus has a printing side and a host side that transmits various data signals to the printing side. The printing side outputs a video clock signal whose frequencey changes in proportion to a recording density of the printing side. According to the video clock signal, the host side transmits a video data signal to the printing side.

5 Claims, 52 Drawing Sheets

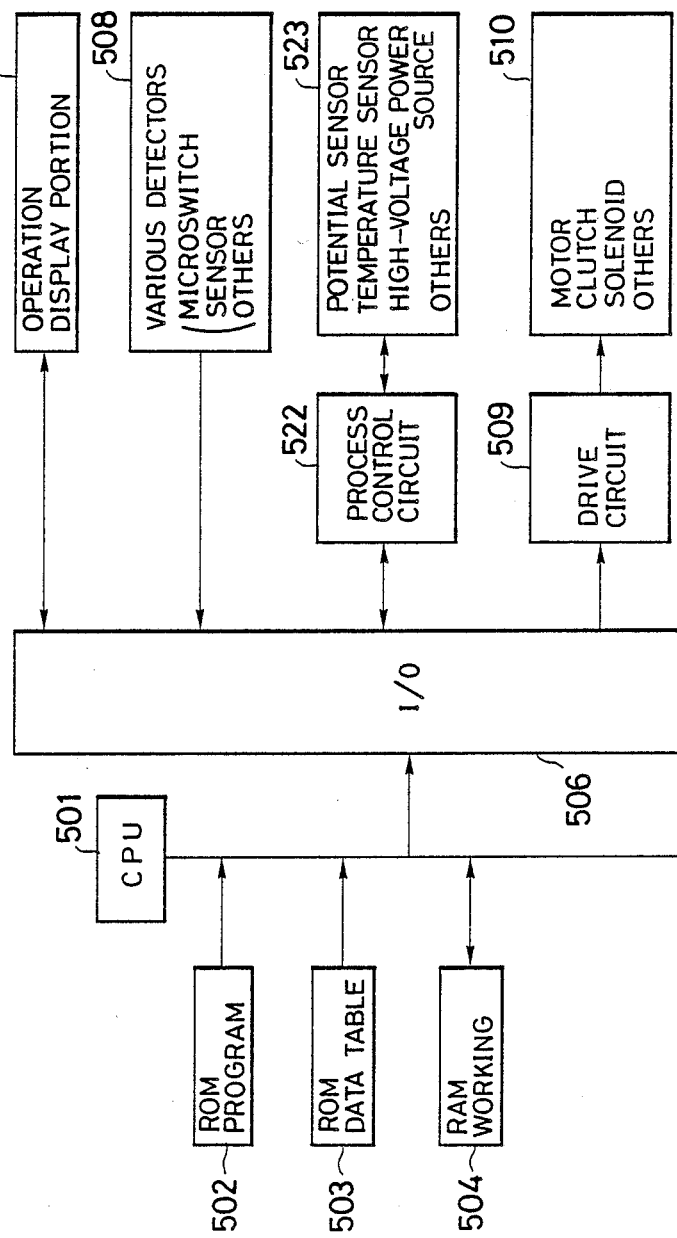

| FIG.3a | FIG.3b |
|---|---|

| ADDRESS | | CONTENTS | |
|---|---|---|---|
| 4000<br>4001 | | FIRST COLOR TOP MARGIN TABLE | |
| 4002<br>4003 | | SECOND COLOR TOP MARGIN TABLE | |
| 4004<br>4005 | | LEFT MARGIN TABLE | |
| 4006<br>4007 | A3 | BOTTOM MARGIN TABLE | |
| 4008<br>4009 | | LIGHT MARGIN TABLE | |
| ⋮ | ⋮ | | |
| 4080<br>4081 | A6 | BOTTOM MARGIN TABLE | |
| 4082<br>4083 | | LIGHT MARGIN TABLE | |
| 4090<br>⟩<br>⟨ | TOP MARGIN COARSE ADJUST-MENT TABLE | SWITCH | 1<br>2<br>⟩<br>n |
| 40B0<br>⟩<br>⟨ | TOP MARGIN FINE ADJUST-MENT TABLE | SWITCH | 1<br>2<br>⟩<br>n |
| 40D0<br>⟩<br>⟨ | LEFT MARGIN COARSE ADJUST-MENT TABLE | SWITCH | 1<br>2<br>⟩<br>n |
| 4100<br>⟩<br>⟨ | LEFT MARGIN FINE ADJUST-MENT TABLE | SWITCH | 1<br>2<br>⟩<br>n |
| 4120<br>⟩<br>⟨ | TWO BEAM SCAN TABLE | SWITCH | 1<br>2<br>⟩<br>n |

FIG. 3b

| ADDRESS | | CONTENTS |
|---|---|---|
| 6000<br>6001 | RED<br>TONER | FIRST DEVELOPMENT BIAS TABLE |
| 6002<br>6003 | | SECOND DEVELOPMENT BIAS TABLE |
| 6004<br>6005 | BLUE<br>TONER | FIRST DEVELOPMENT BIAS TABLE |
| 6006<br>6007 | | SECOND DEVELOPMENT BIAS TABLE |
| 6008<br>6009 | GREEN<br>TONER | FIRST DEVELOPMENT BIAS TABLE |
| 600A<br>600B | | SECOND DEVELOPMENT BIAS TABLE |
| 600C<br>600D | BLACK<br>TONER | FIRST DEVELOPMENT BIAS TABLE |
| 600E<br>600F | | SECOND DEVELOPMENT BIAS TABLE |
| | | |
| 6100<br>6101 | FIRST CHARGE POTENTIAL CONTROL | SURFACE POTENTIAL TABLE |
| 6102<br>6103 | | CONVERGENCE ERROR TABLE |
| 6104<br>6105 | | FIRST TIME CONTROL OUTPUT TABLE |
| 6106<br>6107 | | MINIMUM CORRECTION TABLE |
| 6108<br>6109 | | SURFACE POTENTIAL LIMIT TABLE |
| 610A<br>610B | | CONTROL OUTPUT UPPER LIMIT TABLE |
| 610C<br>610D | | CONTROL OUTPUT LOWER LIMIT TABLE |
| 610E<br>610F | SECOND CHARGE POTENTIAL TEMPERATURE CORRECTION | SURFACE POTENTIAL TABLE |
| 6110<br>6111 | | CONVERGENCE ERROR TABLE |
| 6112<br>6113 | | FIRST TIME CONTROL OUTPUT TABLE |
| 6114<br>6115 | | MINIMUM CORRECTION TABLE |
| 6116<br>6117 | | SURFACE POTENTIAL LIMIT TABLE |
| 6118<br>6119 | | CONTROL OUTPUT UPPER LIMIT TABLE |
| 611A<br>611B | | CONTROL OUTPUT LOWER LIMIT TABLE |
| | | |
| 6120<br>⋮ | CHARGE POTENTIAL TEMPERATURE CORRECTION | 40°C CORRECTION TABLE<br>⋮<br>10°C CORRECTION TABLE |

FIG.6

| COMMAND CODE | COMMAND ABBREVIATION | FUNCTION |
|---|---|---|
| 01H | SR1 | STATUS 1 REQUEST |
| 02H | SR2 | STATUS 2 REQUEST |
| 04H | SR3 | STATUS 3 REQUEST |
| 07H | SR4 | STATUS 4 REQUEST |
| 08H | SR5 | STATUS 5 REQUEST |
| 0BH | SR6 | STATUS 6 REQUEST |
| 20H | SR7 | STATUS 7 REQUEST |
| 23H | CSTU | UPPER CASSETTE |
| 25H | CSTU | LOWER CASSETTE |
| 26H | VSYNC | START IMAGE DATA TRANSFER |
| 29H | PRINT | START PRINT |
| 2AH | SP1 | FIRST COLOR PRINT MODE |
| 2CH | SP2 | SECOND COLOR PRINT MODE |
| 31H | DP1 | TWO-COLOR PRINT MODE |
| 32H | MF1 | MANUAL FEED (A3 VERTICAL) |
| 34H | MF2 | MANUAL FEED (A4 VERTICAL) |
| 37H | MF3 | MANUAL FEED (A4 HORIZONTAL) |
| 38H | MF4 | MANUAL FEED (A5 VERTICAL) |
| 3BH | MF5 | MANUAL FEED (A6 VERTICAL) |
| 3DH | MF6 | MANUAL FEED (B4 VERTICAL) |
| 3EH | MF7 | MANUAL FEED (B5 VERTICAL) |
| 40H | MF8 | MANUAL FEED (B5 HORIZONTAL) |
| 43H | MF9 | MANUAL FEED (B6 HORIZONTAL) |

FIG. 7

| | D7 | D6 | D5 | D4 | D3 | D2 | D1 | D0 |
|---|---|---|---|---|---|---|---|---|
| STATUS 1 | | PAPER TRANSFER-RING | PRINT REQUEST | VSYNC REQUEST | FIRST COLOR IMAGE TRANSFER-RING | SECOND COLOR IMAGE TRANSFER-RING | PRINT FIRST COLOR MODE SECOND COLOR MODE | FIRST COLOR MODE TWO-COLOR MODE |
| STATUS 2 | ILLEGAL COMMAND ERROR | UPPER/LOWER CASSETTE | CASSETTE SIZE (UPPER) | | | | | |
| STATUS 3 | | MANUAL FEED | TONER COLOR (FIRST COLOR) | | | TONER COLOR (SECOND COLOR) | | |
| STATUS 4 | | | TEST/MAINTE-NANCE | DATA REPEAT REQUEST | WAITING | OPERATOR CALL | SERVICEMAN CALL | |
| STATUS 5 | | | RETURNED TONER REPLACE | PAPER EMPTY | PAPER JAM | FIRST COLOR TONER EMPTY | SECOND COLOR TONER EMPTY | |
| STATUS 6 | | | | FIRST LASER FAULT | SECOND LASER FAULT | SCAN MOTOR FAULT | FIRST POTENTIAL SENSOR FAULT | SECOND POTENTIAL SENSOR FAULT |
| STATUS 7 | | | | | | NUMBER OF REPEAT | | |

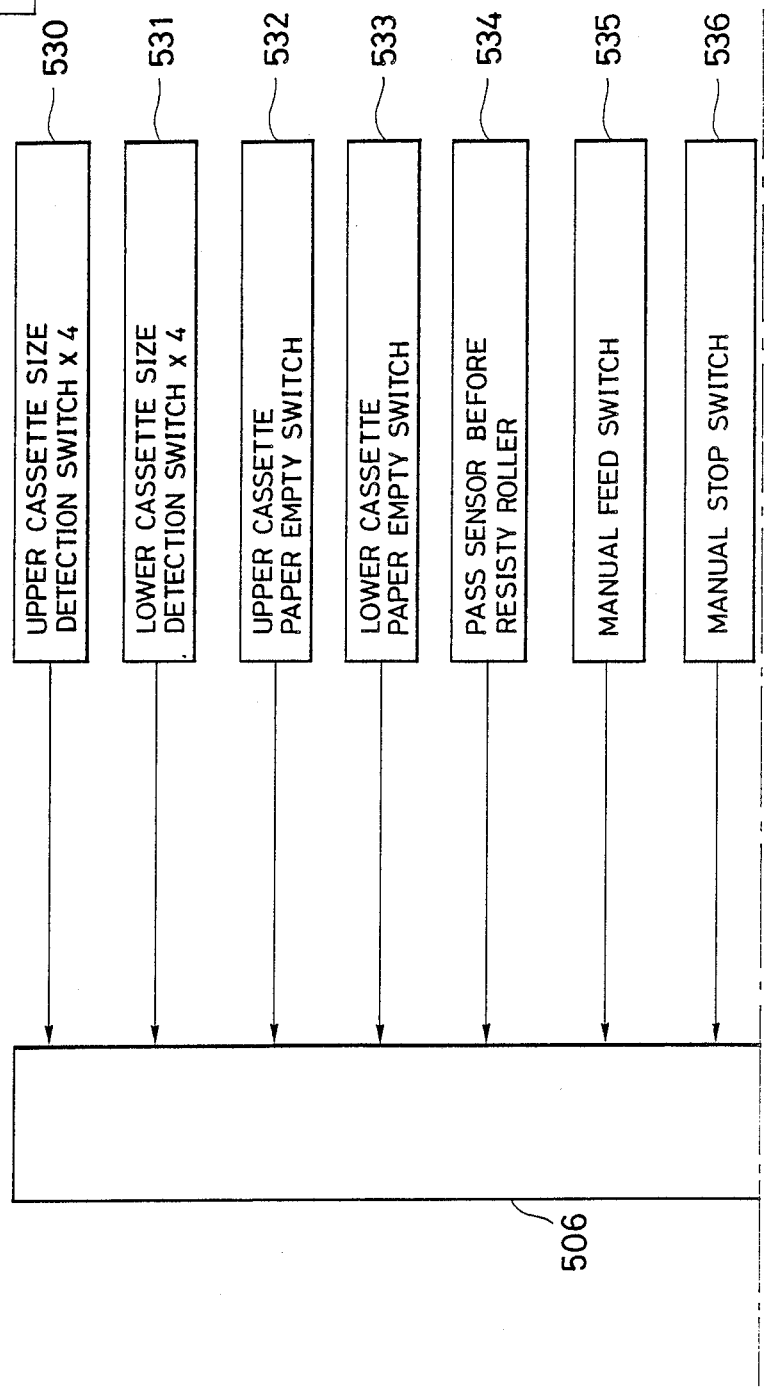

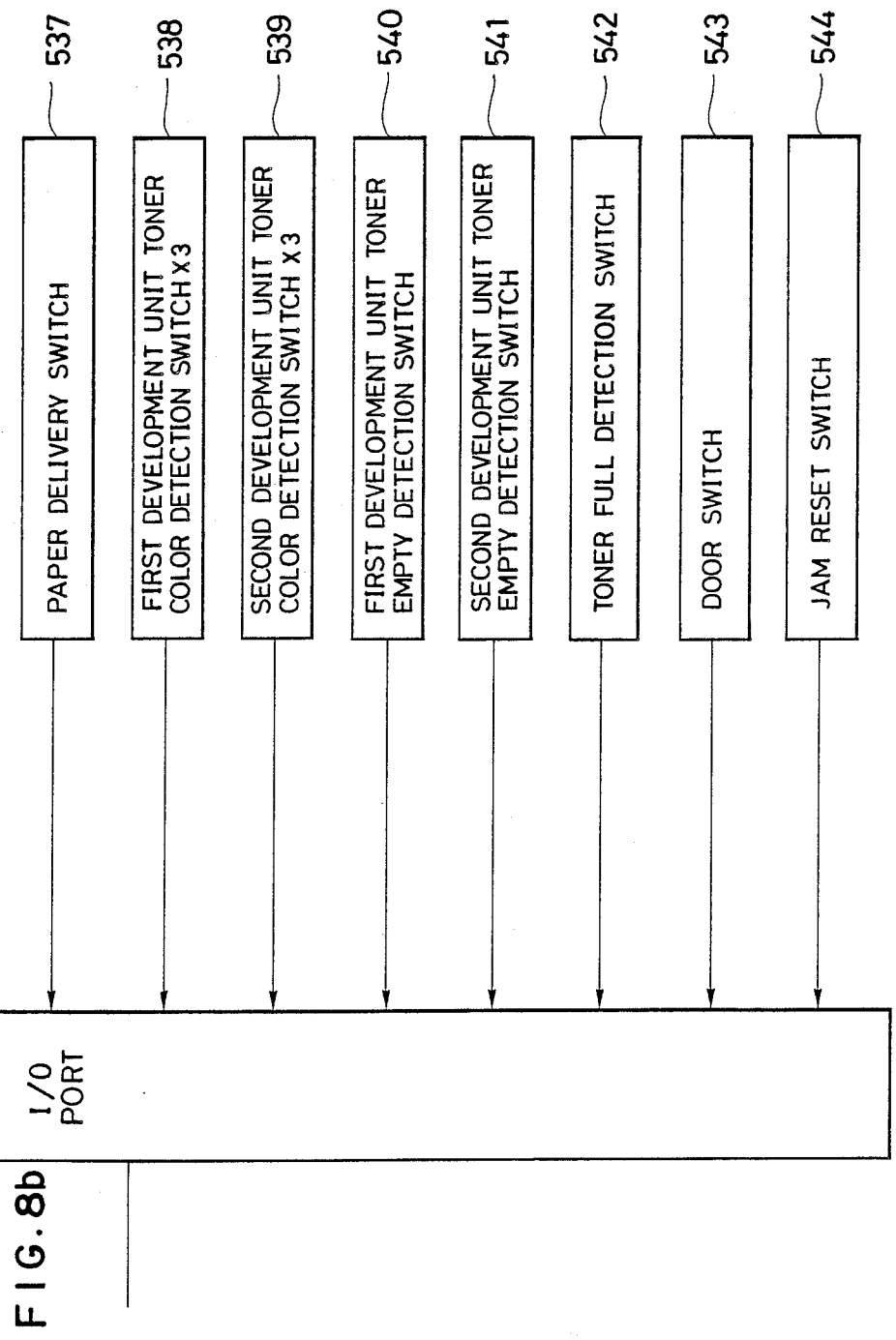

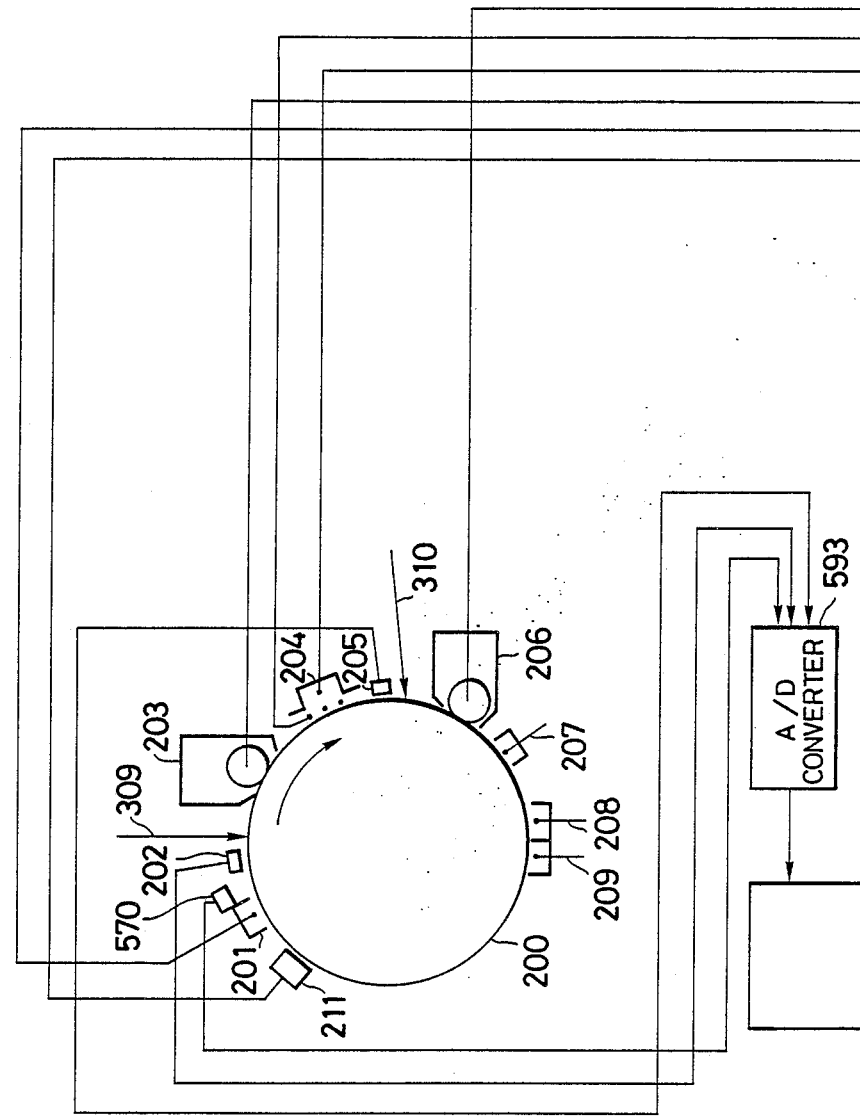

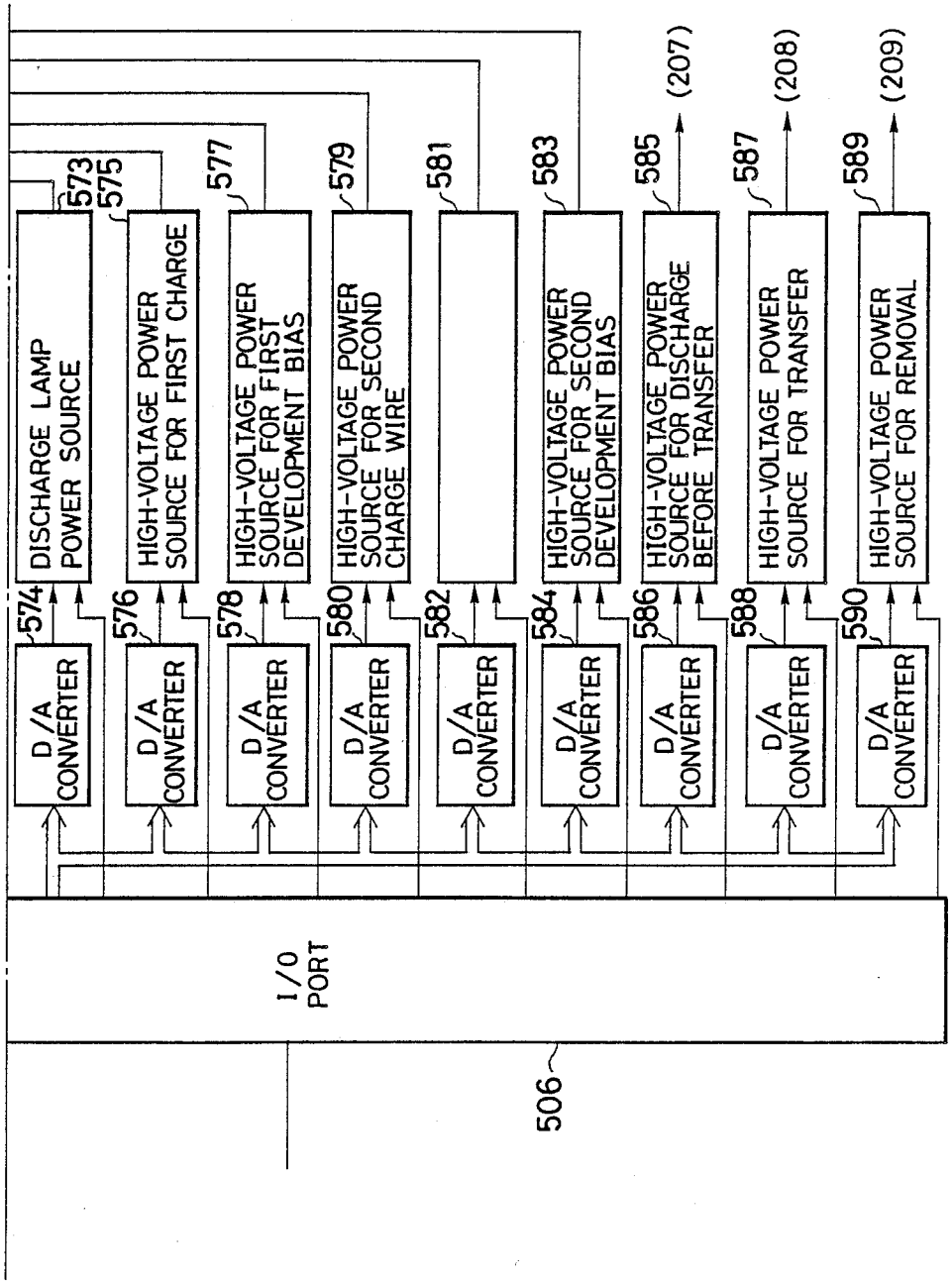

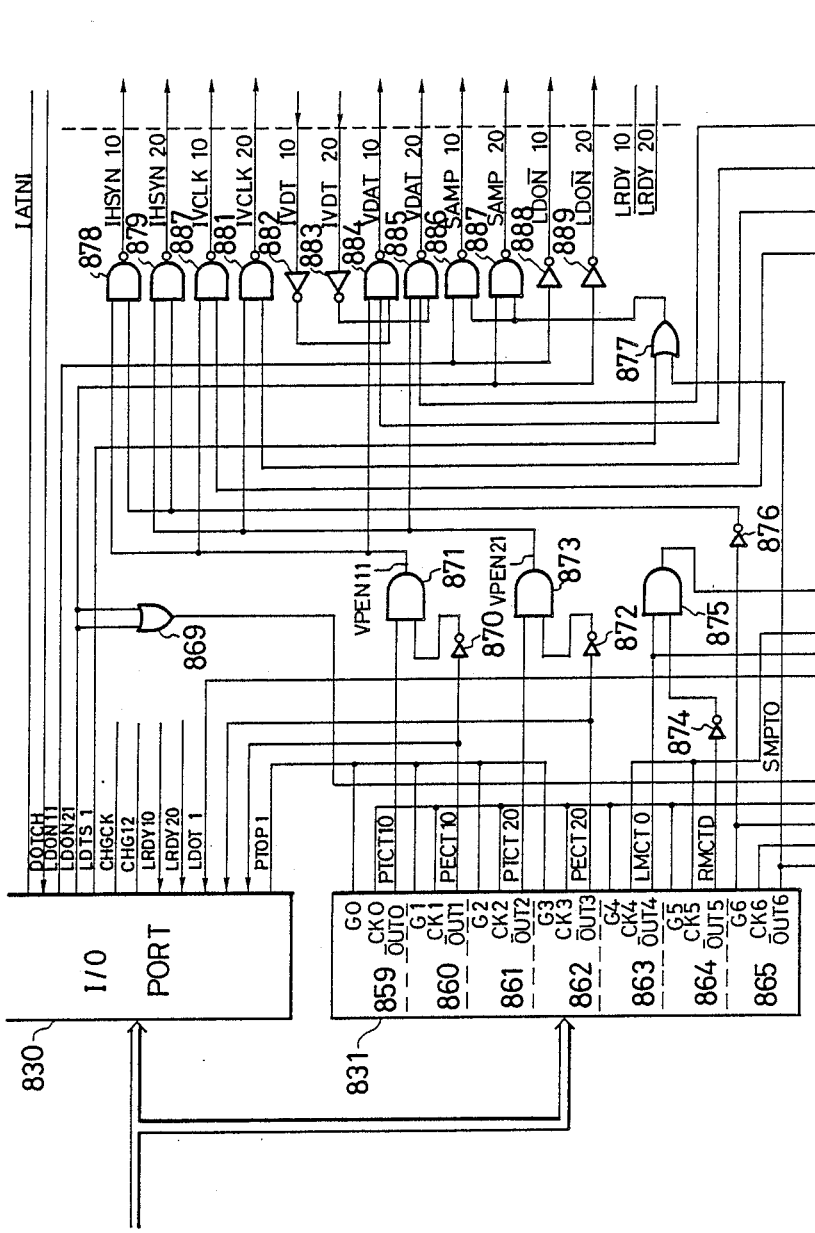

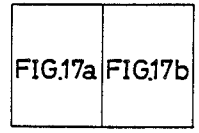
FIG. 17a
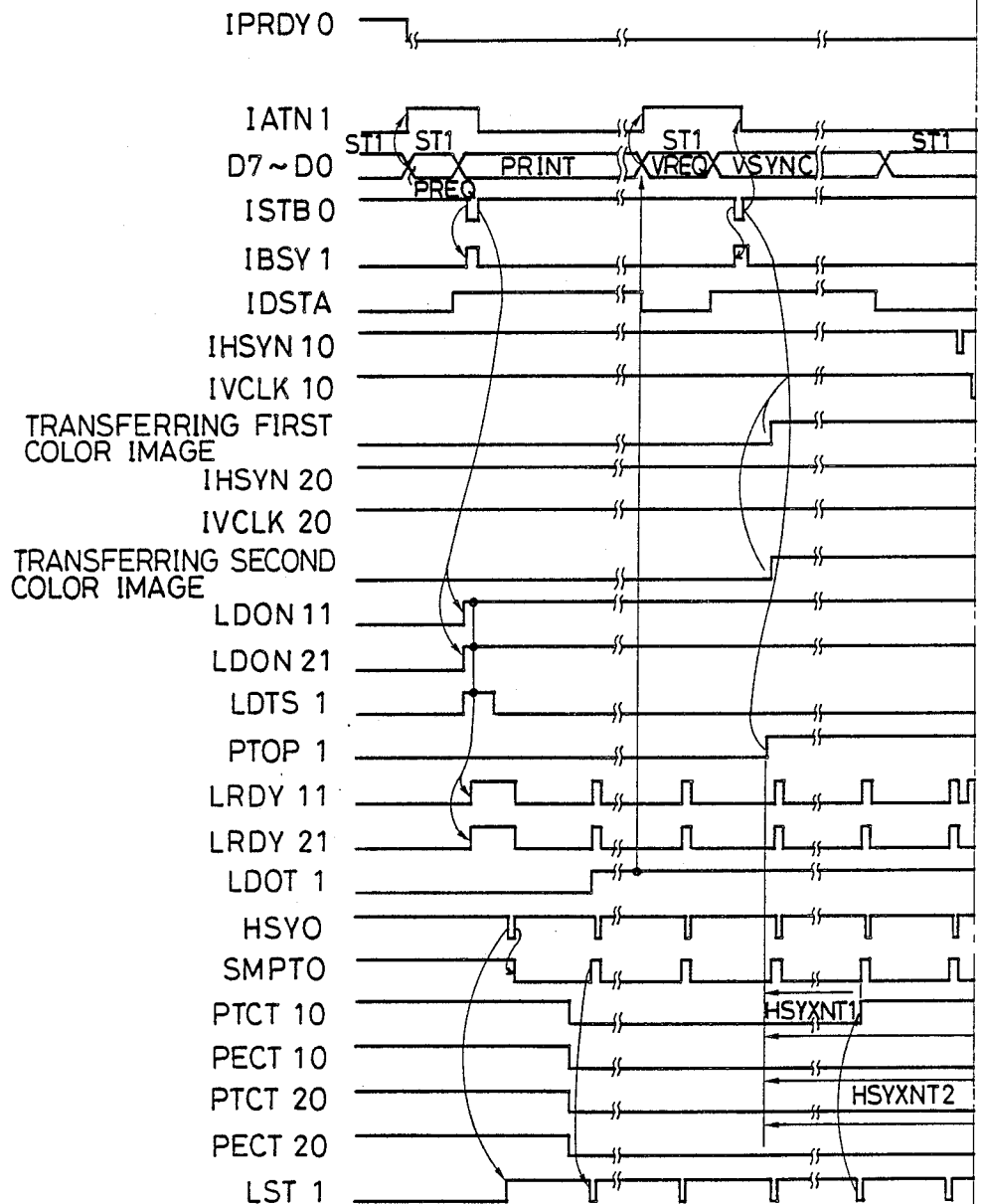

| FIG.20a | FIG.20b |

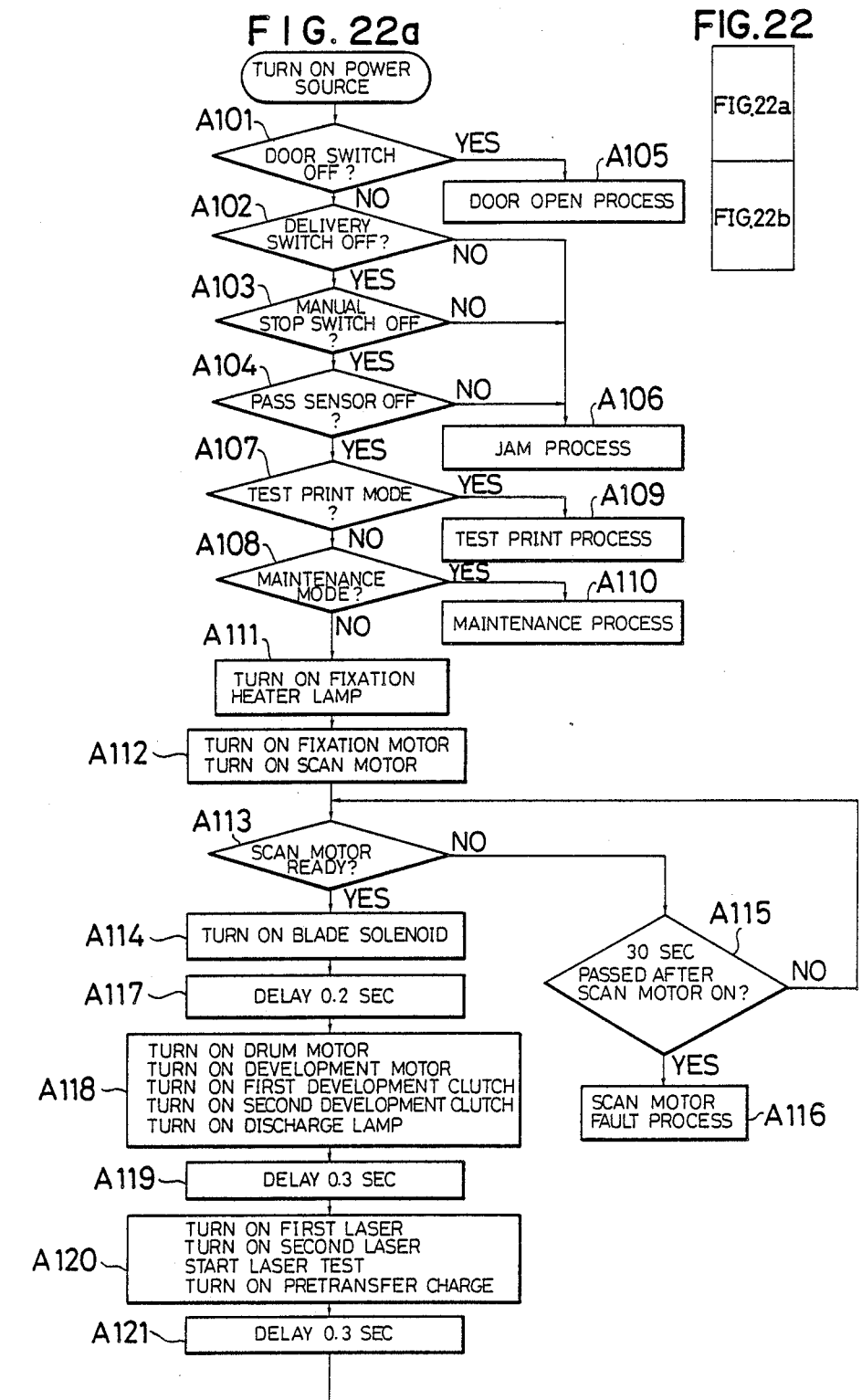

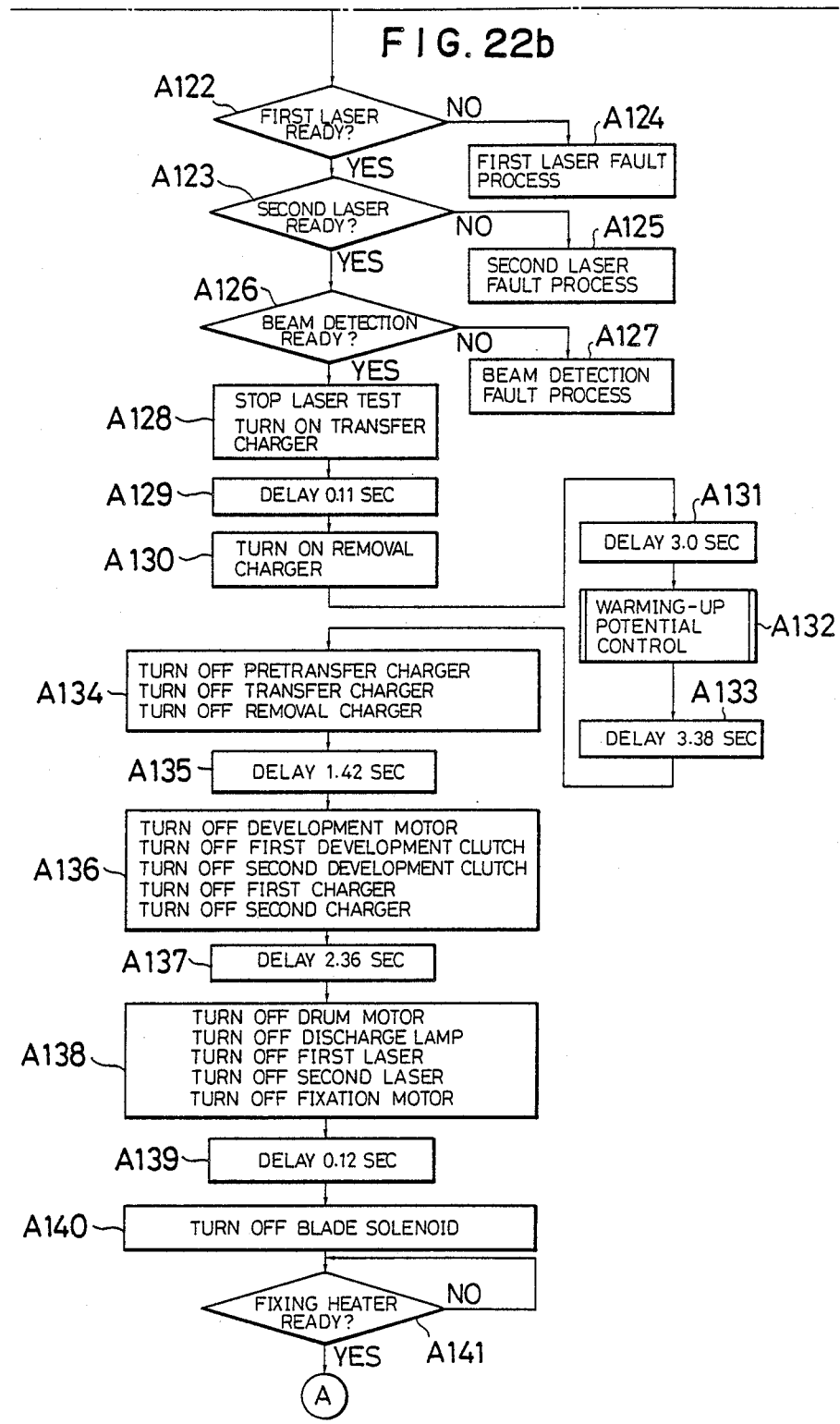

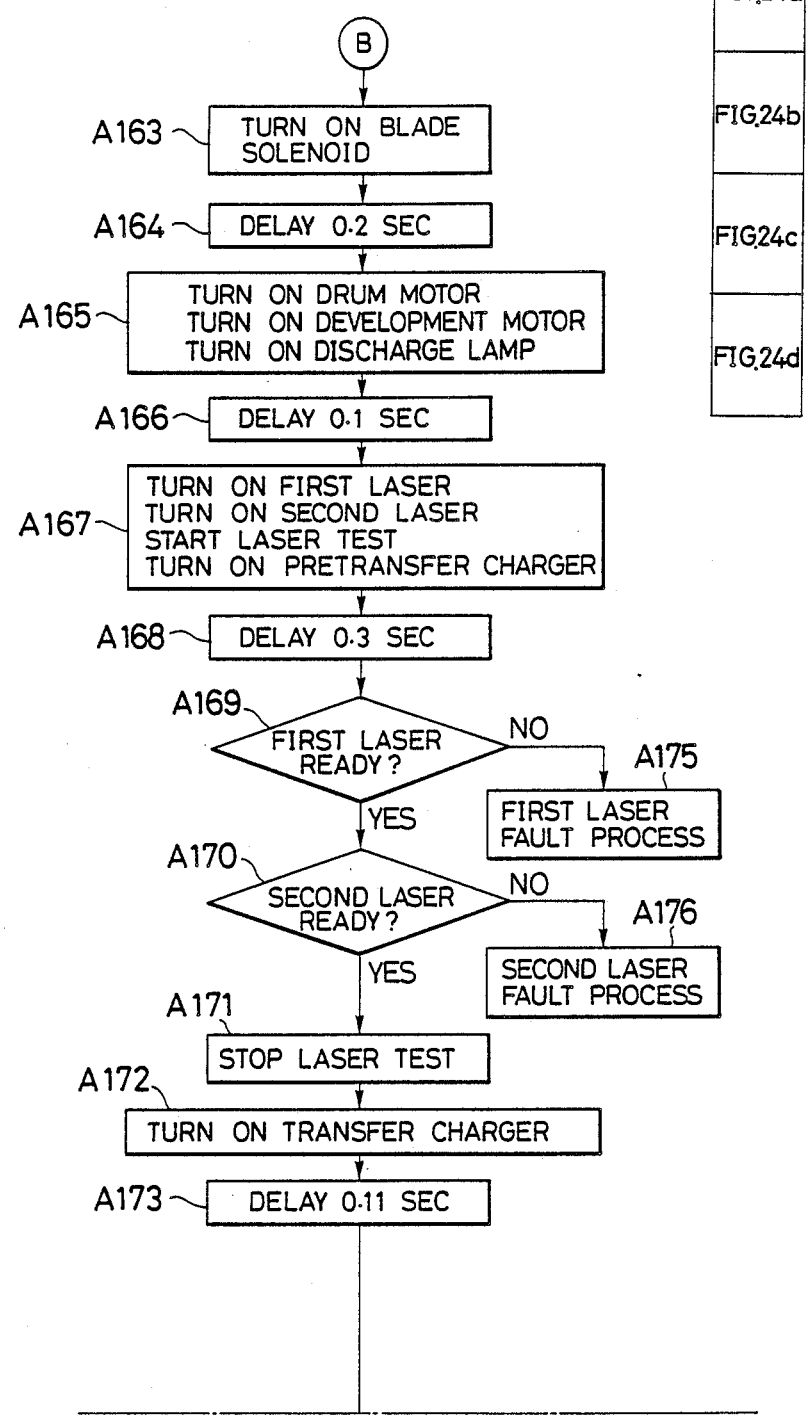

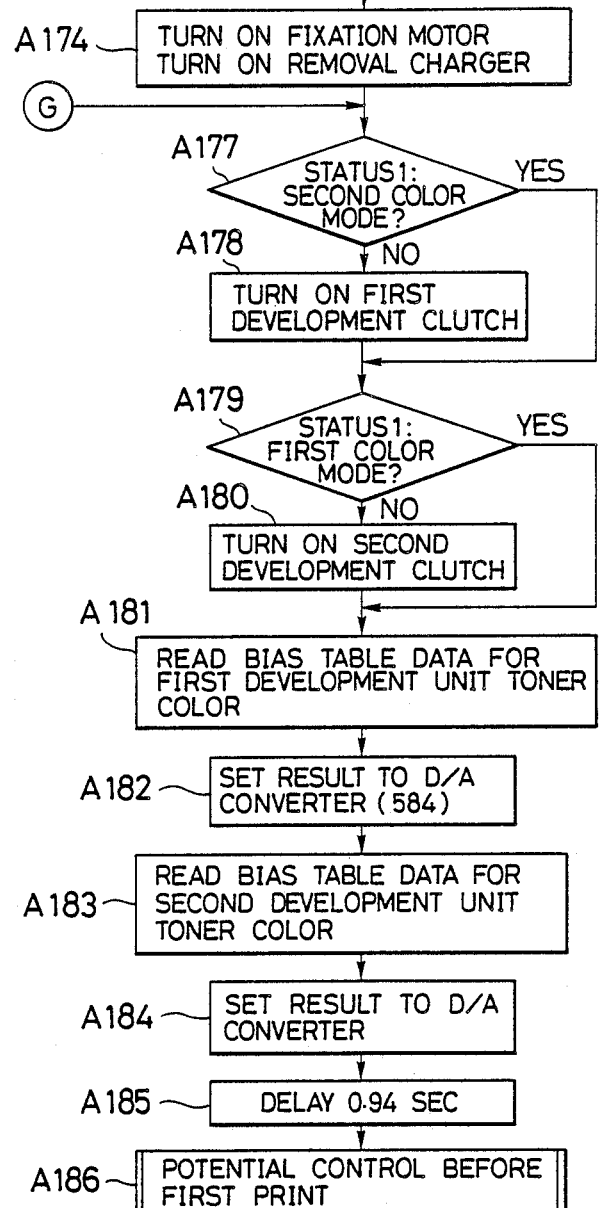

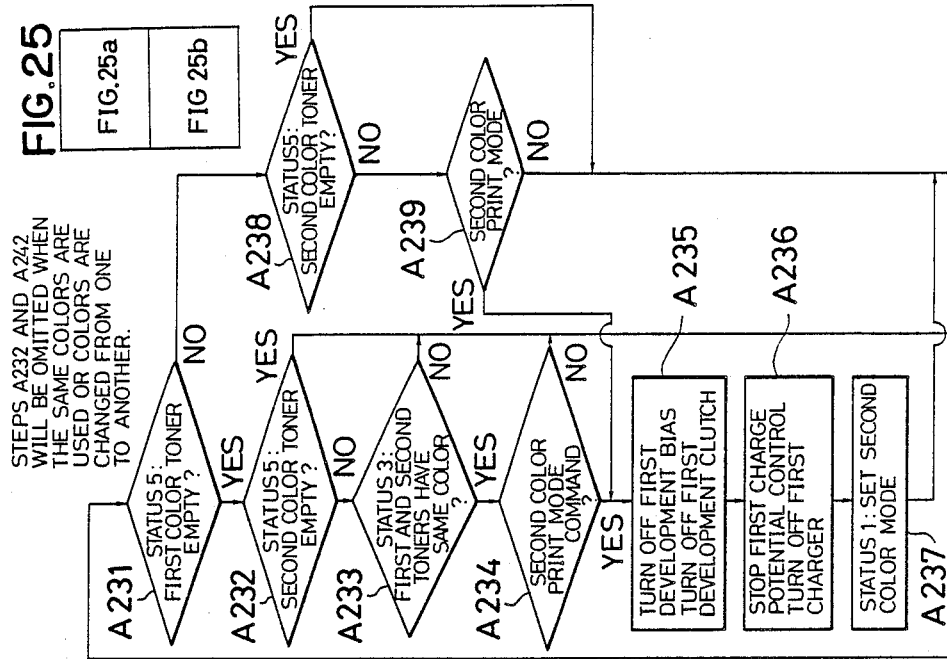
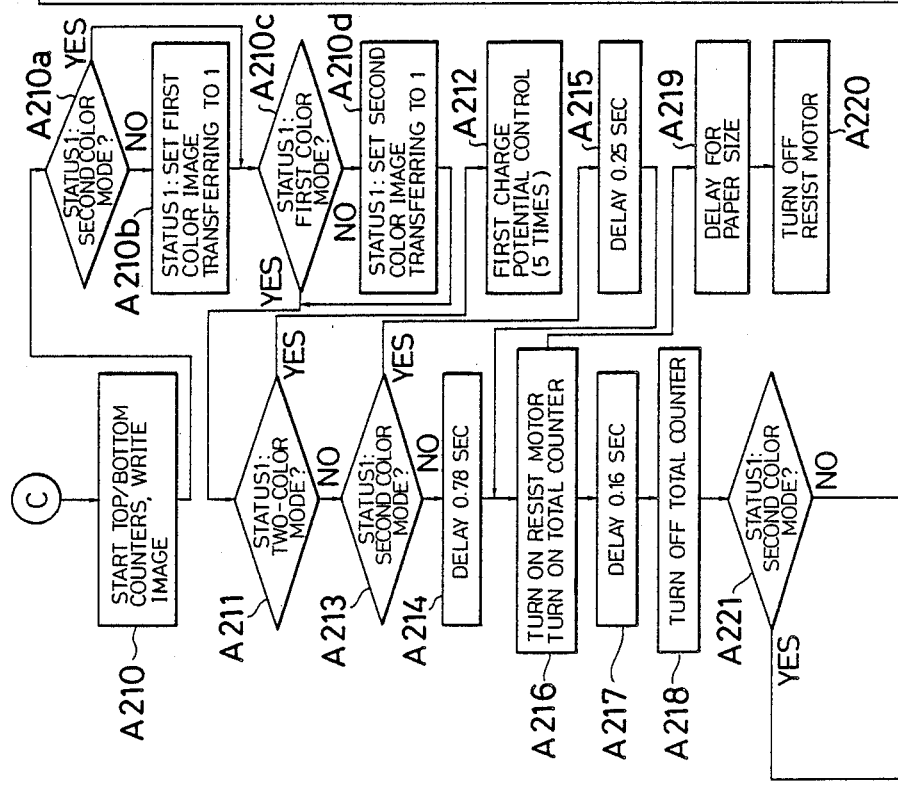
FIG. 25

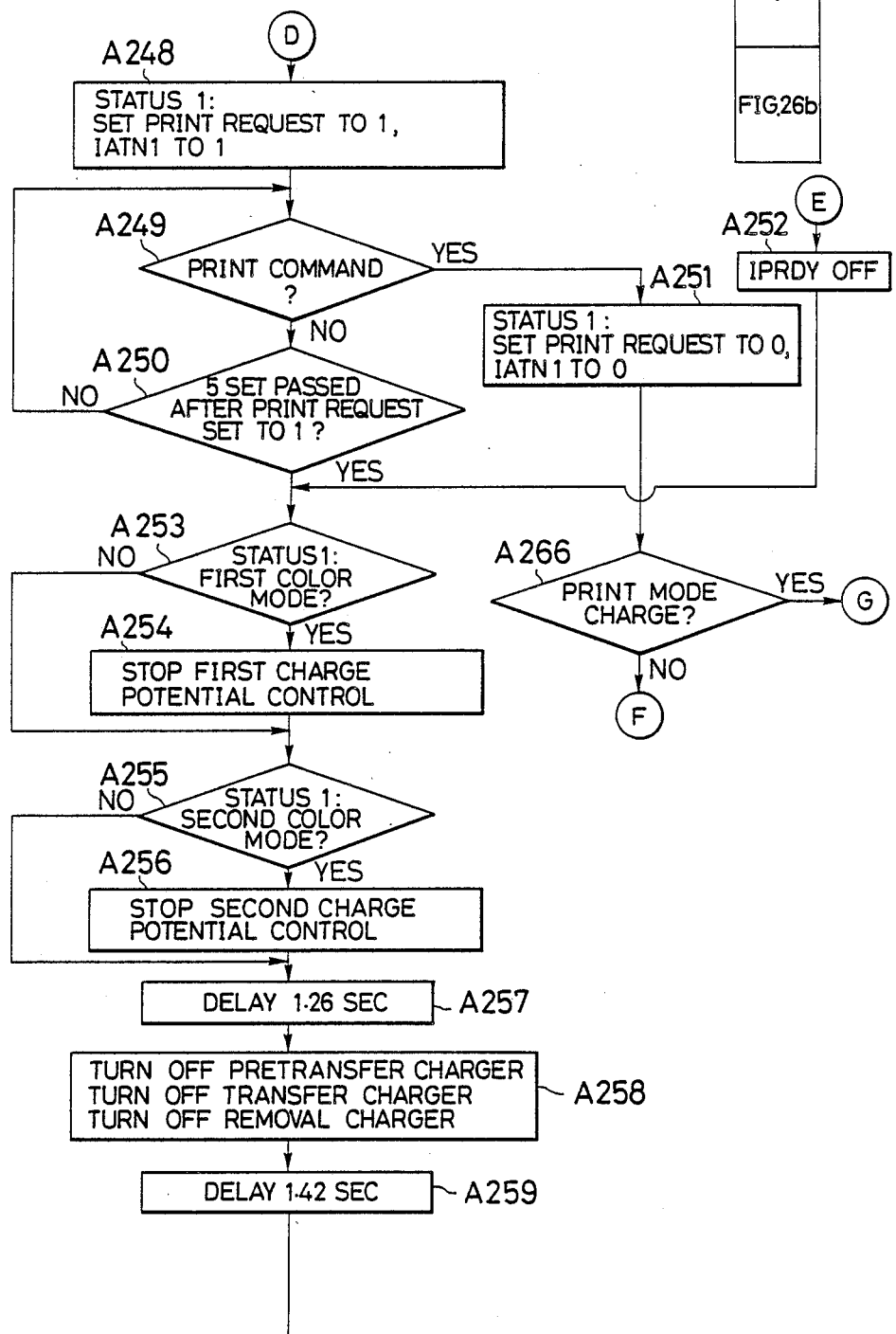

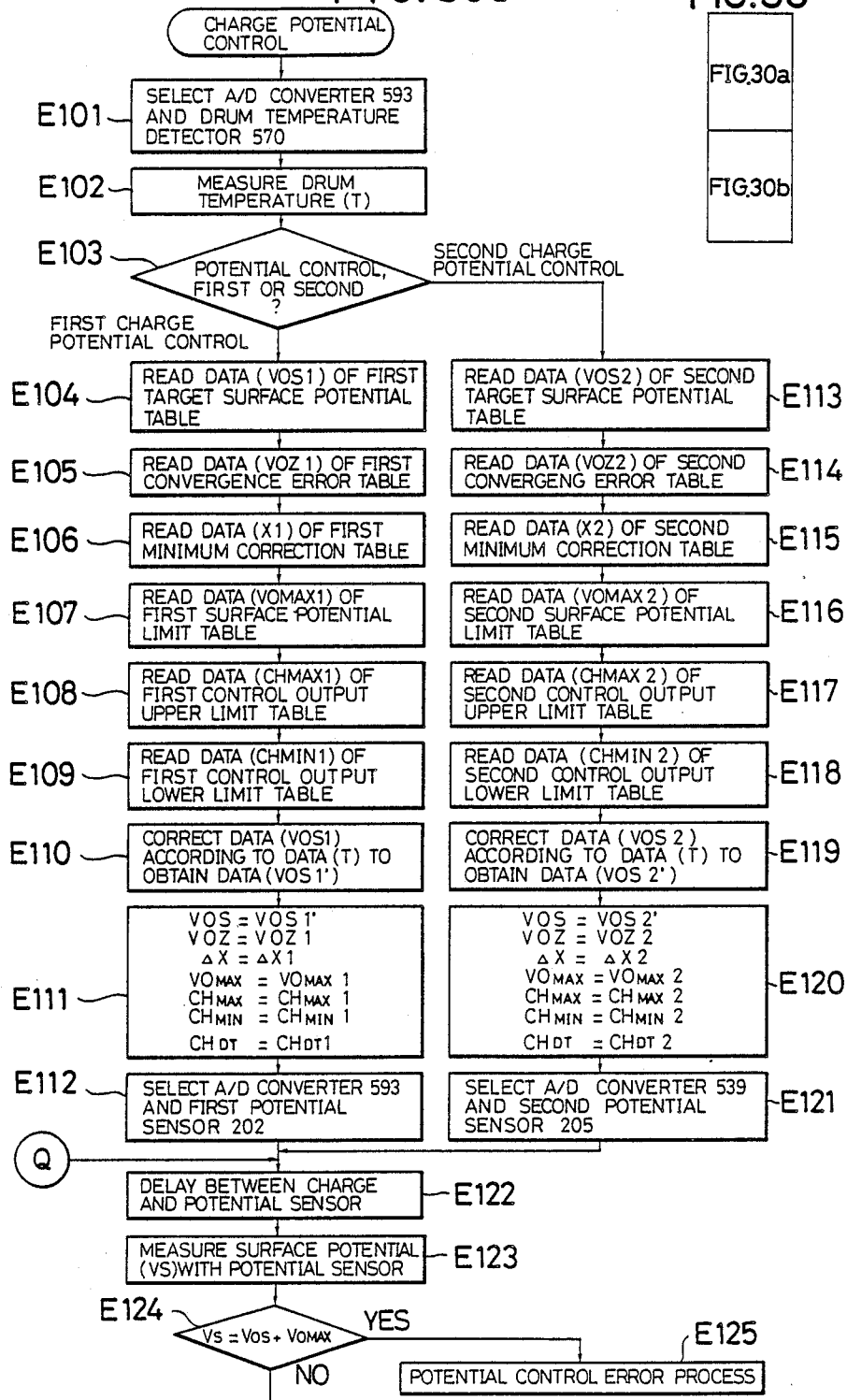

IMAGE FORMING APPARATUS

BACKGROUND OF THE INVENTION

1. Field of the Invention

The present invention relates to an image forming apparatus related to a printer such as a laser printer that scans an image with a laser beam to form an electrostatic latent image on a photoconductor drum. Particularly, the present invention relates to an image forming apparatus comprising a printing side and a host side that can easily check urgent statuses of the printing side, and to an image forming apparatus that enables a host side to easily adjust a video data signal transmission timing in response to a change in a recording density of a printing side.

2. Description of the Related Art

There is described an image forming apparatus related to the present invention which has a printing side comprises a printer, and a host side comprises a controller. The printer transmits a status signal to the controller, and, according to the status signal, the controller transmits a command to the printer to carry out a printing process. Namely, the controller checks a state of the printer according to the status signal and sends the command that controls an operation of the printer.

For example, such related image forming appartus is disclosed in Japanese Patent Publication No. 32543/1983 and Japanese Patent Publication No. 45982/1984.

To improve the operability of such an image forming apparatus, the applicant of the present invention has already disclosed a system provided with exclusive interface signal lines for transmitting signals such as a print request signal and a page end signal from the printing side to the host side.

However, due to the exclusive interface signal lines added between the printing side and the host side, a circuit constitution of the system is complicated to raise a need of simplifying the system.

To improve the operability without adding the interface signal lines, there has been proposed another system that uses a system program provided for the host side to always check urgent statuses such as a print request status, a print data request status and an image transferring status of the printing side.

However, load of the host side will be increased if the urgent statuses shall always be checked by the system program of the host side, because the exclusive program for always checking the urgent statuses shall be added to a main program of the host side, and because an overall processing time of the host side shall be extended due to the execution of the exclusive program.

According to the related apparatus, the printer 2 outputs a horizontal synchronous signal to the controller and, in response to this signal, the controller transmits a video data signal to the printer. Therefore, if a recording density of the printing side is changed, the host side shall change a transmission timing of the video data signal and a transmission time for one dot of the video data signal according to the recording density of the print side.

Namely, a time interval "t" between a point "a" at which the horizontal synchronous signal is generated and a point "b" at which the video data signal is transmitted shall be changed according to a change in the recording density of the printing side. A time interval t1 is for a small recording density, while a time interval t2 is for a large recording density, and t2 is greater than t1 (t2>t1).

As described in the above, the host side of the conventional image forming apparatus transmits the video data signal to the printing side according to only the horizontal synchronous signal outputted from the printing side. Therefore, if a recording density of the printer is changed, the host side shall execute a process for changing the transmission timing of a video data signal and a process for changing the transmission time for one dot of the video data signal according to the changed recording density. As a result, a processing time of the host side will be elongated.

SUMMARY OF THE INVENTION

An object of the present invention is to provide an image forming apparatus that enables a host side to easily check urgent statuses of a printing side.

Another object of the present invention is to provide an image forming apparatus that enables a host side to easily change the transmission timing of a video data signal in response to a change in a recording density of a printing side.

Still another object of the present invention is to provide an image forming apparatus that enables a host side to easily check changes in urgent statuses of a printing side, without adding interface signal lines and without increasing load of the host side.

Still another object of the present invention is to provide an image forming apparatus that enables a host side to be equipped with no special changing process even if a recording density of a printing side changes.

In order to accomplish the objects and advantages mentioned in the above, the present invention provides an image forming apparatus having a printing side and a host side, a status signal being transmitted from the printing side to the host side, and, according to the status signal, a command being transmitted from the host side to the printing side to execute a printing process. The apparatus is characterized by one exclusive line that is added to a status line and used to indicate changes in urgent statuses of the printing side to the host side. With this arrangement, the host side can easily check the urgent statuses of the printing side with no additional interface lines between the printing side and the host side.

According to another aspect of the present invention, there is provided an image forming apparatus having a printing side and a host side that transmits various data signals to the printing side. The printing side outputs a video clock signal whose frequency changes in proportion to a recording density of the printing side. According to the video clock signal, the host side transmits a video data signal to the printing side. With this arrangement, whenever the video clock signal having a frequency that changes in proportion to a recording density of the printing side is outputted, the host side transmits a video data signal in synchronism with the video clock signal to the printing side. As a result, even if the recording density of the printing side is changed, the host side is not required to execute a special changing process in response to the changed recording density.

These and other objects, features and advantages of the present invention will be more apparent from the following detailed description of preferred embodiments in conjunction with the accompanying drawings.

BRIEF DESCRIPTION OF THE DRAWINGS

FIGS. 2, 2a and 2b are a block diagram showing the constitution of a two-color laser beam printer (LBP) according to the embodiment;

FIGS. 3, 3a and 3b are a view showing the contents of a ROM data table;

FIG. 6 is an explanatory view showing the details of command used for the two-color LBP;

FIG. 7 is an explanatory view showing the details of statuses used for the two-color LBP;

FIGS. 8, 8a and 8b are a block diagram showing the details of various detectors;

FIGS. 10, 10a and 10b are a block diagram showing the details of driving circuits and output terminals;

FIGS. 11, 11a and 11b are a block diagram showing the details of laser modulating circuits and semiconductor lasers;

FIGS. 15, 15a and 15b are a circuit diagram showing the details of a print data write control circuit;

FIGS. 16, 16a and 16b are time charts showing transmission timings of video data signals in response to video clock signals when a recording density changes;

FIGS. 17, 17a and 17b are a timing chart showing print data write control signals under a two-color print mode;

FIGS. 18, 18a and 18b are a timing chart showing data write control signals for one line.

FIGS. 19, 19a and 19b are a timing chart showing process control signals under the two-color print mode;

FIGS. 21, 21a and 21b are a timing chart showing process control signals under a second color print mode;

FIGS. 22, 22a, 22b, 23, 23a, 23b, 24, 24a, 24b, 24c, 24d, 25, 25a, 25b, 26, 26a and 26b are flowcharts showing an overall operation of the two-color LBP;

FIGS. 27, 27a, 27b and 28 are flowcharts showing subroutines for setting a page top counter, a page end counter, a left margin counter, a right margin counter and a two-beam scan length correction value;

FIGS. 30, 30a, 30b and 31 are flowcharts showing subroutines of a charge potential control.

DETAILED DESCRIPTION OF THE PREFERRED EMBODIMENTS

Figure 1:
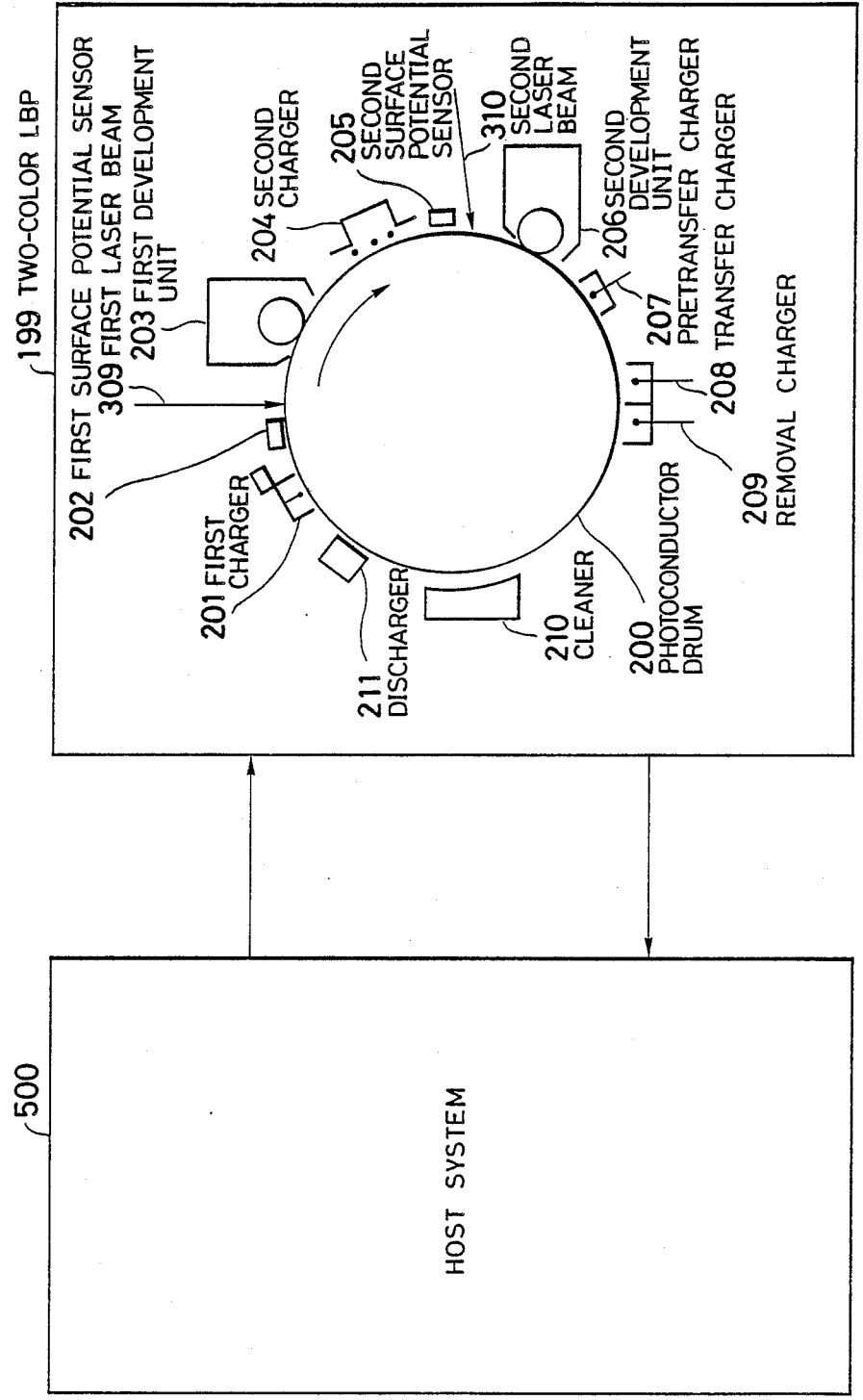
FIG. 1 a schematic view showing an image forming apparatus according to an embodiment of the present invention.

FIG. 1 is a schematic view showing an image forming apparatus according to an embodiment of the present invention.

In the image forming apparatus of the embodiment, a two-color laser beam printer (LBP) 199 is connected to a host system 500 such as a computer and a word processor through a transmission controller (not shown) such as an interface circuit. The two-color LBP 199 receives two kinds of dot image data from the host system 500 and modulates two laser beams to write an image on a photoconductor drum 200 (an image carrier). The two-color LBP 199 separately develops the two kinds of dot image data written on the photoconductor drum 200 and transfers the data onto a recording paper.

Around the photoconductor drum 200 of the two-color LBP 199, there are disposed a first charger 201, a first surface potential sensor 202, a first development unit 203, a second charger 204, a second surface potential sensor 205, a second development unit 206, a pre-transfer charger 207, a transfer charger 208, a removal charger 209, a cleaner 210 and a discharger 211. Between the first surface potential sensor 202 and the first development unit 203, a first laser beam 309 is irradiated to the photoconductor drum 200 to carry out a first exposure. Between the second surface potential sensor 205 and the second development unit 206, a second laser beam 310 is irradiated to the photoconductor drum 200 to carry out a second exposure.

Figure 2B:
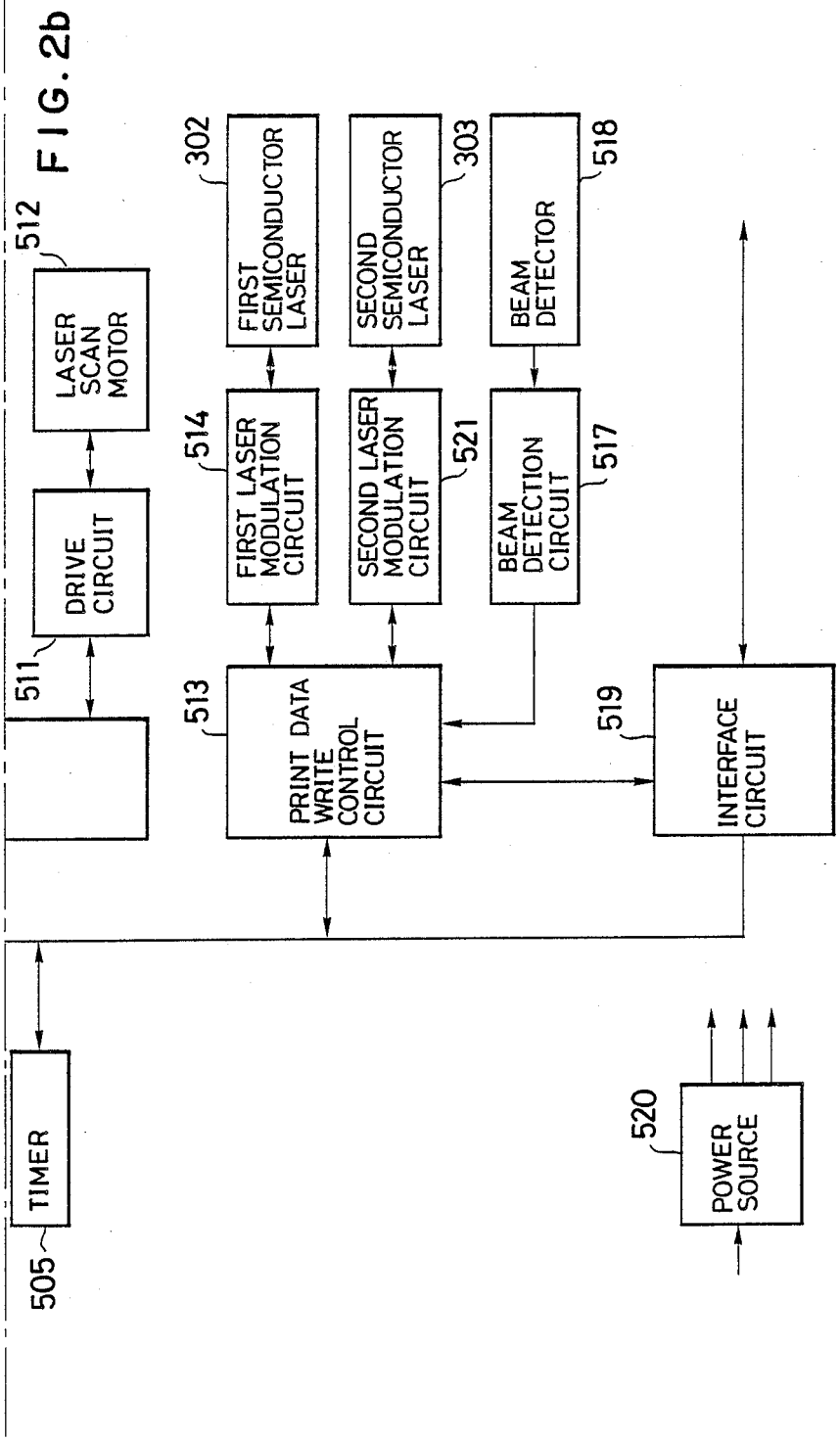

FIG. 2 is a block diagram showing a control portion of the two-color LBP 199.

The control portion of the two-color LBP 199 basically comprises a CPU 501 as a control center, a ROM 502 for storing a system program, a ROM 503 for storing a data table, a RAM 504 used as a working memory, a timer 505, an input/output unit 506 for inputting and outputting data, a print data write control circuit 513 and an interface circuit 519.

FIG. 3 is a view showing the data table stored in the ROM 503. In the table, addresses 4000 and 4001 contain first color top margin control data, addresses 4002 and 4003 second top margin control data, and addresses 4004 and 4005 left margin control data.

Addresses 4006 and 4007 contain bottom margin control data for a paper of the size of A3, and addresses 4008 and 4009 right margin control data for the same size of paper. Similarly, data corresponding to various sizes of paper are contained up to an address 4083.

Top margin coarse adjustment data are stored from an address 4090, top margin fine adjustment data from an address 40B0, left margin coarse adjustment data from an address 40D0, left margin fine adjustment data from an address 4100, and two-beam scan length correction data from an address 4120. Each group of these data corresponds to switches 1 to n.

These margin control data, coarse adjustment data and fine adjustment data are used as set data of margin control counters and binary counters of a print data write control circuit 513 to be described later.

Addresses 6000 and 6001 store first development bias data for red toner, and addresses 6002 and 6003 second development bias data for the red toner. Similarly, first and second development bias data for blue toner, green toner and black toner are stored up to an address 600F. These data are used as set data for controlling development biases of a process control circuit 522 to be described later.

Addresses 6100 and 6101 store data of a target surface potential table for a first charge potential control to provide reference values at 25° C.

Addresses 6102 and 6103 store data of a convergence error table to indicate allowable control ranges with respect to the target surface potentials.

Addresses 6104 and 6105 store data of a first time control output table to provide set values of the first charger to be outputted at first at the time of a warming-up process.

Addresses 6106 and 6107 store data of a minimum correction table.

Addresses 6108 and 6109 store data of a surface potential limit table, address 610A and 610B data of a control output upper limit table, and addresses 610C and 610D data of a control output lower limit table. The data of the surface potential limit table, control output upper limit table and control output lower limit table are used for self-diagnosing the control system.

Similarly, data of a second charge potential control table are stored up to an address 611B. From an address 6120, there are data of charge potential temperature correction tables for 10° C. to 40° C. that are used as temperature correction data with respect to the data of the target surface potential table at 25° C.

The timer 505 is a general purpose timer to generate basic timing signals for controlling paper transportation and processes related to the photoconductor drum.

The input/output unit 506 outputs display data to an operation display portion 507, receives various switch data from the operation display portion 507, receives data from various detectors 508 in a control portion, outputs data to driving circuit 509 for driving various drive elements 510 such as motors, clutches and solenoids, outputs data to a driving circuit 511 for driving a laser scan motor 512 that scans with two laser beams, and outputs and receives data to and from a process control circuit 522 for controlling high-voltage power sources 523 in response to detection signals of potential sensors, temperature sensors, etc.

The print data write control circuit 513 controls a first laser modulation circuit 514 that modulates a beam of the first semiconductor laser 302 for writing first color image data and a second laser modulation circuit 521 that modulates a beam of the second semiconductor laser 303 for writing second color image data, thereby writing video image print data from the host system 500 onto predetermined positions of the photoconductor drum. At this time, a beam detector 518 using a high-speed responsive PIN diode detects one of two beams driven by laser scan motors, while a beam detection circuit 517 digitizes an analog signal from the beam detector 518 by a high-speed comparator to generate a horizontal synchronous pulse which is transmitted to the print data write control circuit 513.

The interface circuit 519 outputs status data to the host system 500 and receives command data and print data from the host system 500.

A power source unit 520 supplies power to the respective control portions.

The details of the essential blocks shown in FIG. 2 will be described.

Figure 4:
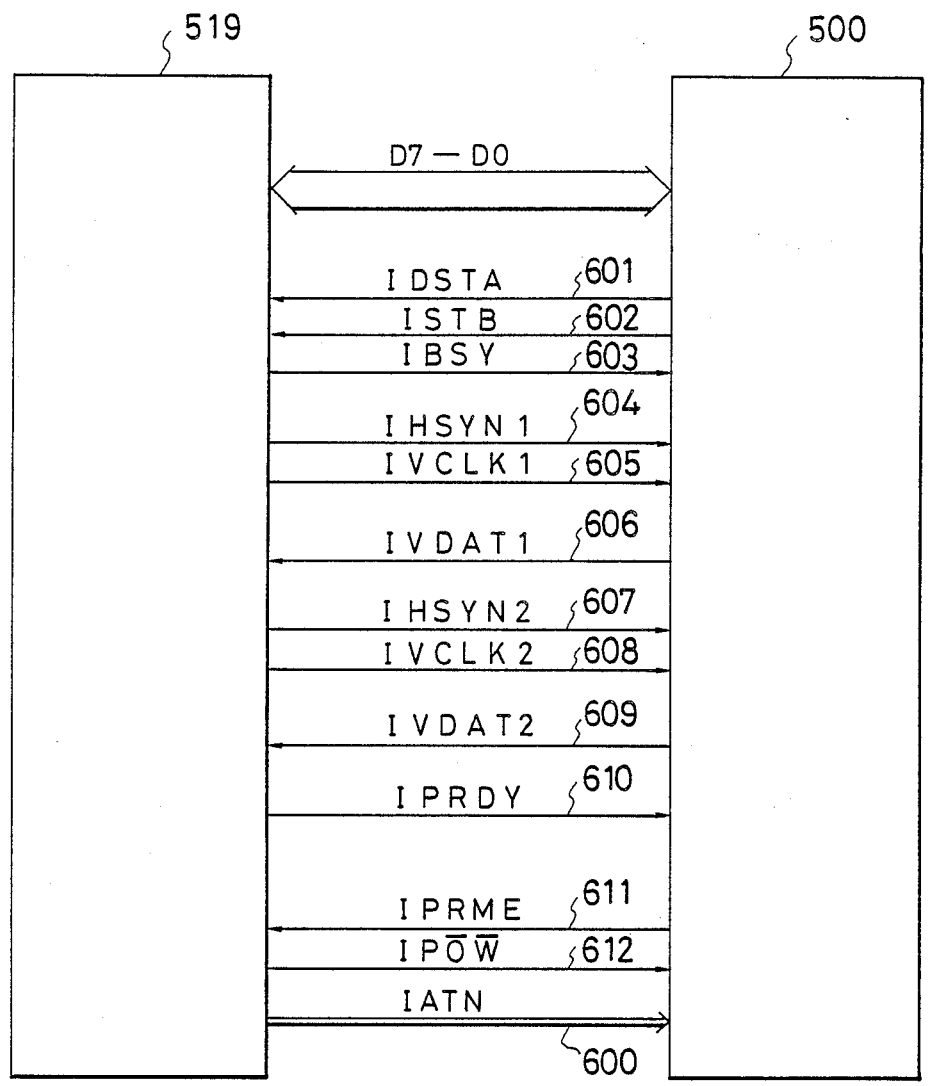
FIG. 4 is a view showing an interface circuit and the details of interface signals communicated with respect to a host system.

FIG. 4 is a view showing the details of interface signals between the interface circuit 519 and the host system 500. In the figure, a reference mark D7-D0 represents an 8-bit two-way data bus, and IDSTA a selection signal of the data bus to determine whether the data bus is used as a status data bus to the host system 500 or as a command data bus from the host system 500. A reference mark ISTB indicates a strobe signal for latching command data in the interface circuit, and IBSY a signal for enabling the strobe signal ISTB to be transmitted as well as enabling the status data to be read.

A reference mark IHSYN1 is a first color horizontal synchronous signal for requesting transmission of print data for one line. A reference mark IVCLK1 is a first color video clock signal for requesting transmission of print data for one dot.

According to the signals IHSYN1 and IVCLK1, the host system 500 transmits a video data signal IVDAT1 related to first color dot image data.

Figure 5:
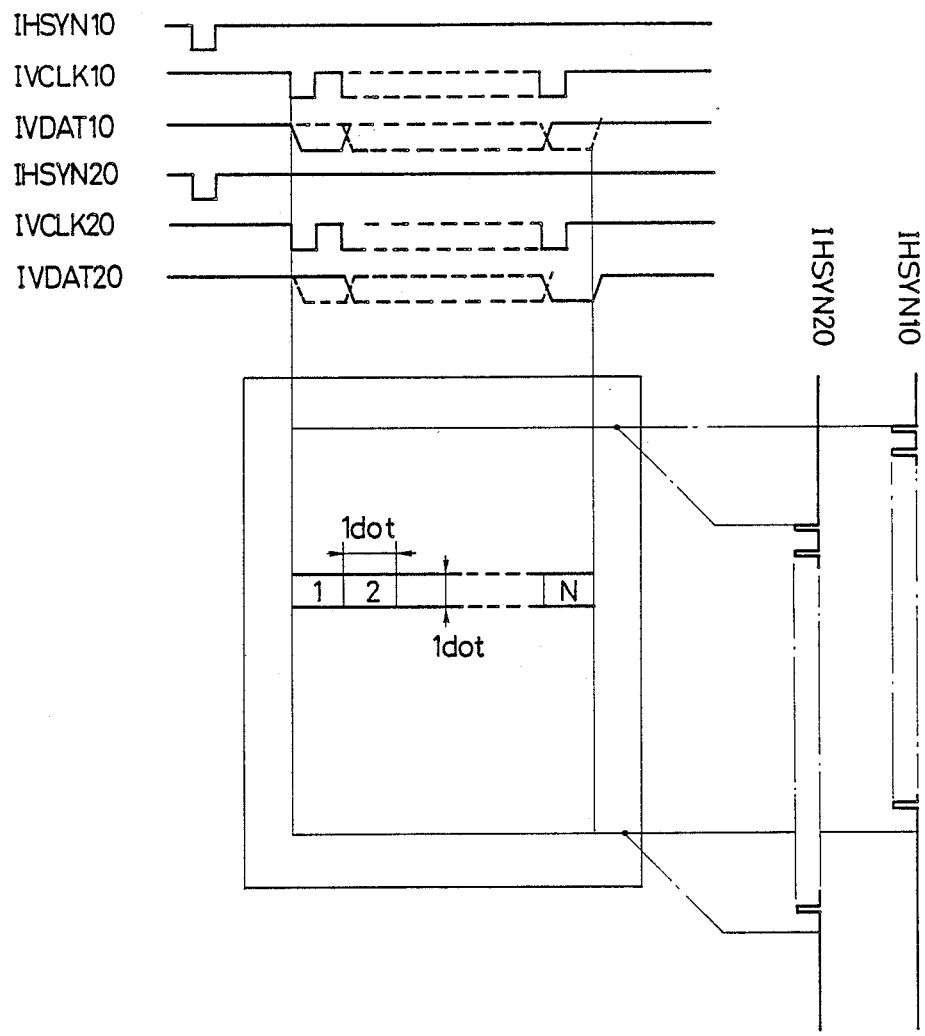
FIG. 5 is an explanatory view showing relations between the interface signals and data write positions.

Similarly, a reference mark IHSYN2 is a second color horizontal synchronous signal, and IVCLK2 a second color video clock signal. According to the signals IHSYN2 and IVCLK2, the host system 500 transmits a video data signal IVDAT2 related to a second color dot image data. The video data signals IVDAT1 and IVDAT2 are sent to the print data write control circuit 513, as shown in FIG. 5.

A reference mark IPRDY in FIG. 4 is a signal for indicating that the two-color LBP 199 is ready, IPRME a prime signal for initializing the two-color LBP 199, and IPOW a signal indicating that the two-color LBP 199 is being energized.

The signals mentioned in the above are transmitted through the data bus and the data lines 601 to 612.

A reference mark IATN is an attention signal that changes when urgent statuses such as a PRINT request status, a VSYNC request status, a first image transferring status and a second color image transferring status are changed. The signal IATN is sent from the interface circuit 519 to the host system 500 through a single exclusive line 600. The host system 500 always monitors the signal IATN and, when the attention signal IATN changes, checks to see which status has changed.

With this arrangement, additional interface lines are not needed between the printer and the host system in checking the urgent statuses by the host system.

FIG. 6 and 7 are views showing the details of commands and statuses used in the two-color LBP 199.

In FIG. 6, reference marks SR1 to SR7 are status request commands corresponding to statuses 1 to 7 shown in FIG. 5, respectively. A reference mark CSTU is an upper cassette specifying command, CSTL a lower cassette specifying command, VSYNC a command for starting transfer of print data from the host system 500, PRINT a command for instructing the start of printing, and SP1, SP2 and DP1 commands for specifying print modes. The command SP1 specifies a first color print mode, the command SP2 a second color print mode, and the command DP1 a two-color print mode. Reference marks MF1 to MF9 are commands for specifying manual modes.

In FIG. 7, "paper transporting" indicates that a fed paper is being transported in the two-color LBP 199; "PRINT request" enabling transmission of a print command from the host system 500; "VSYNC request" indicating that the two-color LBP 199 receives a print starting instruction and is ready to receive print data; "first color image transferring" indicating that first color image data are being transferred; "second color image transferring" indicating that second color image data are being transferred; "manual feed" indicating that a paper feed mode is manual; "upper/lower cassette" indicating a selected cassette under a cassette feed mode; "first color print mode", "second color print mode" and "two-color print mode" respectively indicating a selected print mode; "cassette size (upper)" and "cassette size (lower)" indicating size codes of the corresponding cassettes, respectively; "toner color (first color)" and "toner color (second color)" indicating toner color codes of the corresponding development units, respectively; "test/maintenance" indicating a test or a maintenance state; "data repeat request" indicating that print shall be repeated due to a jam, etc.; "waiting" indicating that a fixation unit of the two-color LBP is in a warming-up state; "operator call" indicating that operator call factors have occurred; "service-man call" indicating that service-man call factors related to the status 6 have occurred; "toner back replacement" indicating that toner is full in a toner back; "paper empty" indicating that no paper exists in a specified cassette; "paper jam" indicating that paper are jamming in the printer; "first color toner empty" indicating that no toner exists in the first development unit; "second color toner empty" indicating that no toner exists in the second development unit; "first laser fault" indicating that the first laser diode is not generating a specified output or that the beam detector cannot detect a beam; "second laser fault" indicating that the second laser diode is not generating a specified output; "scan motor fault" indicating that the scan motor does not rotate at a specified speed after the elapse of predetermined time from a starting time or that the scan motor goes out of the specified rotational speed after reaching the specified speed due to a certain reason; "first potential sensor fault" and "second potential sensor fault" each indicating that the sensor cannot detect a surface potential of the photoconductor; and "number of sheets to be repeated" indicating the number of sheets of paper that shall be repeated at the time of the data repeat request.

FIG. 8 is a block diagram showing the details of the various detectors 508 shown in FIG. 2. In FIG. 8, signals from the various detectors are inputted into the I/O port 506. An upper cassette size detection switch 530 comprises four switches to indicate paper sizes with combinations of the switches. A lower cassette size detection switch 531 has the same constitution as that of the upper cassette size switch 530. An upper cassette paper empty switch 532 is turned ON when papers in the upper cassette are emptied. A numeral 533 represents a lower cassette paper empty switch. A pass sensor 534 before a resist roller detects whether or not a paper has been fed from the paper feed cassette. A manual feed switch 535 detects a paper fed from a manual feed guide. A numeral 537 represents a delivery switch disposed at a fixation roller portion. A first development unit toner color detection switch 538 comprises three switches that are combined to indicate toner colors. A second development unit toner color detection switch 539 has the same constitution as that of the first switch 538. A first development unit toner empty detection switch 540 detects whether or not toner exists in the first development unit. A second development unit toner empty switch 541 detects whether or not toner exists in the second development unit. A toner full detection switch 542 operates when the toner back is full of toner. A door switch 543 is turned ON and OFF when a front cover is opened or closed. A jam reset switch 544 is disposed in the front cover. When an operator call due to paper jam or toner full is caused, the jam reset switch 544 is turned ON by an operator after the operator clears the jam or replaces the toner back. Therefore, after clearing the jam or replacing the toner back, the operator shall turn ON the switch 544, otherwise an operation display of the jam or the toner full may not be erased.

Figure 9:
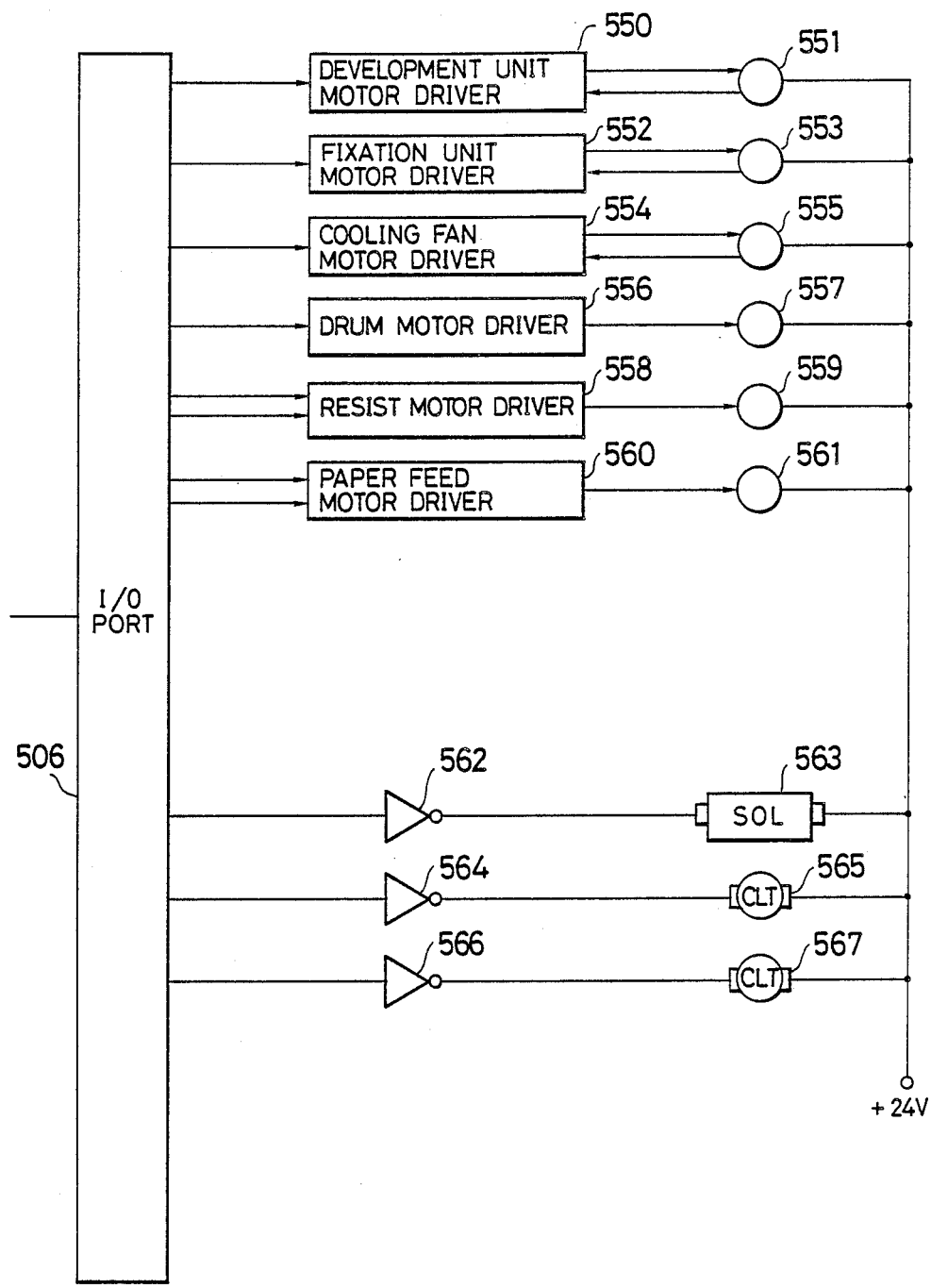
FIG. 9 is a block diagram showing the details of driving circuits and output terminals.

FIG. 9 is a block diagram showing the details of the driving circuit 509 and the output elements 510 shown in FIG. 2. In FIG. 9, a numeral 551 is a development unit motor which is a DC drive Hall motor. A driver 550 of the development unit motor 551 carries out a PLL control. A fixation unit motor 553 is a DC drive Hall motor. A driver 552 of the fixation unit motor 553 carries out the PLL control. A cooling fan motor 555 is a DC drive Hall motor. A numeral 554 is a driver of the cooling fan motor 555 and does not carry out the PLL control. A motor 557 drives the photoconductor drum 200 and is a four-phase pulse motor. A driver 556 for the drum motor 557 adopts a constant current 1-2 phase excitation technique. A resist motor 559 drives a resist roller 218 and a manual feed roller and is a four-phase pulse motor. A driver 558 of the resist motor 559 adopts a constant voltage 2-phase excitation technique. When the resist motor 559 is turned normally, the resist roller 218 is driven, and, when the motor 559 is turned reversely, the manual feed roller is driven.

A paper feed motor 561 drives a lower feed roller and an upper feed roller and is a four-phase pulse motor. A driver 560 of the paper feed motor 561 adopts a constant voltage 2-phase excitation technique similar to the resist motor driver 558.

A solenoid 563 is for a toner collecting blade. When the solenoid 563 is turned ON, the blade 210 is pushed against the photoconductor drum 200. A numeral 562 represents a driver for the blade solenoid 563.

An electromagnetic clutch 565 for the first development unit is turned ON with the development unit motor 551 being also ON to rotate a sleeve in the first development unit. A numeral 564 is a driver of the electromagnetic clutch 565 for the first development unit. An electromagnetic clutch 567 for the second development unit is turned ON with the development unit motor 551 being also ON to rotate a sleeve in the second development unit. A numeral 566 is a driver of the electromagnetic clutch 567 for the second development unit.

FIG. 10 is a block diagram showing the details of the process control circuit 522 and input/output element 523 shown in FIG. 2.

In FIG. 10, the first charger 201 has a corona discharge wire connected to an output terminal of a high-voltage power source 575. An input of the high-voltage power source 575 is connected to an output of a D/A converter 576 for changing a high-voltage output current and to the I/O port 506 from which signals for turning ON and OFF the high-voltage output are given. An input of the D/A converter 576 is connected to the I/O port 506 such that the output current of the high-voltage power source 575 is controlled by the CPU 501 through the D/A converter 576.

A drum temperature sensor 570 detects a temperature around the photoconductor drum 200. An output of the sensor 570 is inputted into an A/D converter 593 whose output is inputted into the I/O port 506 and processed by the CPU 501.

The first potential sensor 202 detects a surface potential of the photoconductor drum 200. An output of the sensor 202 is inputted into the A/D converter 593. A numeral 309 represents a beam of the first semiconductor laser. A sleeve of the first development unit 203 is connected to an output terminal of a high-voltage power source 577 for a first development bias. An input of the high-voltage power source 577 is connected to an output of a D/A converter 578 for changing a high output voltage, and receives signals for turning ON and OFF the high-voltage output, from the I/O port 506. An output of the high-voltage power source 577 is an AC+DC output.

The second charger 204 is a SCOROTRON character. A corona discharge wire of the second charger 204 is connected to an output terminal of a high-voltage power source 579 for a second charge wire. A grid of the second charger 204 is connected to an output terminal of a high-voltage power source 581. An input of the power source 579 is connected to an output of a D/A converter 580 for changing a high output voltage, and receives signals for turning ON and OFF the high voltage output, from the I/O port 506. An input of the power source 581 is connected to a D/A converter 582 for changing a high output voltage, and receives signals for turning ON and OFF the high voltage output, from the I/O port 506. The chargers other than the second charger 204 are general COROTRON chargers.

The second potential sensor 205 detects a surface potential of the photoconductor drum 200 and inputs the detected result into the A/D converter 593. A numeral 310 represents a beam of the second semiconductor laser. A sleeve of the second development unit 206 is connected to an output terminal of a two-color power source 583 for a second development bias. An input of the high-voltage power source 583 is connected to an output of a D/A converter 584 for changing a high output voltage, and receives signals for turning ON and OFF the high-voltage output, from the I/O port 506. An output of the high-voltage power source 583 is a DC output. The pretransfer charger 207 is connected to an output terminal of a high-voltage power source 585. An input of the power source 585 is connected to an output of a D/A converter 586 for changing a high output voltage, and receives signals for turning ON and OFF the high voltage output, from the I/O port 506.

The transfer charger 208 is connected to an output terminal of a high-voltage power source 587. An input of the power source 587 is connected to a D/A converter 588 for changing a high output voltage, and receives signals for turning ON and OFF the high voltage output, from the I/O port 506.

The removal charger 209 is connected to an output terminal of a high-voltage power source 589. An input of the power source 589 is connected to a D/A converter 590 for changing a high output voltage, and receives a signal for turning ON and OFF the high voltage output, from the I/O port 506.

The discharge lamp 211 is connected to an output terminal of a power source 573. An input of the power source 573 is connected to a D/A converter 574 for changing an output light amount of the discharge lamp, and receives a signal for turning ON and OFF a discharge lamp output, from the I/O port 506.

Figure 11A:
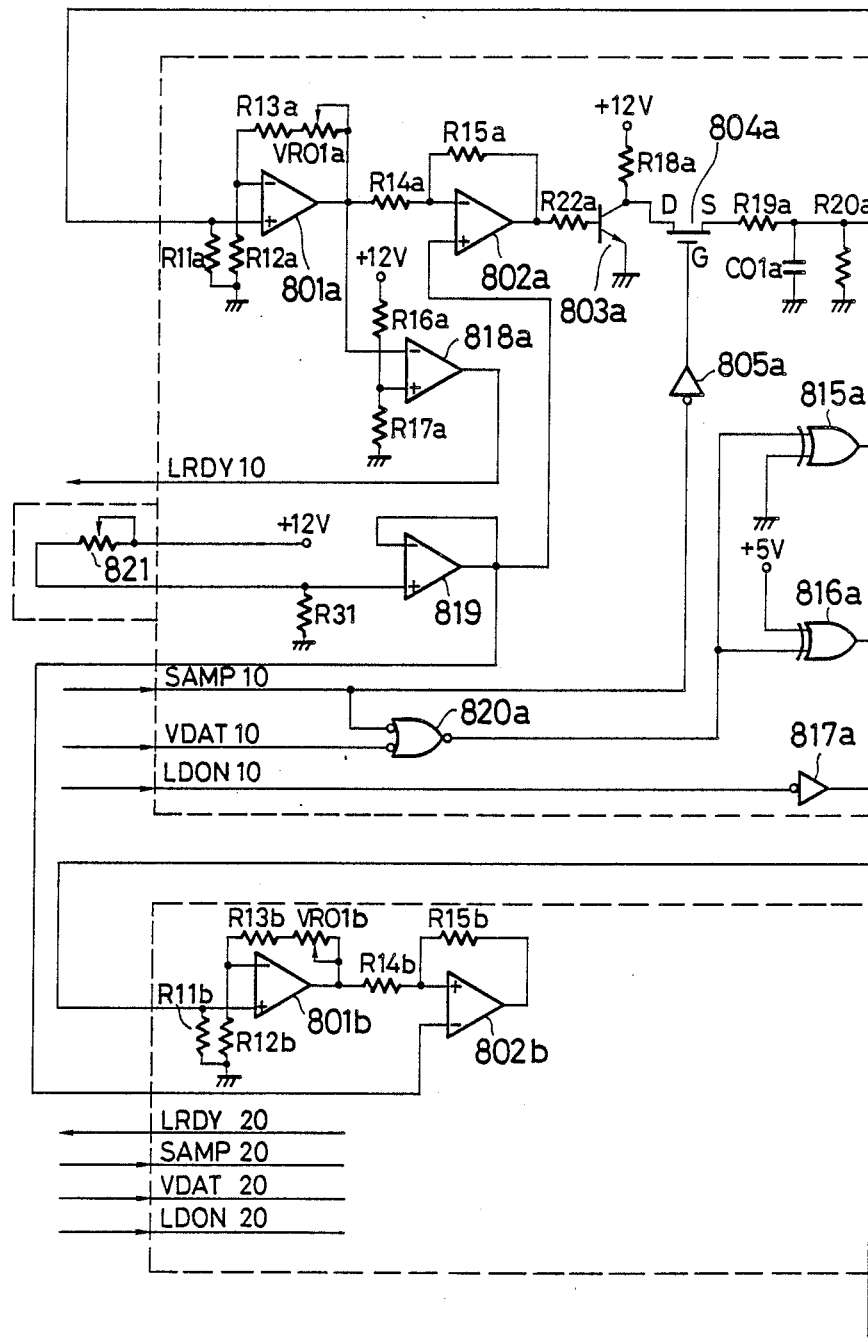
Figure 11B:
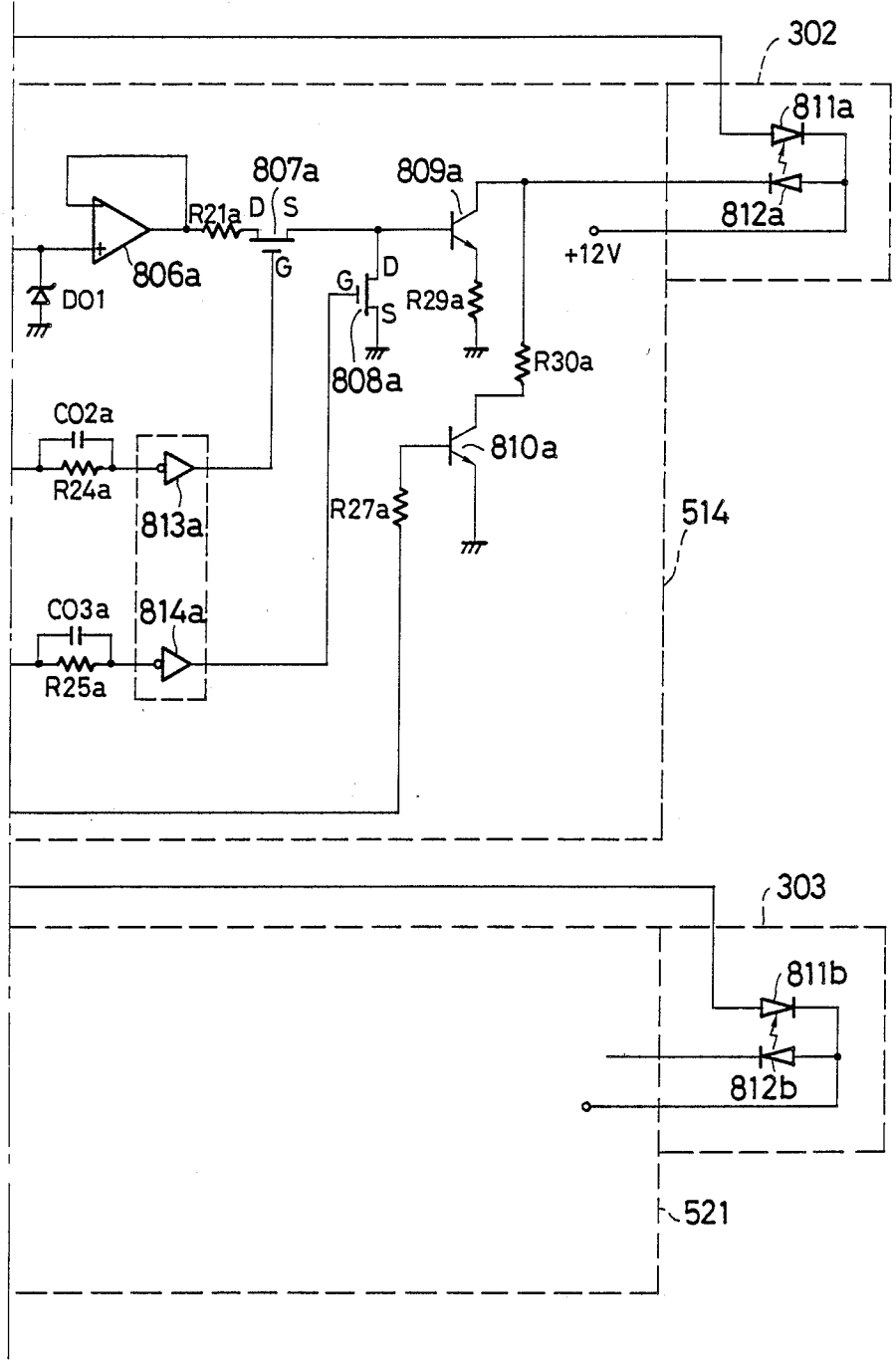

FIG. 11 is a circuit diagram showing the details of the first laser modulation circuit 514, first semiconductor laser 302, second modulation circuit 521 and second semiconductor laser 303 shown in FIG. 2. Firstly, the first laser modulation circuit 514 and first semiconductor laser 302 will be explained.

In FIG. 11, the first semiconductor laser 302 comprises a light emitting laser diode 812a and a photodiode 811a for monitoring the strength of an output beam from the laser diode 812a.

A high-frequency transistor 809a modulates a beam of the first laser diode 812a. A resistor R29a is a resistor for detecting a current. A transistor 810a is for flowing a bias current to the first laser diode 812a, and a resistor R30a is for limiting the current. A resistor R27a is for limiting a base current of the transistor 810a. An inverter 817a receives a first laser diode enable signal LDON10. When the signal becomes LOW, the transistor 810a is turned ON to flow a bias current to the first laser diode 812a. High-speed analog switches 807a and 808a provide modulation to the first laser diode 812a. Each of the analog switches 807a and 808a is turned ON when a high level voltage is applied to a gate (G) to lower resistance between a drain (D) and a source (S). On the contrary, if a low level voltage is applied to the gate (G), the resistance between the drain and the source raises to turn OFF the switch. A short-circuit protective resistor R21a is to cope with turning ON and OFF states of the analog switches 807a and 808a. Numerals 813a and 814a are gate drivers of the analog switches 807a and 808a.

Reference marks C02a and C03a are speed-up capacitors, and R24a and R25a are input resistors of the gate drivers 813a and 814a, respectively. Exclusive OR gates 815a and 816a change according to an output of a 2-AND gate 820a. The 2-AND gate 820a provides a low level output when one of its two gate inputs becomes LOW to make an output of the exclusive OR gate 815a LOW. Then, the analog switch 807a is turned ON to put the first laser diode 812a in an ON state. The output of the 2-AND gate 820a becomes LOW when a first video data signal VDAT10 is LOW or when a first sample signal SAMP10 is LOW. When both inputs of the 2-AND gate 820a are HIGH, an output of the exclusive OR gate 816a will be LOW to turn ON the analog switch 808a and turn OFF the first laser diode 812a.

An operational amplifier 806a constitutes a voltage follower circuit. A zener diode D01 controls such that an output of the first laser diode 812a will be within a maximum rating. A resistor R19a and a capacitor C01a constitute an integrating circuit. A resistor R20a is a discharge resistor for discharging the capacitor C01a at a fixed rate. A gate (G) of an analog switch 804a is connected to an inverter 805a, and an input of the inverter 805a receives the first sample signal SAMP10. A numeral 803a is a level converting transistor, R22a a resistor for controlling a base current of the transistor 803a, and R18a a resistor acting as occurrent limiting resistor at the time of charging the capacitor C01a. A comparator 802a has a hysteresis characteristic that is provided by resistors R14a and R15a.

A positive input of the comparator 802a receives an output voltage of a first laser monitor amplifier 801a via the resistor R14a. The amplifier 801a amplifies an output of the photodiode 811a that detects a beam output from the first laser diode 812a. Resistors R12a, R13a and VR01a regulate an amplification magnitude of the operational amplifier 801a. Therefore, by changing the resistor VR01a, the amplification magnitude of the operational amplifier 801a may be changed. A load resistor R11a is for an output of the photodiode 811a in the first laser diode 812a. On both ends of the resistor R11a, a voltage proportional to an output current of the photodiode 811a is obtained. The output current of the photodiode 811a is in proportion to a beam output of the laser diode 812a so that the beam output of the laser diode 812a may be adjusted by varying the volume resistor VR01a.

A comparator 818a confirms whether or not the first laser diode 812a emits light, and a negative input of the comparator 818a receives an output voltage of the operational amplifier 801a. A positive input of the comparator 818a receives a voltage divided by resistors R16a and R17a. When the first laser diode 812a emits light to increase its output larger than the voltage divided by the resistors R16a and R17a, an output level of the comparator 818a changes from HIGH to LOW to output a first laser ready signal LRDY10.

A negative input terminal of the comparator 802a is applied with a laser beam amount setting voltage. The setting voltage is an output of the voltage follower 819. A positive input terminal of the voltage follower 819 receives voltage divided by an exposure adjusting volume 821 and a resistor R31. By changing the exposure adjusting volume 821, an output voltage of the voltage follower 819 may be changed.

Operations of the first laser modulation circuit 514 and first laser diode 302 will be explained.

When the first laser diode enable signal LDON10 becomes LOW, a bias current flows through the first laser diode 812a. When the first sample signal SAMP10 becomes LOW, the analog switches 804a and 807a are turned ON. However, since the capacitor C01a is not charged, an output of the voltage follower 806a is 0 V so that the modulation transistor 809a will not be turned ON. Therefore, the first laser diode 812a receives a current that is insufficient to emit light. At this time, a current does not flow through the first photodiode 811a so that an output of the comparator 802a will be LOW to turn OFF the transistor 803a. Therefore, the capacitor C01a is charged through the resistors R18a and R19a. Time constants of the resistors R18a and R19a and the capacitor C01a at the time of charge will be selected to be 20 to 50 msec. If these values are too low, the responsibility of a stabilizing circuit will be too quick to excessively vary a beam output level of the laser. If the values are too large, the responsibility will be deteriorated to take a long time to stabilize the beam output. Since the capacitor C01a is charged, an output voltage of the voltage follower 806a gradually increases. As a base voltage of the laser modulation transistor 809a increases, a current starts to flow to its collector.

The first laser diode 812a receives the sum of the bias current from the transistor 810a and the collector current from the transistor 809a, and the first laser diode 812a emits light when the sum exceeds a threshold current of the first laser diode 812a. When the first laser diode 812a emits light, a current flows through the monitoring first photodiode 811a to increase a positive input terminal voltage of the operational amplifier 801a which then outputs an amplified voltage based on the input voltage. When the output voltage of the operational amplifier 801a exceeds the voltage divided by the resistors R16a and R17a, and an output of the comparator 818a, i.e., the first laser ready signal LRDY10 changes from HIGH to LOW. When the output voltage of the operational amplifier 801a exceeds a negative input terminal voltage of the comparator 802a, i.e., the first laser beam amount setting voltage, an output of the comparator 802a changes from LOW to HIGH to turn ON the transistor 803a so that the capacitor C01a is discharged through the resistor R19a. Therefore, a base voltage of the modulation transistor 809a decreases to lower the beam output of the first laser diode 812a. When the beam output of the first laser diode 812a decreases, the positive input terminal voltage of the comparator 802a decreases below the first laser beam amount setting voltage to again turn OFF the transistor 803a. Then, the capacitor C01a is charged through the resistors R18a and R19a. In this way, when the beam output of the first laser diode 812a once reaches the first laser beam amount setting voltage, the comparator 802a repeats ON and OFF around the first laser beam amount setting voltage to stabilize the beam output of the first laser diode 812a.

If the CPU 501 confirms via the I/O port 506 that the first laser ready signal LRDY10 becomes LOW, the CPU 501 activates a sample timer to be described later. For every line outside a print area, the CPU 501 set the first sample signal SAMP10 to LOW for a fixed time to turn ON the analog switches 804a and 807a to stabilize the laser beam amount.

If the two-color LBP 199 is ready to print and if the host system 500 sends a first video data signal VDAT10, the analog switches 807a and 808a alternately repeat ON and OFF according to the first video data signal VDAT10. Then, the modulation transistor 809a modulates the first laser diode 812a to write a dot image data on the photoconductor drum 200.

In the above, the details of the first laser modulation circuit 514 and first semiconductor laser 302 have been described. The second laser modulation circuit 521 and second semiconductor laser 303 have the same constitutions as those of the first laser modulation circuit 514 and first semiconductor laser 302. A beam amount setting voltage of a second laser diode 812b, i.e., an input to a negative input terminal of a comparator 802b is an output of the voltage follower 819. Therefore, by changing the exposure adjusting volume 821, the output voltage of the voltage follower 819 is changed so that negative input terminal voltages of the comparators 802a and 802b change simultaneously. Therefore, a beam output of the first laser diode 812a and a beam output of the second laser diode 812b may simultaneously be adjusted by changing the exposure adjusting volume 821.

Figure 12:
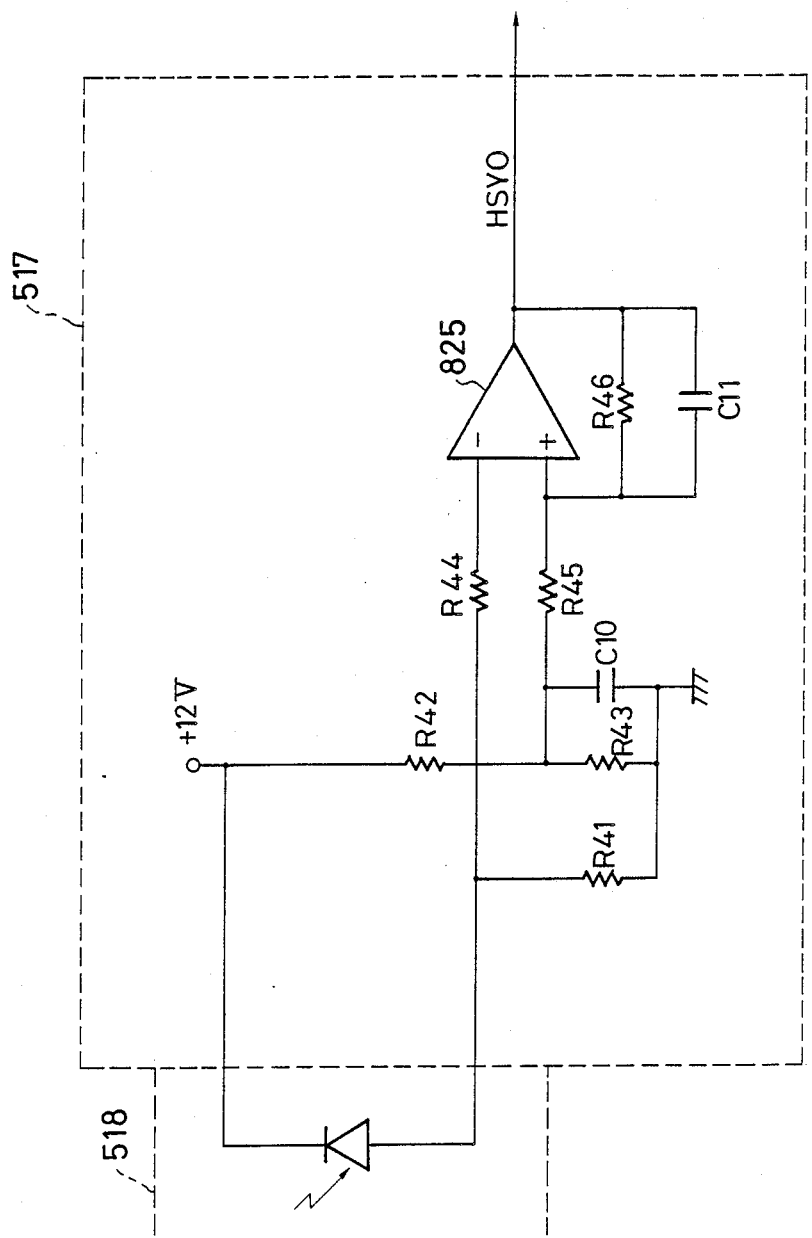
FIG. 12 is a circuit diagram showing the details of a beam detection circuit and a beam detector.

FIG. 12 is a circuit diagram showing the details of the beam detection circuit 517 and beam detector 518. In FIG. 12, the beam detector 518 comprises a very high-speed responsive PIN diode. The beam detector 518 provides a reference pulse in writing print data to the photoconductor drum 200. A generating point of the pulse shall always be stabilized.

An anode of the beam detector 518 is connected to a negative input terminal of a high-speed comparator 825 via a load resistor R41 and a resistor R44. A positive input terminal of the high-speed comparator 825 is applied with a voltage divided by resistors R42 and R43 via a resistor R45. The resistor R43 is connected in parallel to a capacitor C10 for noise elimination. A positive feedback resistor R46 is for providing a hysteresis characteristic. A feedback capacitor C11 performs a high-speed feedback to improve an output waveform.

An operation of the above will be explained. When a laser beam passes through the beam detector 518 at a high speed, a pulse current flows to the beam detector 518 to generate a positive pulse voltage at the negative input terminal of the comparator 825. The pulse voltage is compared with a positive input terminal voltage of the comparator 825, and a negative pulse HSYO is outputted from the comparator 825.

Figure 13:
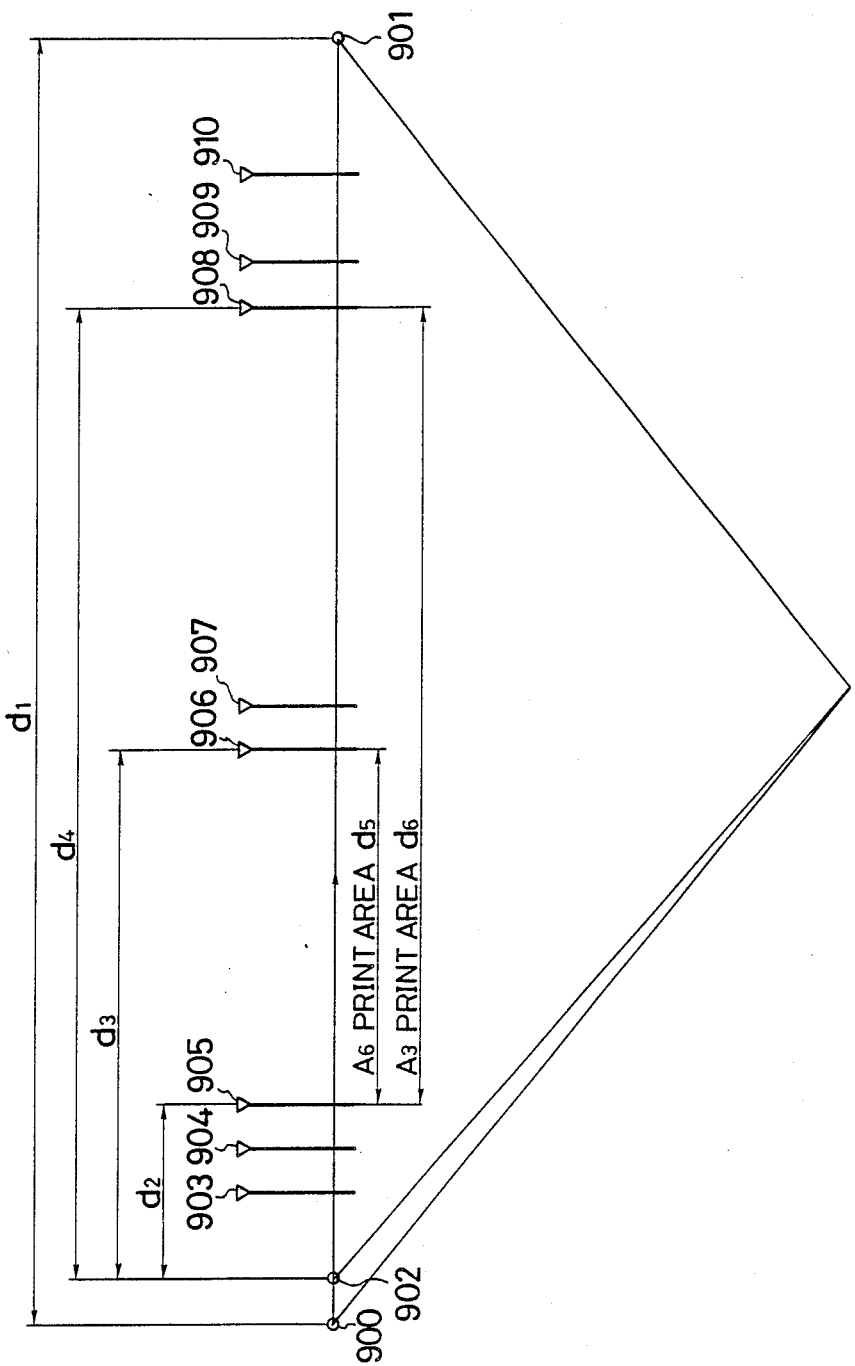
FIG. 13 is a view showing a range of one time scan of a laser beam, beam detecting positions and data writing positions.

FIG. 13 is a view showing a one time scanning range of a laser beam on the photoconductor drum 200 as well as positional relations within the range of beam detecting positions and data writing positions.

FIG. 13, a numeral 900 represents a beam scan start point, and 901 a beam scan end point. When a beam reaches to the scan end point 901, the beam starts the next scan with the next surface of a polygon mirror from the scan start point 900 at a time 0. A numeral 902 represents a beam detection start point of the beam detector 518, 903 a left end face of the photoconductor drum, and 910 a right end face of the photoconductor drum. A numeral 904 is a left end face of a paper, 909 a right end face of a paper of the size of A3, and 907 a right end face of a paper of the size of A6. A numeral 905 is a data write start point, 908 a data write end point of the paper of the size A3, and 906 a data write end point of the paper of the size of A6.

A reference mark d2 represents a distance from the beam detection point 902 to the write start point 905, d3 a distance up to the A6-size paper write end point, and d4 a distance up to the A3-sized paper write end point. A reference mark d1 represents one beam scanning range.

Reference marks d5 and d6 represent effective print ranges for the A6-sized paper and the A3 sized paper, respectively. As shown in FIG. 13, a paper in the printer is always fed with the left end face of the paper as a reference. Therefore, the print start point 905 from the beam detection start point is the same for every paper size. Accordingly, after the elapse of a time corresponding to the distance between the detection point of a beam by the beam detector 518 and the write start point 905, a data writing operation will start.

Figure 14:
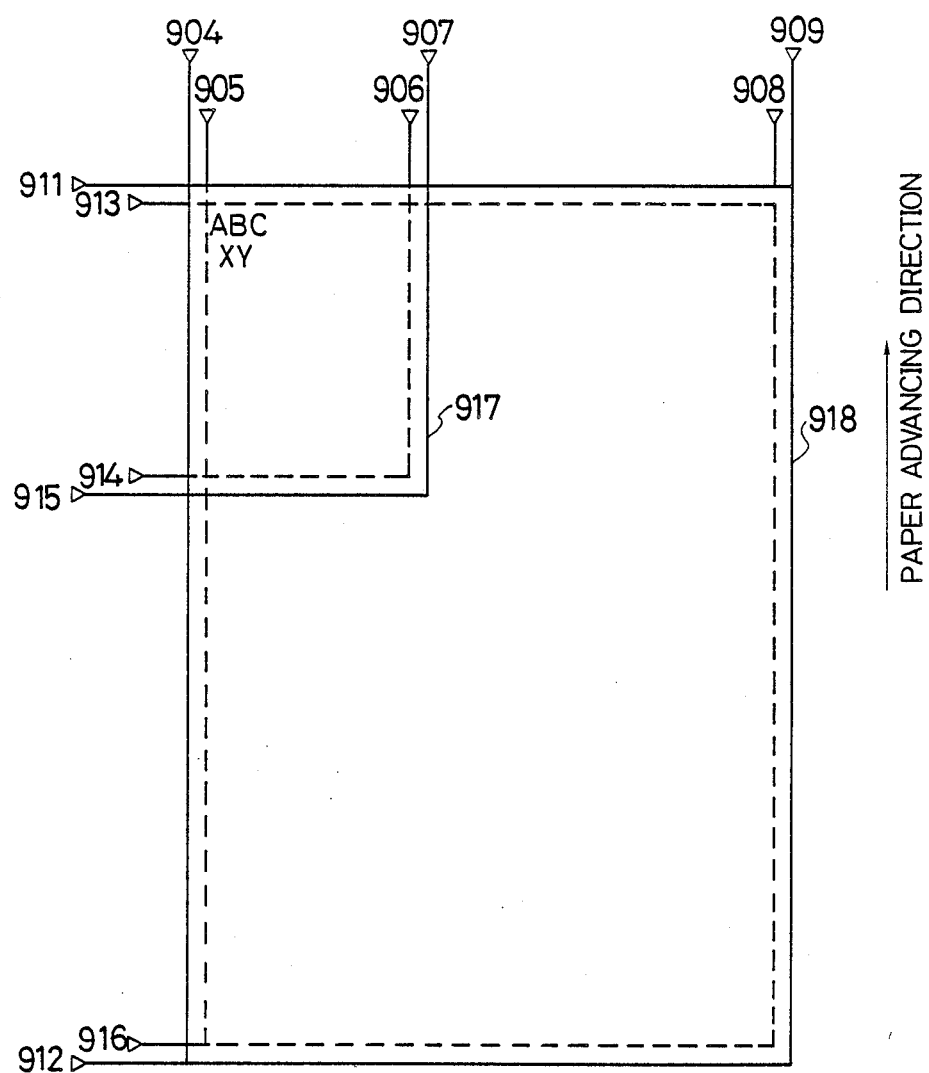
FIG. 14 is a view showing data writing positions on a sheet of paper.

FIG. 14 is a view showing papers having various sizes and print areas of the papers. In the figure, a numeral 917 represents an A6-sized paper, and 918 an A3-sized paper. Numerals 904, 905, 906, 907 and 908 correspond to those shown in FIG. 10.

A numeral 911 represents a leading end of the paper, 913 a data write start point in a vertical direction of the paper, 912 a trailing end of the A3-sized paper, and 916 a data write end point of the A3-sized paper. A numeral 915 represents a trailing end of the A6-sized paper, and 914 a data write end point of the A6-sized paper.

Figure 15B:
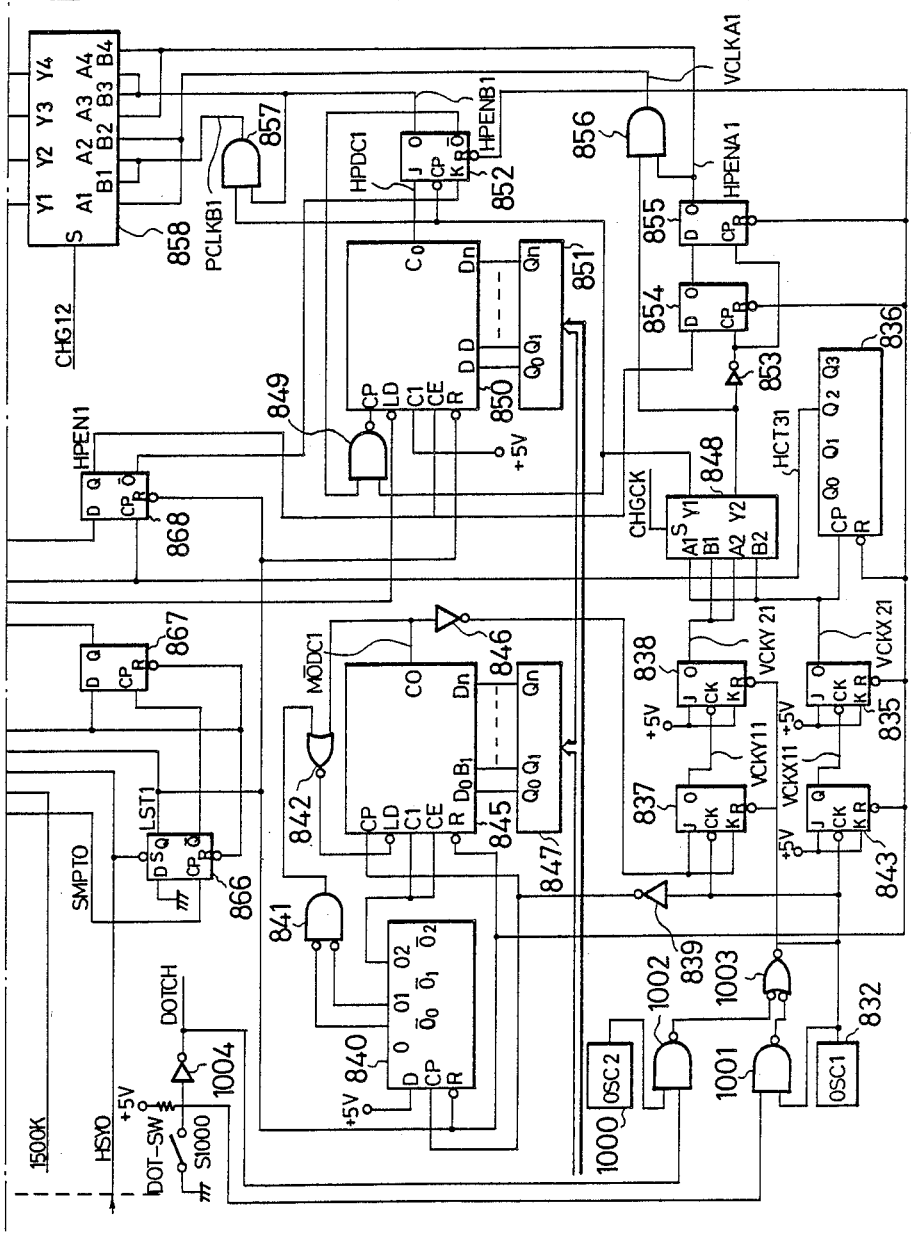

FIG. 15 is a circuit diagram showing the details of the print data write control circuit 513 shown in FIG. 2. As a main function of the print data write control circuit 513, the circuit 513 receives print data from the host system 500 and transmits the data to the laser modulation circuits 514 and 521 so that the print data are written on a predetermined area of the photoconductor drum 200 according to the size of a paper to be printed. Further, the circuit 513 transmits signals needed by laser beam output stabilizing circuits of the laser modulation circuits 514 and 521. In addition, the circuit 513 transmits timing signals needed for the transmission of data to the host system 500.

In FIG. 15, an input/output port 830 transmits and receives signals necessary for controlling the laser modulation circuit 514 and 521 and the print data write control circuit 513. A numeral 831 represents a constitution including counters and timers for controlling print data write and laser beam output sampling. An operation mode of the constitution 831 and preset values of the counters and timers are programmable and set by the CPU 501.

A laser beam output sample time 865 has a gate input G6 to which a beam detection signal HSYO that is an output of the beam detection circuit 517 is inputted. When the beam detection signal HSYO changes from LOW to HIGH, the time 865 starts to operate. The timer 865 stops to operate before the beam detector 518 detects the next beam.

Therefore, whenever the beam detection signal HSYO is inputted to the gate input G6, the timer 865 operates. A clock input CK6 of the timer 865 receives a clock of 1500 KHz. An output SMPTO of the timer 865 is inputted into one input of a 2 OR gate 877 whose output is sent as a first sample signal SAMP10 to the first laser modulation circuit 514 and as a second sample signal SAMP20 to the second laser modulation circuit 517 via 2-NAND gates 886 and 887, respectively. The other input of the 2-NAND gate 886 receives a first laser diode enable signal LDON11 from the I/O port 830 to independently disable the first sample signal SAMP10. Similarly, the other input of the 2 NAND gate 887 receives a second laser diode enable signal LDON21 from the I/O port 830 to independently disable the second sample signal SAMP20.

The other input of the 2-OR gate 877 receives a laser test signal LDTS1 from the I/O port 830. By making the laser test signal LDTS1 HIGH, the first and second semiconductor lasers 302 and 303 are forced to emit light. The I/O port 830 receives the first laser ready signal LRDY10 and the second laser ready signal LRDY20. While the lasers are being forced to emit light, it is possible to know whether the lasers are emitting light by checking the first and second laser ready signals. A D-type F/F 866 generates a line start signal LST1. The D-type F/F 866 is set with the beam detection signal HSYO and reset with a rising edge of the sample timer output SMPTO. A D type F/F 867 generates a beam detection ready signal LDOT1 which is inputted into the I/O port 830. The D-type F/Fs 866 and 867 are reset by the output of a 2-OR gate 869. The 2-OR gate 869 receives the first and second laser diode enable signals.

Crystal oscillators 832 and 1000 provide reference clocks for image clock pulses. The crystal oscillator 832 generates a reference clock for 300 dot/inch in recording density at an oscillating frequency of about 32 MHz. The crystal oscillator 1000 generates a reference clock 400 dot/inch in recording density at an oscillating frequency of about 57 MHz.

A switch S1000 is for switching the recording densities. By turning ON and OFF the switch S1000, the crystal oscillators 832 and 1000 are switched from one to another through an inverter 1004, 2-NAND gates 1001 and 1002 and an AND gate 1003.

An output DOTCH of the inverter 1004 is inputted into the I/O port 830 to discriminate the recording density. The following explanation will be made for the recording density of 300 dot/inch.

Numerals 834 and 835 are J-K F/Fs to constitute a quadridecimal counter to divide an output of the crystal oscillator 832 by four to generate a first video clock VCKX21 (about 8 MHz) corresponding to one dot that is a minimum modulation unit of the laser beam.

Numerals 837 and 838 are also J K F/Fs to constitute a quadridecimal counter. An input J K of the J-K F/F 837 receives a carry-out output CO of an n bit binary counter 845 via an inverter 846. In each of the J-K F/Fs 834, 835, 837 and 838, an output Q performs a toggle operation in synchronism with a clock input CK when the input J-K is HIGH and, when the input J K is LOW, the output Q stops the toggle operation. As a result, when the carry-out output CO of the n-bit binary counter 845 is generated, a second video clock signal VCKY21 from the output Q of the J-K F/F 838 will be "5/4" with respect to "1" for a pulse interval at a normal operation so that it is extended by ¼ clock. Preset inputs D0 to Dn of the n bit binary counter 845 are connected to outputs Q0 to Qn of an n-bit latch 847 and whose values are set according to dip switches, etc., by the CPU 501. The set values are used to set a carry-out number of the n bit binary counter 845 in one line (while the signal LST1 is being HIGH). As a result, a clock generating number of 5/4 is set. An inverter 839, a shift register 840 and 2-NOR gates 841 and 842 constitute a circuit for providing a predetermined operation to the n-bit binary counter 845.

The second video clock signal VCKY21 is used to correct a difference between scan lengths l1 and l2 of two laser beams. In this case, a laser beam having the longer scan length l1 is assigned for the first video clock signal VCKX21 while a laser beam having the shorter scan length l2 is assigned for the second video clock signal VCKY21. A selector 848 performs such an assignment according to an output CHGCK from the I/O port 830.

An example of correction will be explained. If the longer scan length l1 is 200 mm and the shorter scan length l2 is 199 mm, a difference between the scan length is 1 mm. When a resolution is 12 lines/mm, the video clock signal VCKY21 of the shorter scan length l2 shall be extended by 12 dot-clocks for 2400 dot-clocks (200×12). Since an extension of ¼ dot-clocks is made by one correction, 48 times (12×4=48) of the ¼ dot-clock correction are made in the 2400 dot-clocks.

Since the clock input CP of the n-bit binary counter 845 is ¼ dot-clocks, its carry-out may be 48 outputs for 9600 (2400×4) clock counts. Namely, a preset value may be selected to generate one carry for every 200 counts.

A numeral 836 represents a binary counter whose output Q2 is a signal HCT31 of 8 dot-clocks (about 1 MHz) derived by dividing the first video clocks VCKX21 by 8. A left margin counter 863 sets a data write start point according to a beam scan start point. A right margin counter 864 sets a data write end point from the beam scan start point. A gate input G4 of the left margin counter 863 and a gate input G5 of the right margin counter 864 receive the line start signal LST1. A clock input CK4 of the left margin counter 863 and a clock input CK5 of the right margin counter 864 receive the 8-dot-clock signal HCT31. The counters can correct variations in the data write start point and the data write end point due to mechanical fitting errors of the beam detector 518 for both the two laser beams simultaneously. By changing the set values of the counters according to the dip switches, the correction of errors may be adjusted with 8 dot clocks unit. The reason why the 8 dot-clocks unit has been set is because the data write start position and the data write end position may be within an allowable range even if they are displaced by 8 dots with respect to the paper, and because the error adjustment will be easy. The set value of the right margin counter 864 varies depending on the size of a paper.

One input of a 2-AND gate 875 receives an output LMCT0 of the left margin counter 863, while the other input receives an output RMCT0 of the right margin counter 864 via an inverter 874. Therefore, an output of the 2 AND gate 875 indicates a horizontal print area.

The output of the 2 AND gate 875 is shifted by 4 dot-clocks in a shift register 868 whose output Q is a horizontal print area signal HPEN1.

The horizontal print area signal HPEN1 is inputted to an input CE of an n-bit binary counter 850 and to a shift register 854. The n bit binary counter 850, a 2 NAND gate 849, an n bit latch 851 and a J-K F/F 852 constitute a circuit for right-shifting the data write start point with one dot unit. An output of the J-K F/F 852 is a first horizontal print area signal HPENB1. Preset inputs D0 to Dn of the n-bit binary counter 850 are for setting the number of right shifts and connected to the n bit latch 851. The set values are set by the CPU 501 through dip switches, etc. The shift registers 854 and 855 and an inverter 853 constitute a circuit for shifting the horizontal print area signal HPEN1 by 2 dot clocks to the right. An output of the shift register 855 is a second horizontal print area signal HPENA1. This is because the first horizontal print area signal HPENB1 is shifted to the right by 2 dot-clocks even with the minimum set value.

An output of an AND gate 857 is a first video clock signal VCLKB1 for the first horizontal print area. One input of the AND gate 857 is the first horizontal print area signal HPENB1, and the other is an output Y1 of the selector 848. An output of an AND gate 856 is a second video clock signal VCLKA1 for the second print area. One input of the AND gate 856 is the second horizontal print area signal HPENA1, and the other is an output Y2 of the selector 848.

As described in the above, the first horizontal print area signal HPENB1 and the first video clock signal VCLKB1 that can adjust the data write start point with one dot unit are used to correct errors in the scan start points of the two laser beams. In this case, the second horizontal print area signal HPENA1 and the second video clock signal VCLKA1 are assigned for a laser beam with an early scan start point S2, while the first horizontal print area signal HPENB1 and the first video clock signal VCLKB1 are assigned for a laser beam with a late scan start point S1 to adjust an error d. A selector 858 performs the above-mentioned assignment according to an output CHG12 of the I/O port 830.

Counters 859 to 862 are for setting data write start point and a data write end point in a vertical direction in a paper advancing direction. The first page top counter 859 sets a first color data write start point, and the first page end counter 860 sets the first color data write end point. The second page top counter 861 sets a second color data write start point, and the second page end counter 862 sets a second color data write end point.

Gate inputs G0 to G3 of the counters 859 to 862 are connected to a page top signal PTOP1 that is an output of the I/O port 830 and activated with a VSYNC command.

Clock inputs CK0 to CK3 of the counters 859 to 862 are connected to a line start signal LST1 so that the counting is made with a scan line unit (one dot unit). How to set the counters will be described later.

One input of a 2-AND gate 871 receives an output PTCT10 of the first page top counter 859, and the other input receives an output PECT10 of the first page end counter 860 via an inverter 870. Therefore, an output of the 2-AND gate 871 is a first color vertical print area signal VPEN11.

One input of a 2-AND gate 873 receives an output PTCT20 of the second page top counter 861, while the other input receives an output PECT20 of the second page end counter 862 via an inverter 872. Therefore, an output of the 2-AND gate 873 is a second color vertical print area signal VPEN21.

The output PECT10 of the first page end counter and the output PECT20 of the second page end counter are inputted into the I/O port 830 to zero the first image transferring status and the second color image transferring status after the completion of the counting operations, and transmit the attention signal IATN1 to the host system 500.

A 2 NAND gate 878 transmits a first color horizontal synchronous signal IHSYN10 to the host system 500. A 2-NAND gate 879 transmits a second color horizontal synchronous signal IHSYN20 to the host system 500.

A 2-NAND gate 880 transmits a first color video clock signal IVCLK10 to the host system 500, while a 2-NAND gate 881 transmits a second color video clock signal IVCLK20 to the host system 500.

The frequency of each of the video clock signals IVCLK10 and IVCLK20 changes according to a recording density of the two-color LBP 199.

A 3 NAND gate 884 receives a first color video data signal IVDAT10 from the host system 500 and transmits the signal as a first video data signal VDAT10 to the first laser modulation circuit 514.

A 3-NAND gate 885 receives a second color video data signal IVDAT20 from the host system 500 and transmits the signal as a second video data signal VDAT20 to the second laser modulation circuit 521.

Figure 16A:
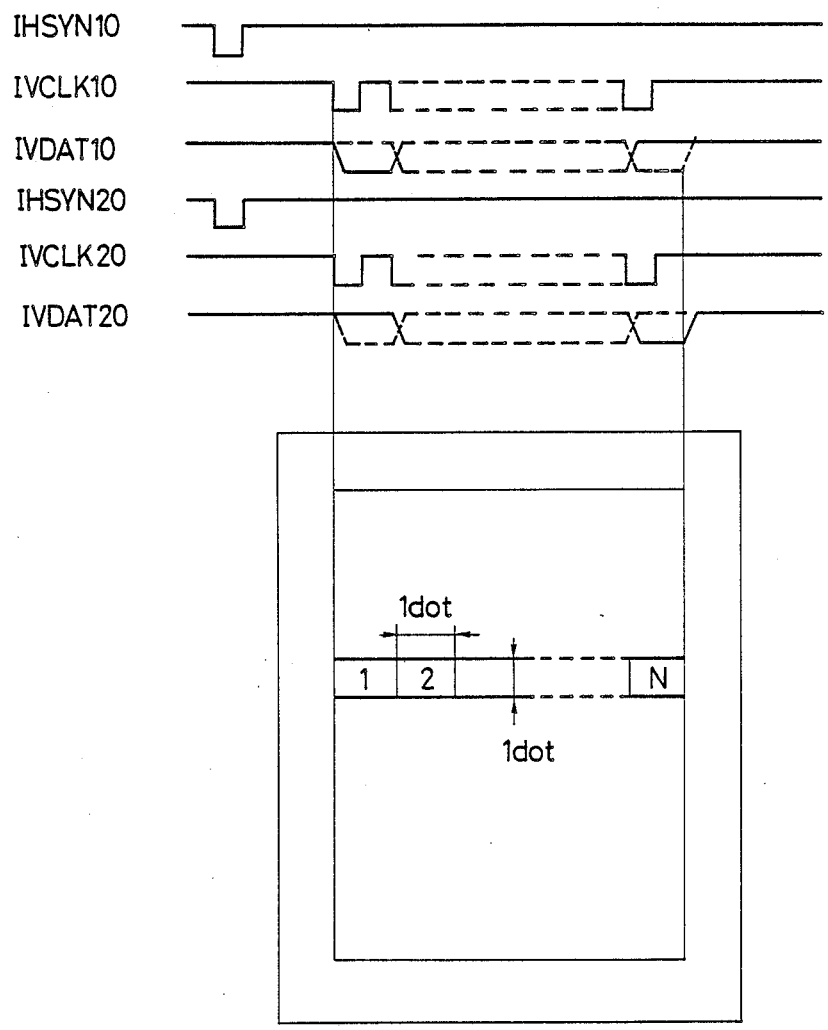
Figure 16B:
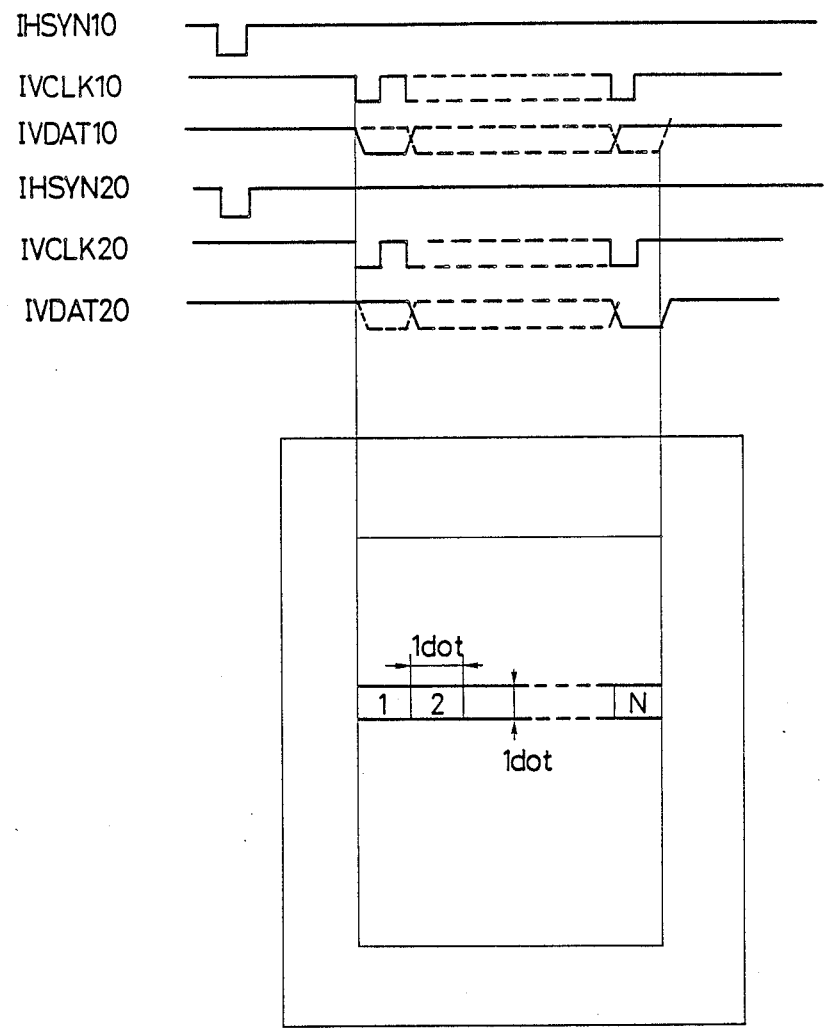

Here, the host system 500 is so constituted to send the video data signals IVDAT10 and IVDAT20 to the 3-NAND gates 884 and 885 in synchronism with the video clock signals IVCLK10 and IVCLK20 from the 2-NAND gates 880 and 881. Therefore, as shown in FIGS. 16a and 16b, the host system 500 can easily determine the transmission timing of the video data signals even if a recording density of the printer changes.

An inverter 888 transmits a first laser diode enable signal LDON10 to the first laser modulation circuit 514, and an inverter 889 transmits a second laser diode enable signal LDON20 to the second laser modulation circuit 521.

Figure 17B:
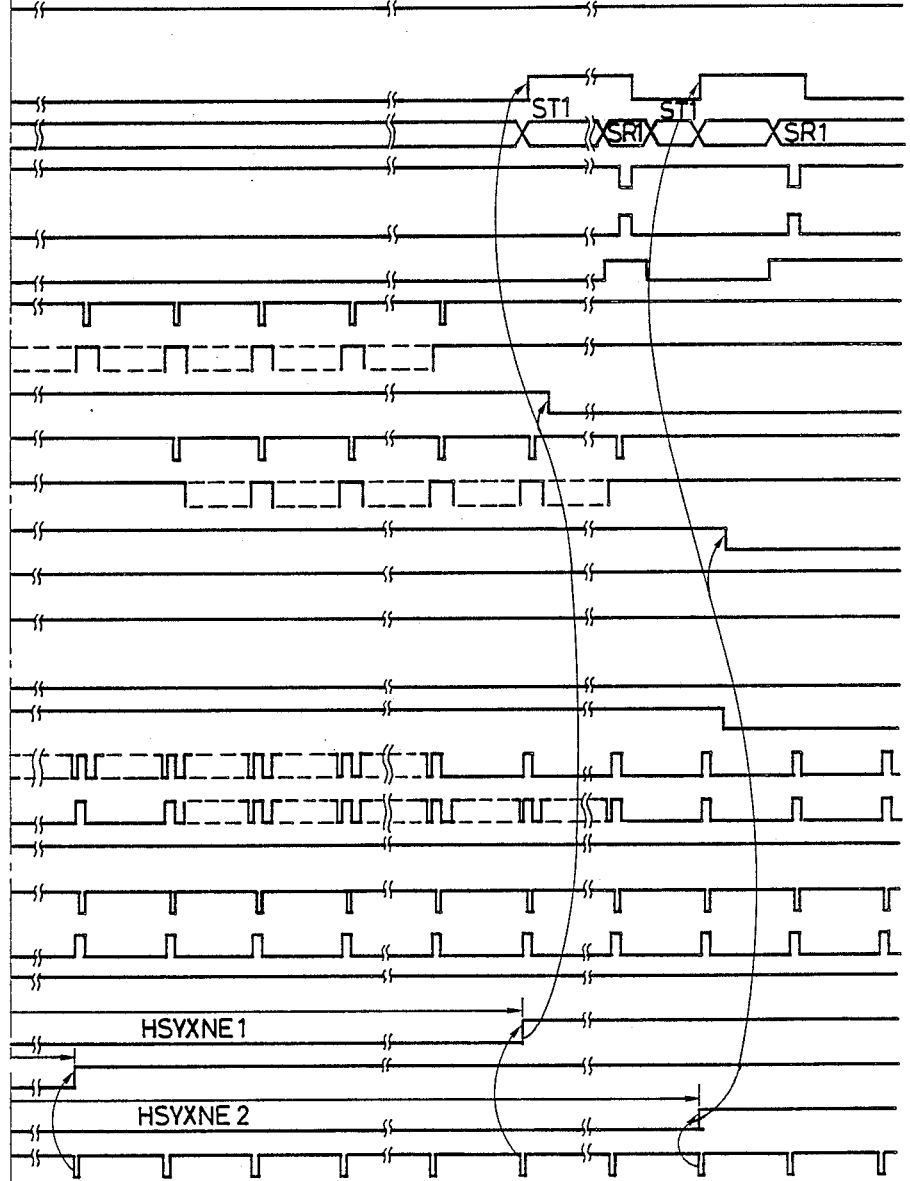
Figure 18A:
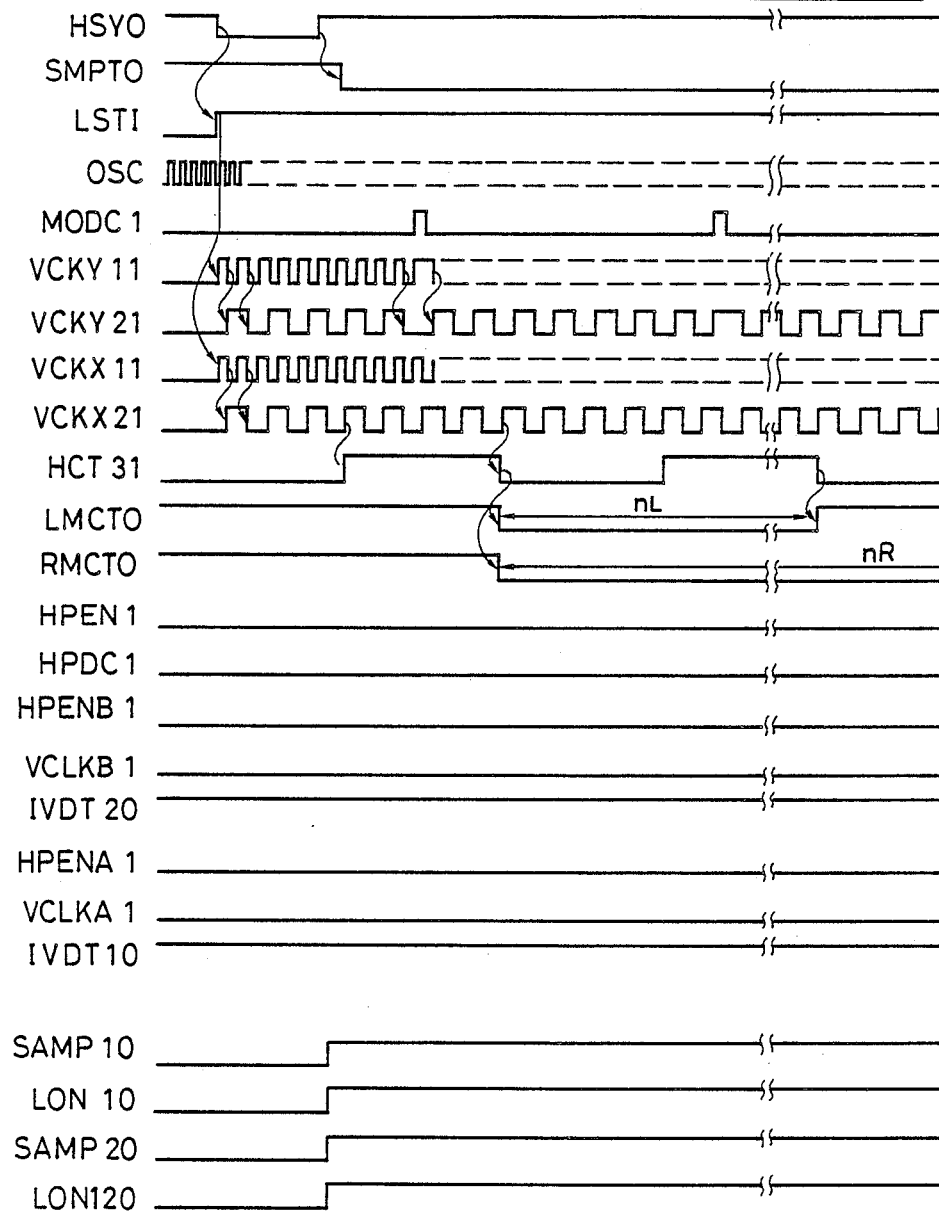
Figure 18B:
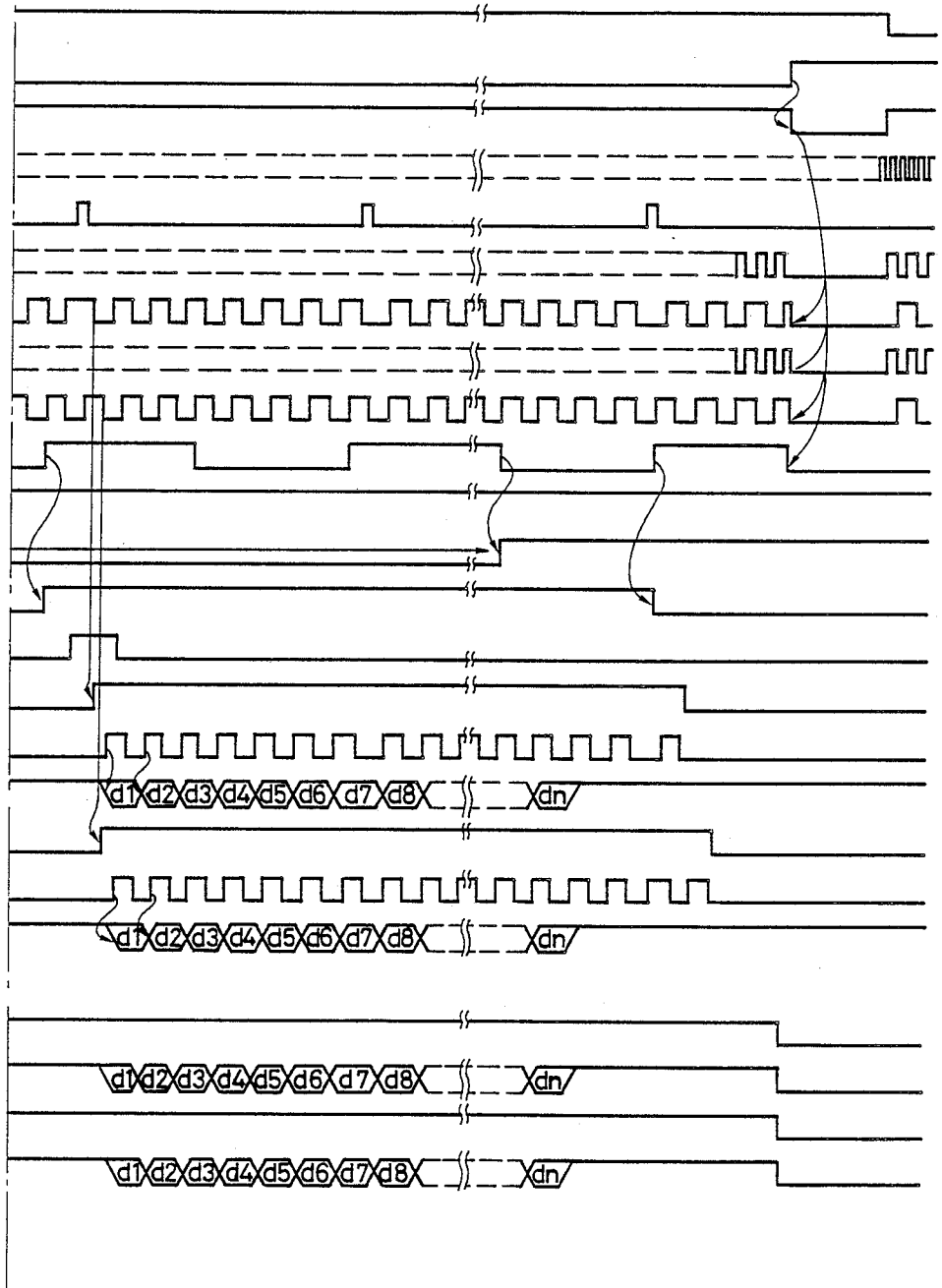

With the above-mentioned arrangement, FIG. 17 is a timing chart of essential signals for one page under the two-color print mode, and FIG. 18 a timing chart of essential signals for one line.

Figure 19A:
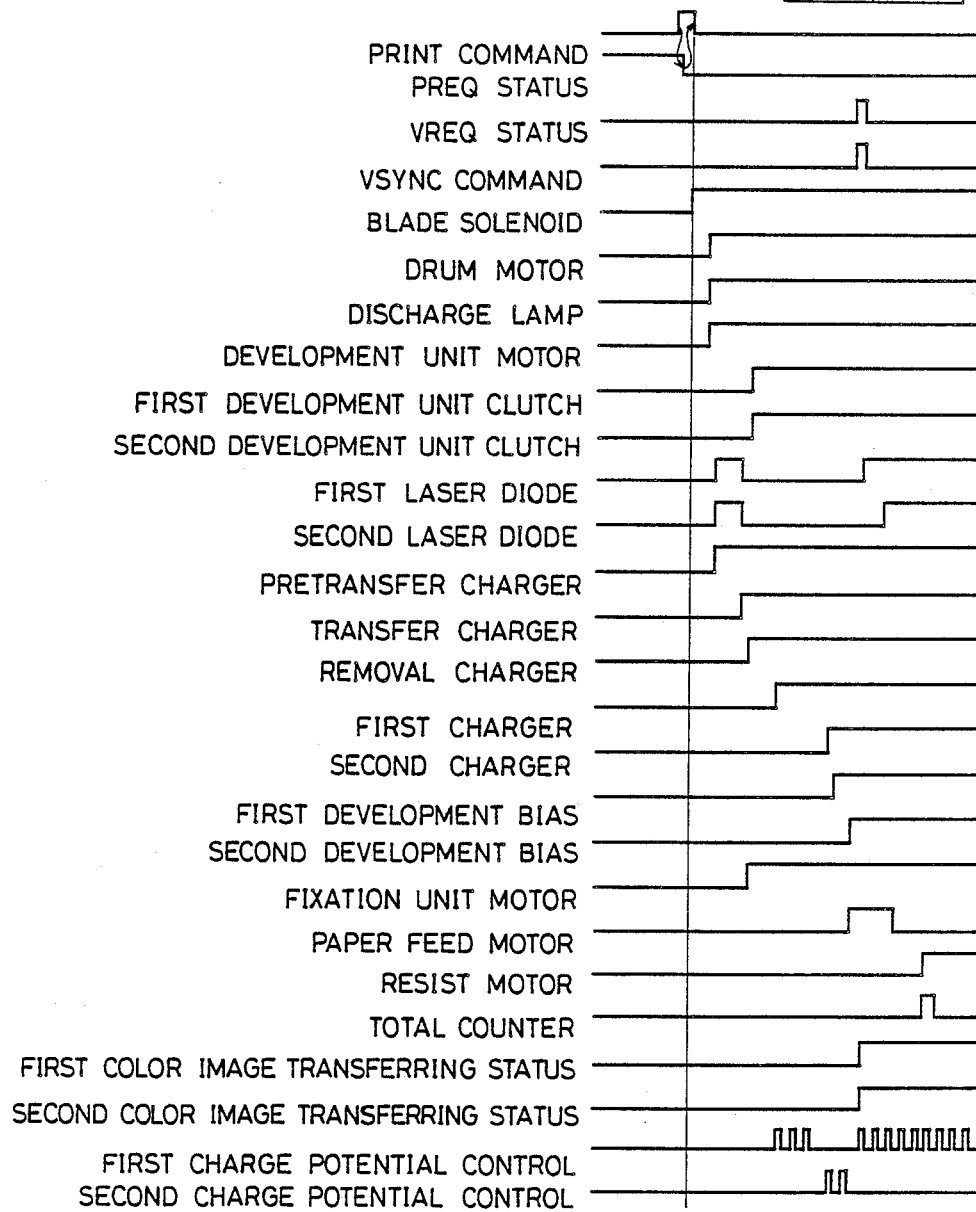
Figure 19B:
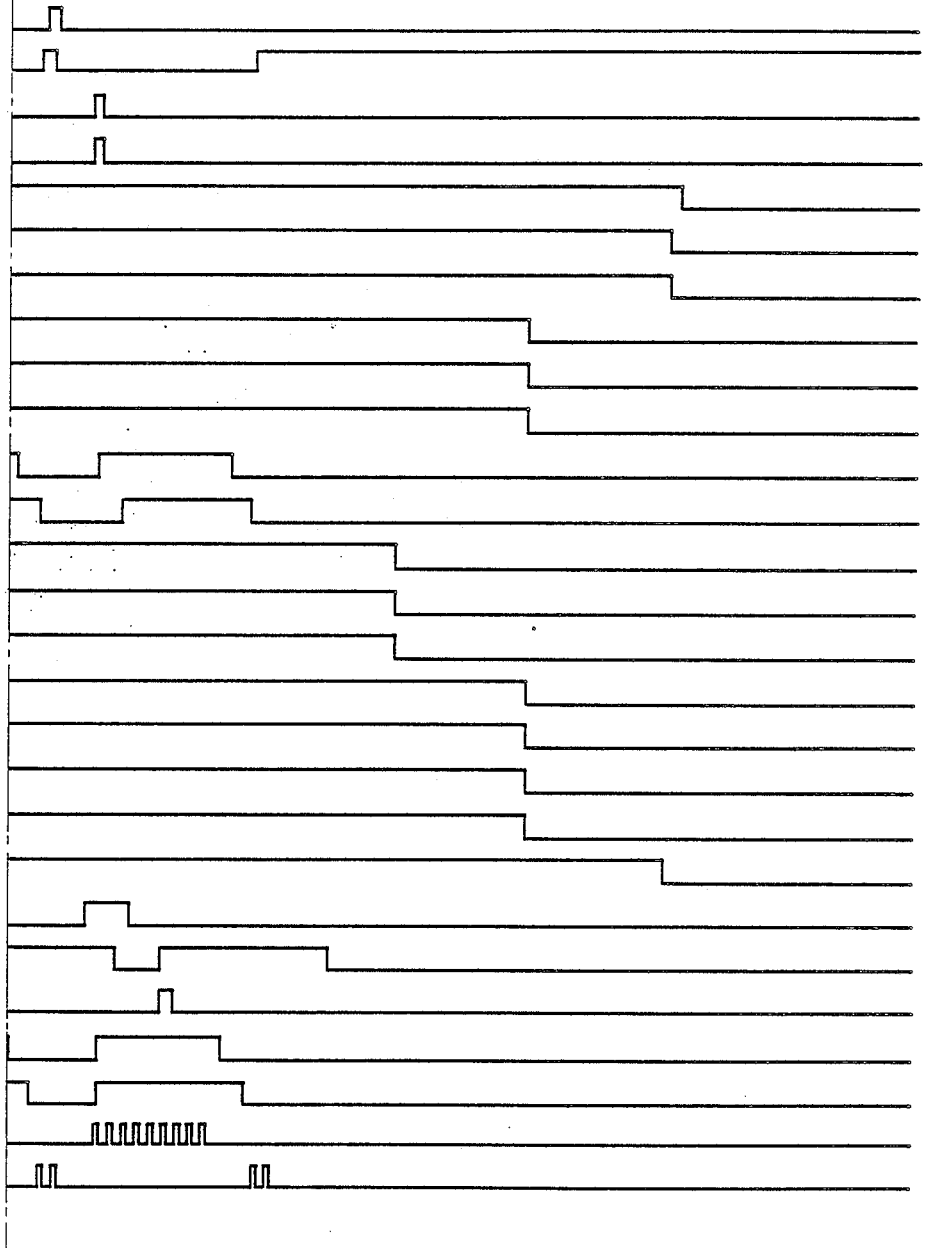
Figures 20, 20A:
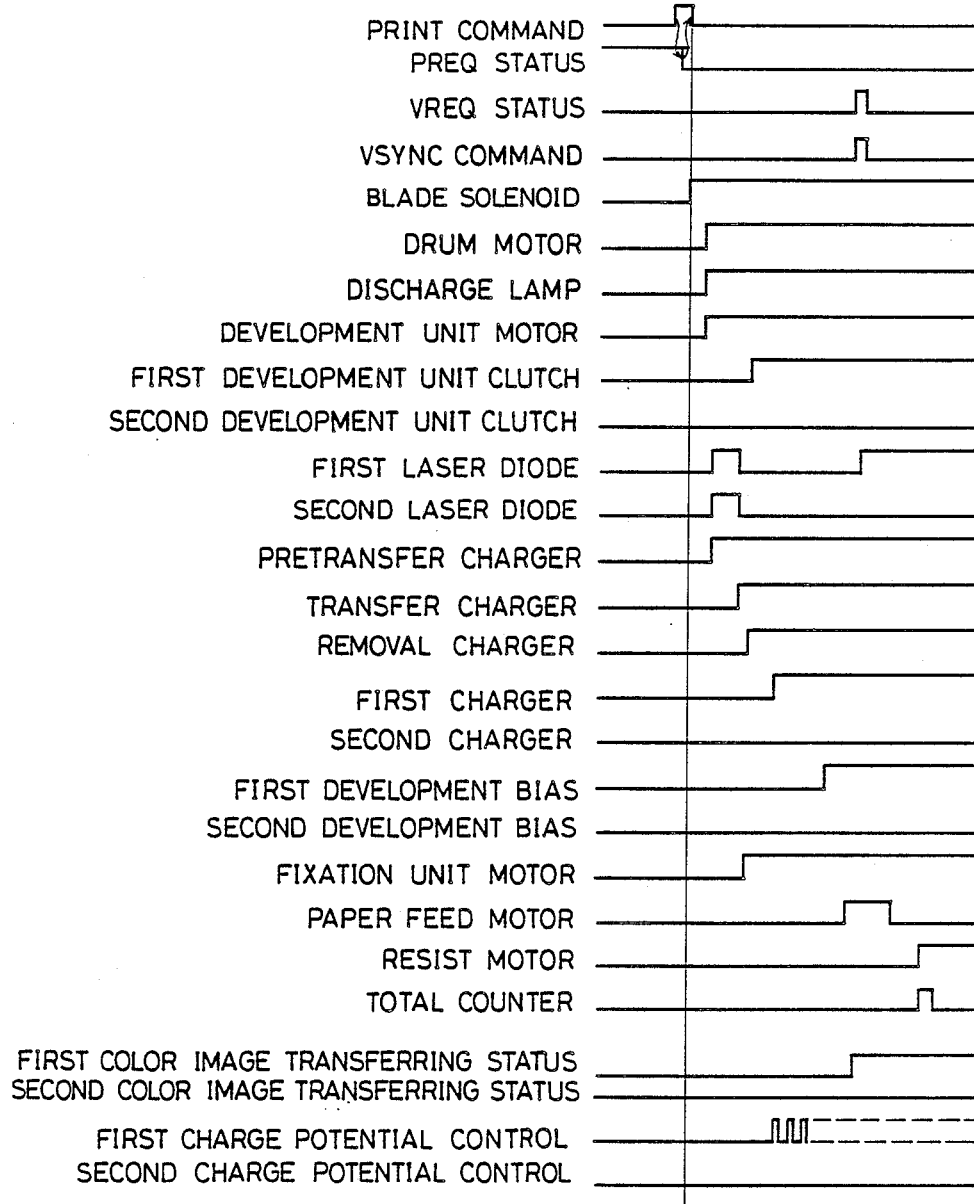
FIGS. 20, 20a and 20b are a timing chart showing process control signals under a first color print mode.
Figure 20B:
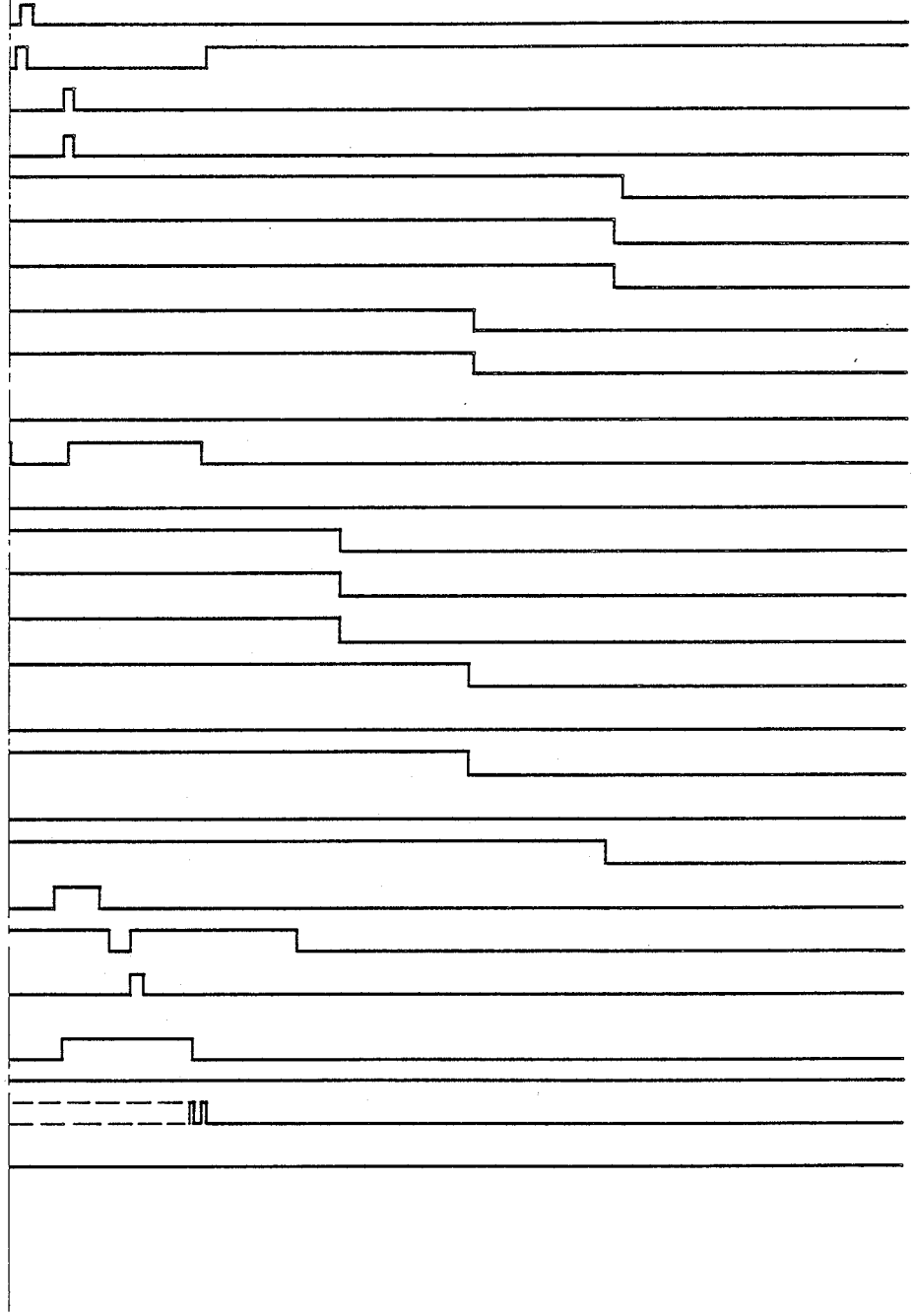
Figure 21A:
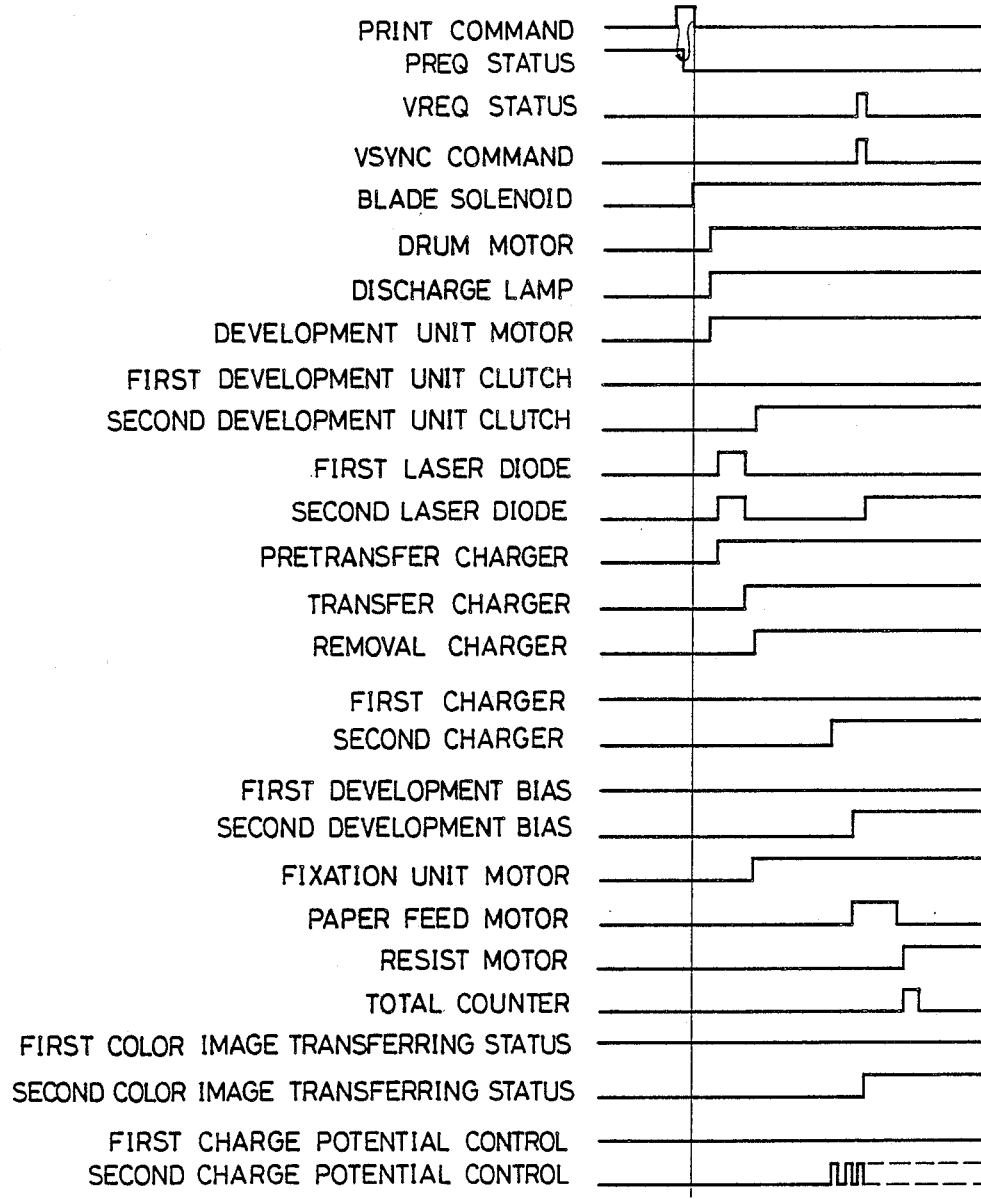
Figure 21B:
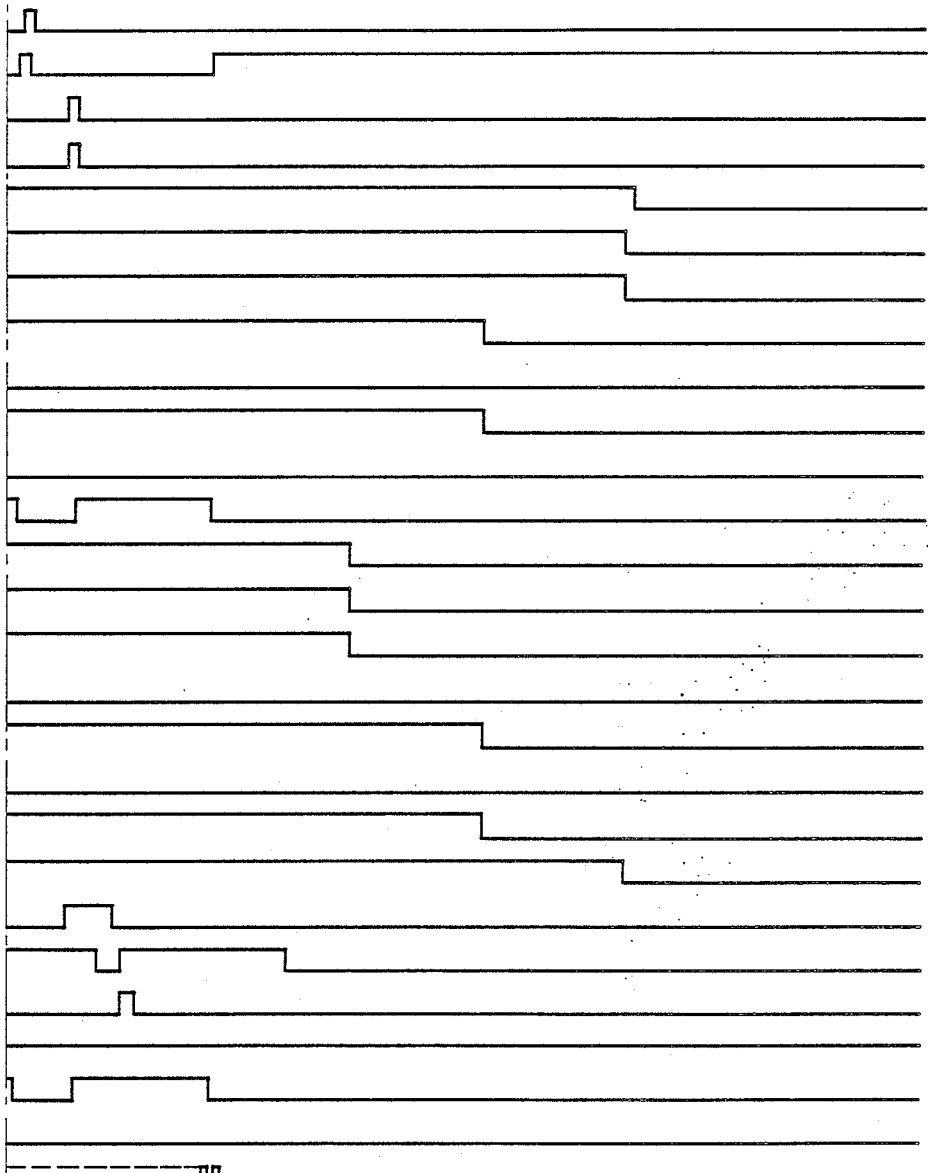

FIG. 19 is a timing chart of process control signals under the two-color print mode, and FIG. 20 a timing chart of process control signals under the first color print mode. FIG. 21 is a timing chart of process control signals under the two-color print mode.

Operations of the respective portions of the two-color LBP 199 responding to control instructions from the control portions will be described in detail with reference to flowcharts of FIGS. 22 to 31.

FIGS. 22 to 26 are flowcharts showing overall operations of the two-color LBP 199.

FIG. 22 shows a self-diagnosis process and a warming-up process of the two-color LBP 199.

In FIG. 22, an operator turns ON the power source unit 520 to start the system program stored in the ROM 502. Firstly, the self-diagnosis process is carried out in steps A101 to A104. If the door switch is ON in step A101, a door open process is executed in step A105. If the delivery switch is ON, manual stop switch ON, or pass sensor ON, a jam process is executed in step A106.

If it is not a test print mode and not a maintenance mode in steps A107 and A108, a heater lamp for heating the fixation unit 221 is turned On in step A111 to start the warming-up process that takes a relatively long time to get a ready state. Then, a motor of the fixation unit 221 and the scan motor 512 are turned ON in step A112. If it is the test print mode in step A107, a test print process is executed in step A109, and, if it is the maintenance mode in step A107, a maintenance process is executed in step A110.

When the scan motor 512 is turned ON and a ready state is realized in step A113, the blade solenoid is turned ON in step A114. If the ready state is not obtained in step A113 and if 30 seconds has passed after turning ON the scan motor 512 in step A115, a fault process of the scan motor 512 is executed in step A116.

After a delay process in step A117, the drum motor of the photoconductor drum 200, development unit motor 425, a clutch of the first development unit 203, a clutch of the second development unit 206 and a lamp of the discharger 211 are turned ON in step A118. After a delay process in step A119, the first laser diode 302, second laser diode 303, laser test and pretransfer charger 208 are turned ON in step A120.

After a delay process in step A121, the first laser diode 302 and second laser diode 303 are checked to see whether or not they are normal in steps A122 and A123. If they are normal in steps A122 and A123, it is judged whether or not beam detection is ready according to the horizontal synchoronous signal SHYNC in step A128. If the first laser diode 302 is not normal in step A122, a first laser fault process is executed in step A124. If the second laser diode 303 is not normal in step 123, a second laser fault process is executed in step A125. If the beam detection is not realized with the horizontal synchoronous signal HSYNC in step 126, a beam detection fault process is executed in step A127.

After a delay process in step A129, the removal charger 209 is turned ON in step A130. After a delay process in step A131, a warming-up potential control is executed in step A132. The step A132 is for quickening a first print.

After a delay process in step A133, respective processes of steps A134 to A140 are executed. In step A134, the pretransfer charger 207, transfer charger 208 and removal charger 209 are turned OFF. In step A136, the development unit motor 425, clutch of the first development unit 203, clutch of the second development unit 206, first charger 201 and second charger 204 are turned OFF. In step A138, the motor of the photoconductor drum 200, discharger 211, first laser diode 302, second laser diode 303 and motor of the fixation unit 222 are turned OFF. In step A140, the blade solenoid is turned OFF.

Figure 23A:
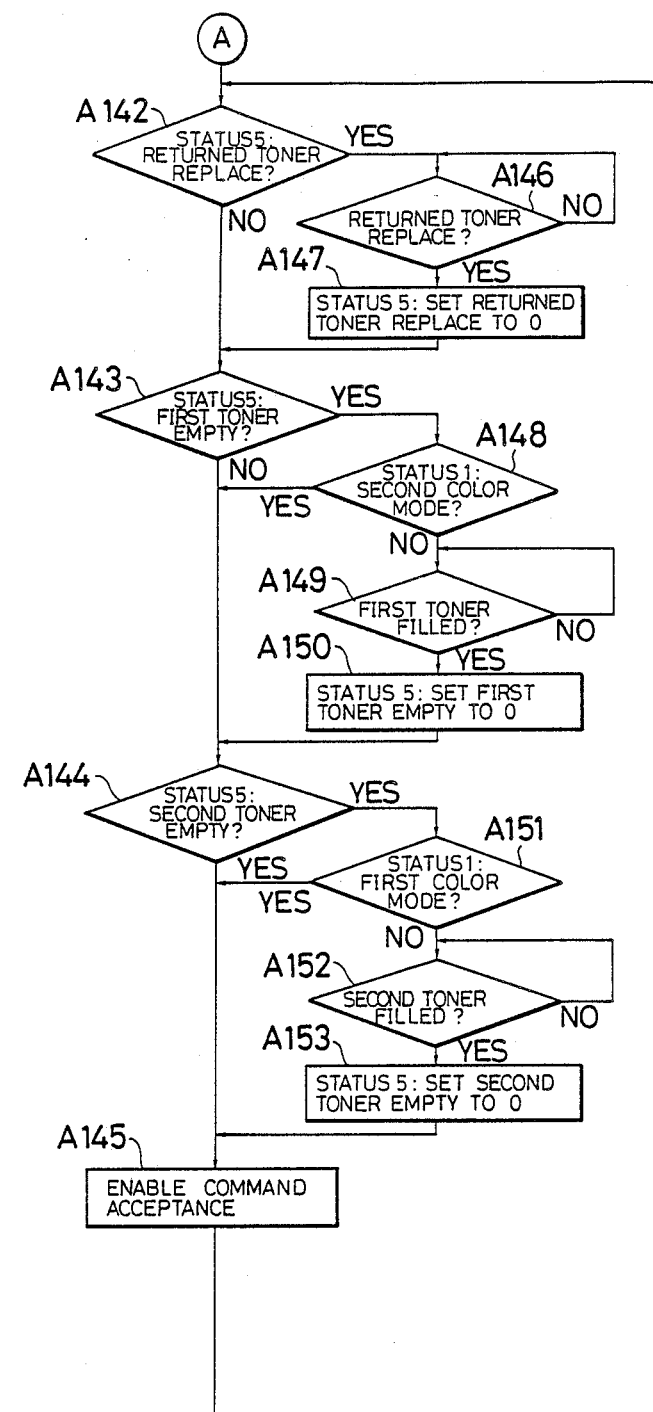
Figure 23:
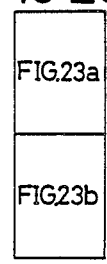
Figure 23B:
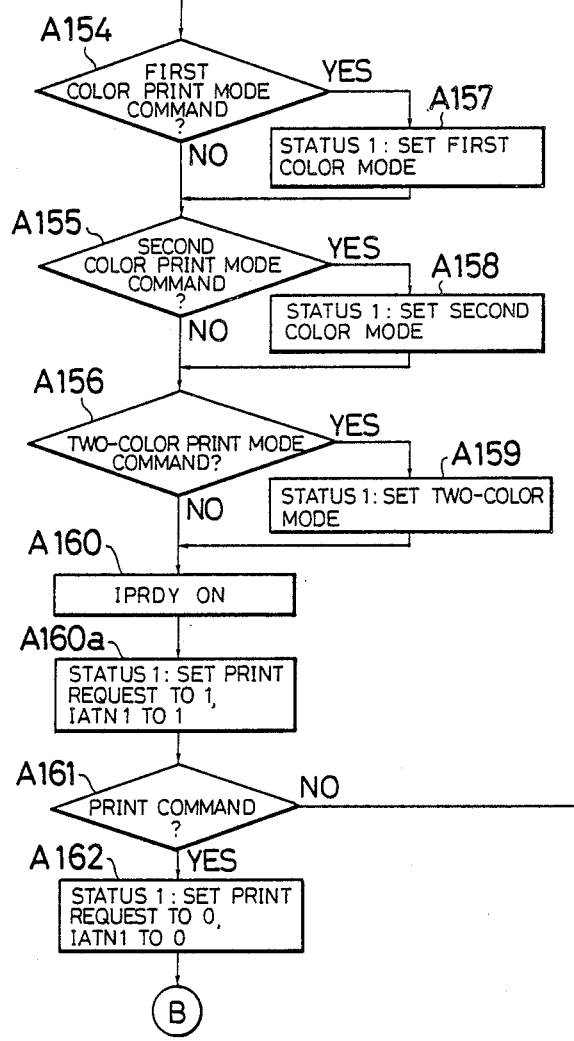

If the fixation unit 221 is ready in step A141, the self-diagnosis and warming-up processes of steps A101 to A141 are completed to go to a routine shown in FIG. 23.

FIG. 23 shows recesses to report the states of respective portions of the two-color LBP 199 to the host system 500 and to send a print request to the host system 500 after receiving a normal judgment for the respective portions from the host system 500.

In FIG. 23, a judgment for the contents of the status 5 is obtained from the host system 500 in steps A142 to A145. In the step A142, it is judged whether or not the toner back shall be replaced. If a result is YES in step A142, it waits until the toner back is replaced in step A146. After the completion of steps A146 and A147, it is judged whether there is first color toner according to an ON or OFF state of the first development unit 203 in step A143. If there is no first color toner in step A143, it is judged whether or not it is a second color mode of the status 1 in step A148. If it is a first color mode or a two-color mode in step A148, the first color toner is supplied to the first development unit 203 in steps A149 and A150. Then, it proceeds to step A144. If it is the second color mode in step A148, steps A149 and A150 are skipped to execute step A144. In the step A144, it is judged whether or not there is second color toner according to an ON or OFF state of an empty switch of the second development unit 206. If there is no second color toner in step A144, it is judged whether it is the first color mode of the status 1 in step A151. If it is the second color mode or the two-color mode in step A151, the second color toner is supplied to the second development unit 206 in steps A152 and A153. Then, it proceeds to step A145. If it is the first color mode in step A151, the steps A152 and A153 are skipped to carry out step A145.

If the toners of the first development unit 203 and second development unit 206 are normal, it is allowed to receive a command from the host system 500 in step A145.

If a command specifying the first color print mode is received in step A154, the first color mode is set for the status 1 in step A157. If a command specifying the second color print mode is received in step A155, the second color mode is set for the status 1 in step A158.

If there comes a command specifying the two-color print mode in step A156, the two-color mode is set for the status 1 in step A159.

In step A160, a signal IPRDY is turned ON. Then, the PRINT request of status 1 and the attention signal IATN1 are set in step A160a to execute a process for turning ON the signal IPREQ. In step A161, it is judged whether or not the signal IPRNT is turned ON. If it is still OFF in step A161, the step A142 is repeated. If it is ON in step A161, the PRINT request of status 1 and IATN1 are set in step A162 to carry out a print process routine.

Figure 24C:
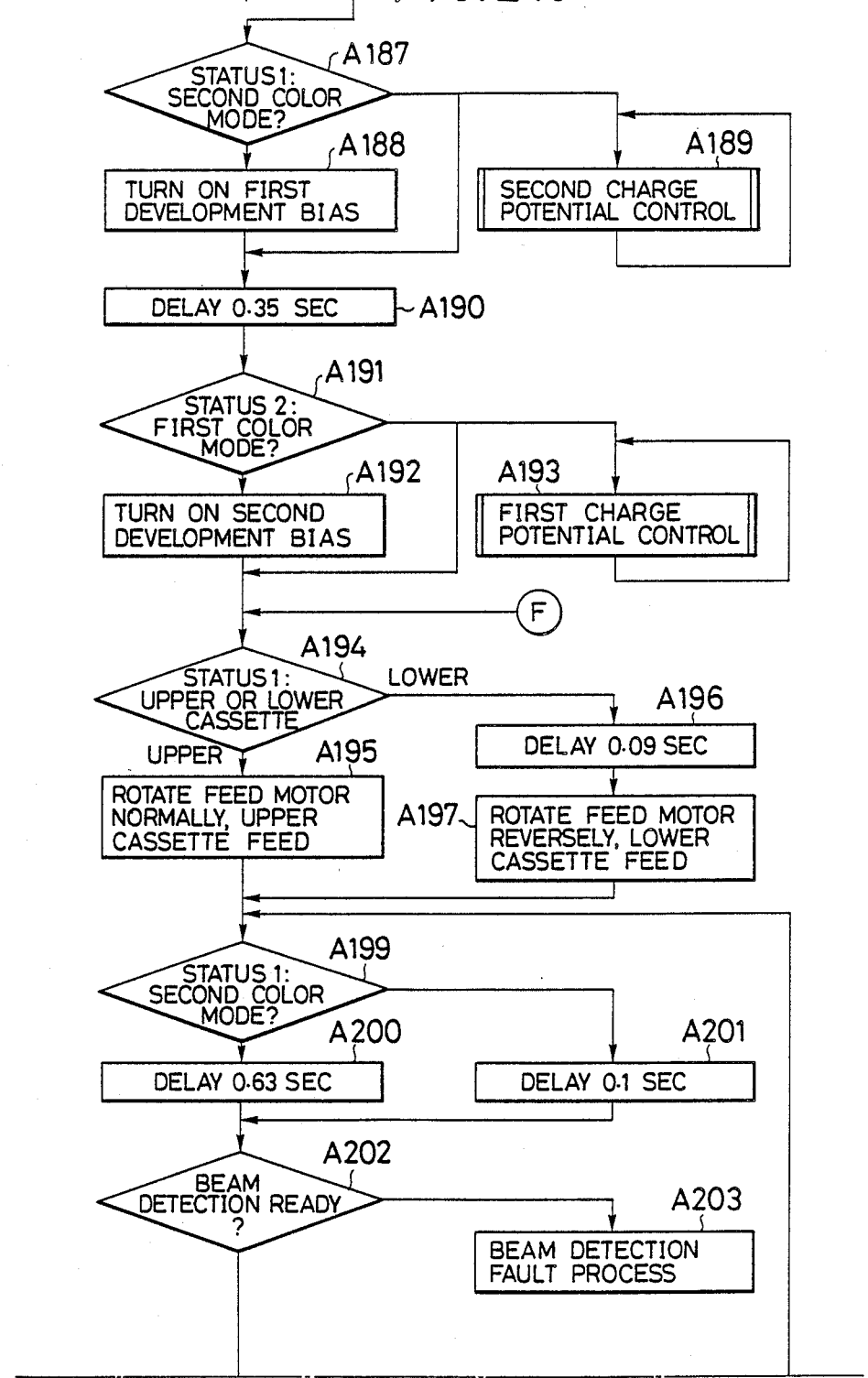
Figure 24D:
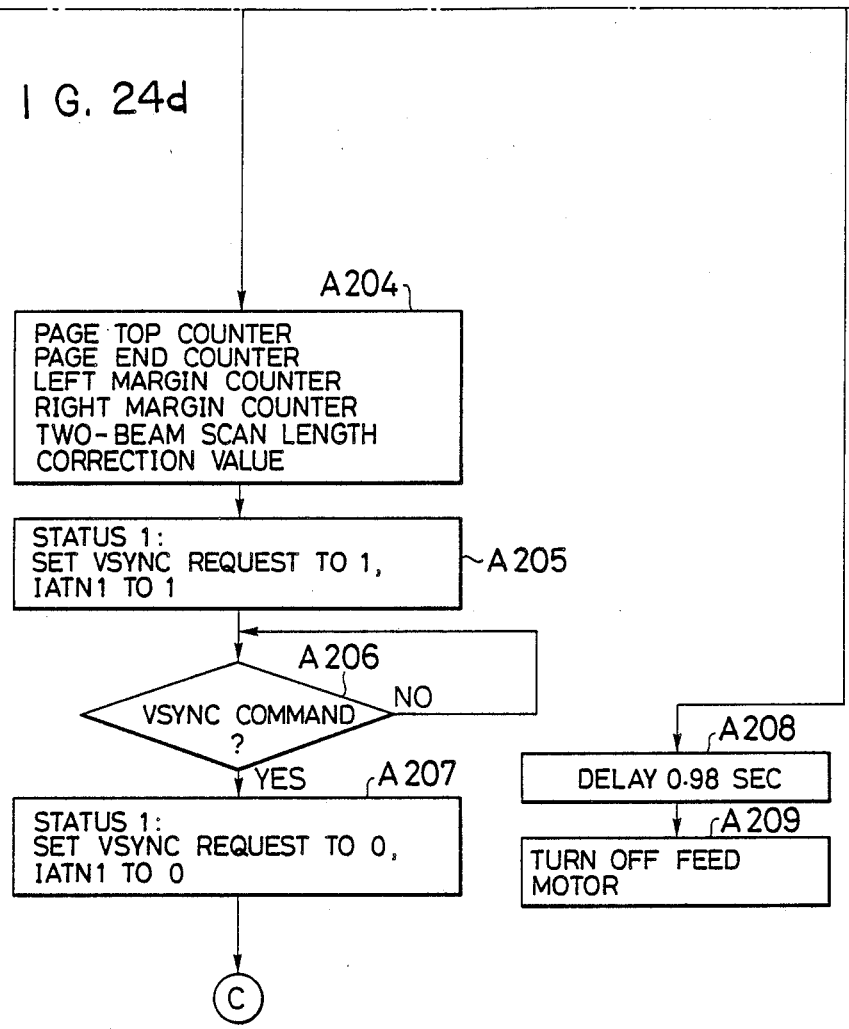

In FIG. 24, steps A163 to A174 relates to a process similar to the warming-up routine. In step A177, it is judged whether or not it is the second color mode of the status 1. If it is not the second color mode in step A177, the clutch of the first development unit 203 is turned ON to drive the first development unit 203 in step A178. Then, step A179 is done. If it is the second color mode in step A177, the step A178 is skipped to step A179.

In step A179, it is judged whether or not it is the first color mode of the status 1. If it is not the first color mode in step A179, the clutch of the second development unit 206 is turned ON to drive the second development unit 206 in step A180. Then, step A181 is done. If it is the second color mode, the step A180 is skipped to step A181.

In step A181, a data of the bias table for the toner color of first development unit 203 is read. The, in step A182, the read data of the bias table is set in the D/A converter 578. In step A183, a data of the bias table for the toner color of second development unit 206 is read, and, in step A184, the read data of the bias table is set in the D/A converter 584.

After a delay process in step A185, the potential control before first print shown in FIG. 23 is carried out in step A186.

In the next step A187, it is judged whether or not it is the second color mode of the status 1. If it is not the second color mode in step A187, the development bias 409 of the first development unit 203 is turned ON in step A188. Then, step A190 is done. If it is the second color mode in step A187, the step A188 is skipped to step A190. The second charge potential control as shown in FIG. 23 is carried out in step A189.

After a delay process in step A190, it is judged whether or not it is the first color mode of the status 1 in step A191. If it is not the first color mode in step A191, the development bias 409 of the second development unit 206 is turned ON in step A192. Then, step A194 is done. If it is the first color mode in step A191, the step A192 is skipped to step A194, and the first charge potential control as shown in FIG. 23 is done in step A193.

In step A194, it is judged whether a paper feed cassette is upper or lower according to the status 1. If it is an upper cassette, the paper feed motor is turned normally to feed papers from the upper cassette in step A195. Then, step A199 is done, and, after a delay process in step A208, the paper feed motor is turned OFF in step A209. If it is a lower cassette, the step A195 is skipped to perform a delay process in step A196. Then, the paper feed motor is turned reversely to feed papers from the lower cassette in step A197. Then, step A199 is done, and, after the delay process in step A208, the paper feed motor is turned OFF in step A209.

In step A199, it is judged whether or not it is the second color mode according to the status 1. If it is not the second color mode in step A199, a delay process of step A200 is done and then A202. If it is the second color mode in step A199, a delay process of step A201 is done and then step A202.

In step A202, it is judged whether or not beam detection is ready according to the horizontal synchoronous signal HSYNC, and, if it is ready, step A204 is done. If the beam detection is not ready in step A202, a beam detection fault process is carried out in step A203.

In step A204, the page top counter, page end counter, left margin counter, right margin counter and 2 beam scan length correction value are set as shown in FIGS. 21 and 22.

In step A205, VSYNC request of the status 1 and IATN1 are set, and it waits for the VSYNC command in step A206. If the host system 500 sends the VSYNC command, the VSYNC request and IATN1 are reset in step A207.

Figure 25B:
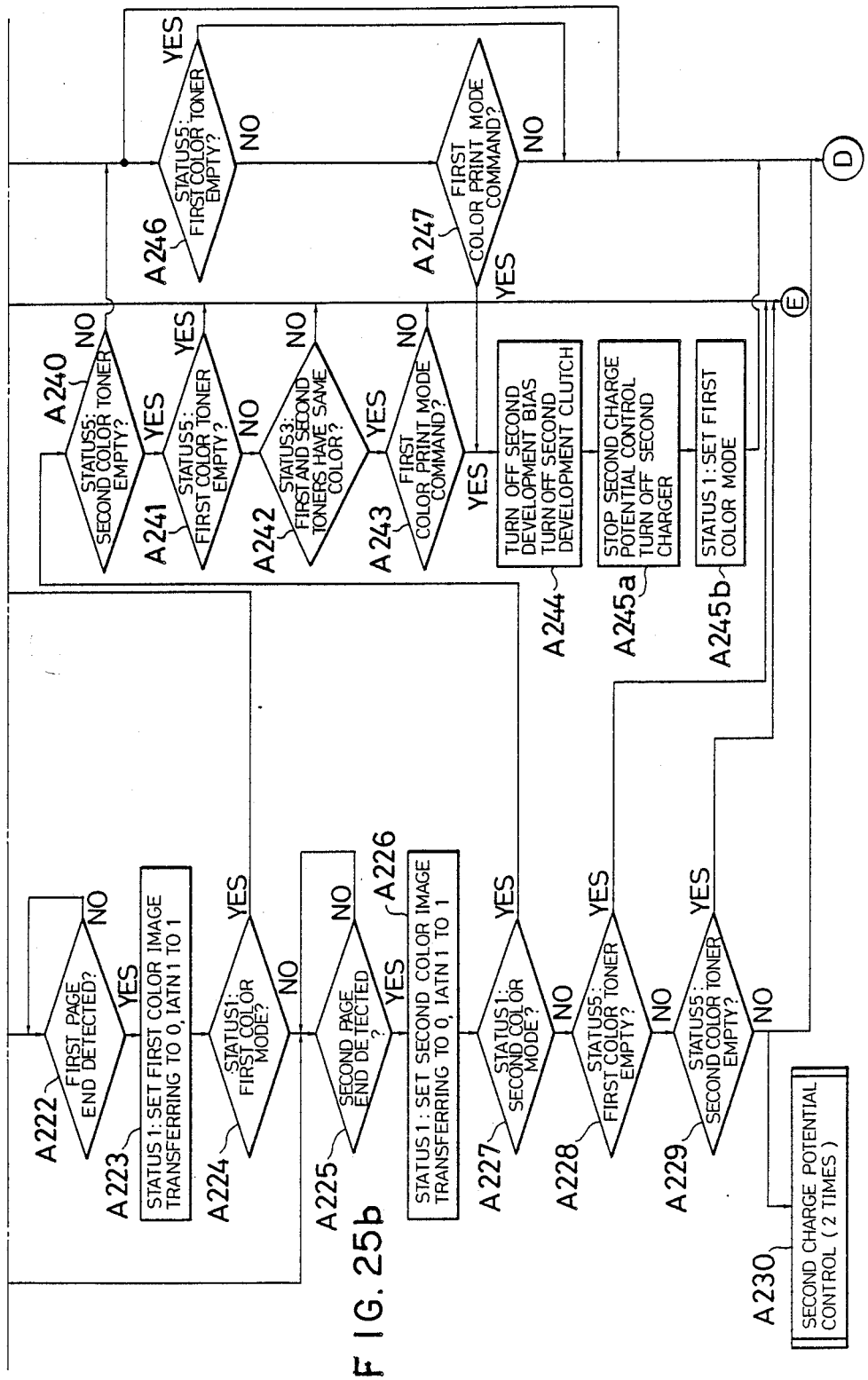

In step A210 shown in FIG. 25, the top and bottom counters start to count to start an image writing operation, and it is judged whether or not it is the second color mode according to the status 1 in step A210a. If it is not the second color mode in the step A210a, the first color image transferring of the status 1 is set in step A210b. Then, step 210c is done. If it is the second color mode, the step A210b is skipped to step 210c. In step 210c, it is judged whether or not it is the first color mode according to the status 1. If it is not the first color mode in the step A210c, the second color image transferring of the status 1 is set in step A210d, and it proceeds to step A211. If it is the first color mode, the step A210d is skipped to step A211.

Figure 31:
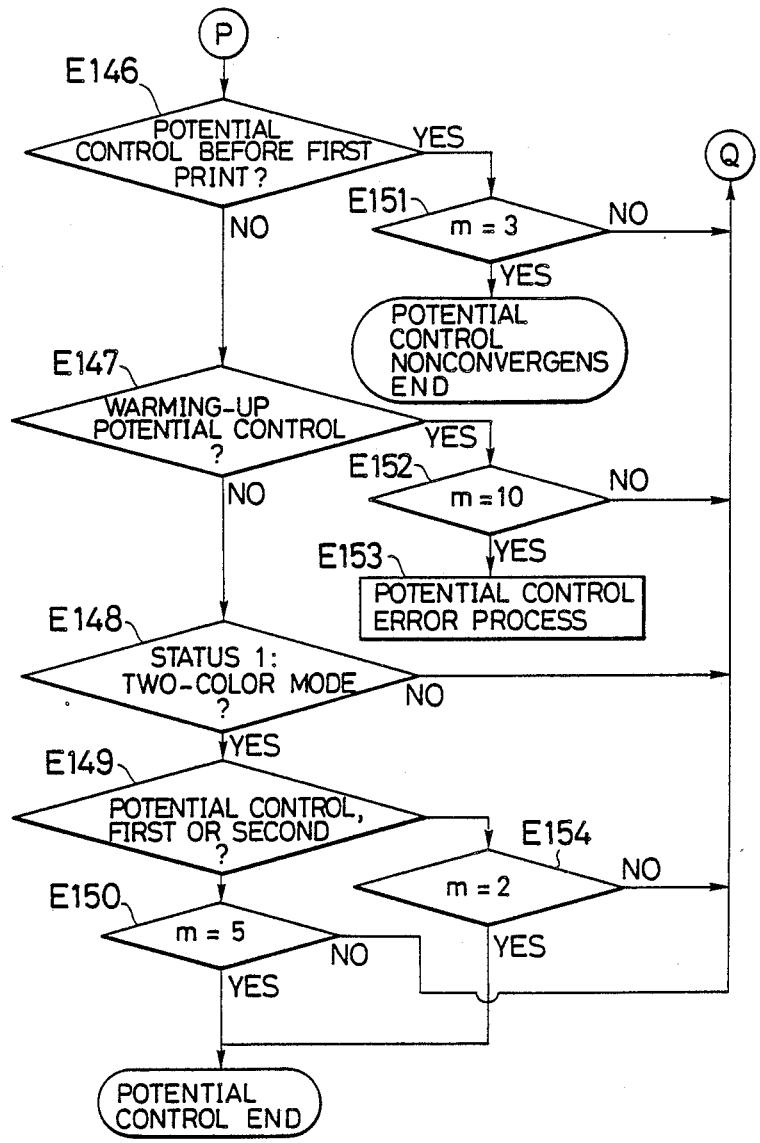

In step A211, it is judged whether or not it is the two-color print mode according to the status 1. If it is the first color mode or the second color mode in the step A211, it proceeds to step A213. If it is the two color mode in step A211, it proceeds to step A213, and a first charge potential control shown in FIG. 31 is repeated five times in step A212.

In step A213, it is again judged whether it is the second color mode according to the status 1. If it is not the second color mode in the step A213, a delay process of step A214 is done and it proceeds to step A216. If it is the second color mode in step A213, a delay process of step A215 is done and it proceeds to step A216.

In step A216, the resist motor is turned ON, and the total counter is turned ON. After a delay process in step A217, the total counter is turned OFF to proceed to a step A221. After a delay for the size of a paper in step A219, the resist motor is turned OFF in step A220.

A step A221 again confirms whether or not it is the second color mode. If it is not second color mode in the step A221, the first color image transferring of the status 1 is reset when the first page end is detected in step A222, and the IATN1 of status 1 is set in step A223 to proceed to a step A224. In step A224, it is judged whether or not it is the first color mode.

If the status 1 is the first color mode in step A224 and if the first color toner exists in the first development unit 203 in step A231, the print request IPREQ is turned ON in step A248 as shown in FIG. 20 even if the second color toner does not exist in the second development unit 206 in step A238.

In this case, if there is no first color toner in the first development unit 203 in step A231 and if there is no second color toner in the second development unit 206 in step A232, the print ready IPRDY is turned OFF in step A252 as shown in FIG. 20.

If there is no first color toner in the first development unit 203 in step A231 and if there is second color toner in the second development unit 206 in step A232 and if the first color is the same as the second color in step A233, the development bias 409 and clutch of the first development unit 203 are turned OFF in step A235 when a command specifying the second color print mode is given in step A234. Thus, the charge potential control of the first charger 201 is stopped, and the first charger 201 is turned OFF in step A236. Then, the second color mode of the status 1 is set in step A237, and the print request IPREQ is turned ON in step A248.

If there is the first color toner in the first development unit 203 in step A231 and if there is the second color toner in the second development unit 206 in step A238 and if a command specifying the second color print mode is given in step A239, the development bias 409 and clutch of the first development unit 203 are turned OFF in step A235. Thus, the charge potential control of the first charger 201 is stopped, and the first charger 201 is turned OFF in step A236. Then, the second color mode of status 1 is set in step A237, and the print request IPREQ is turned ON in step A248.

Figure 26B:
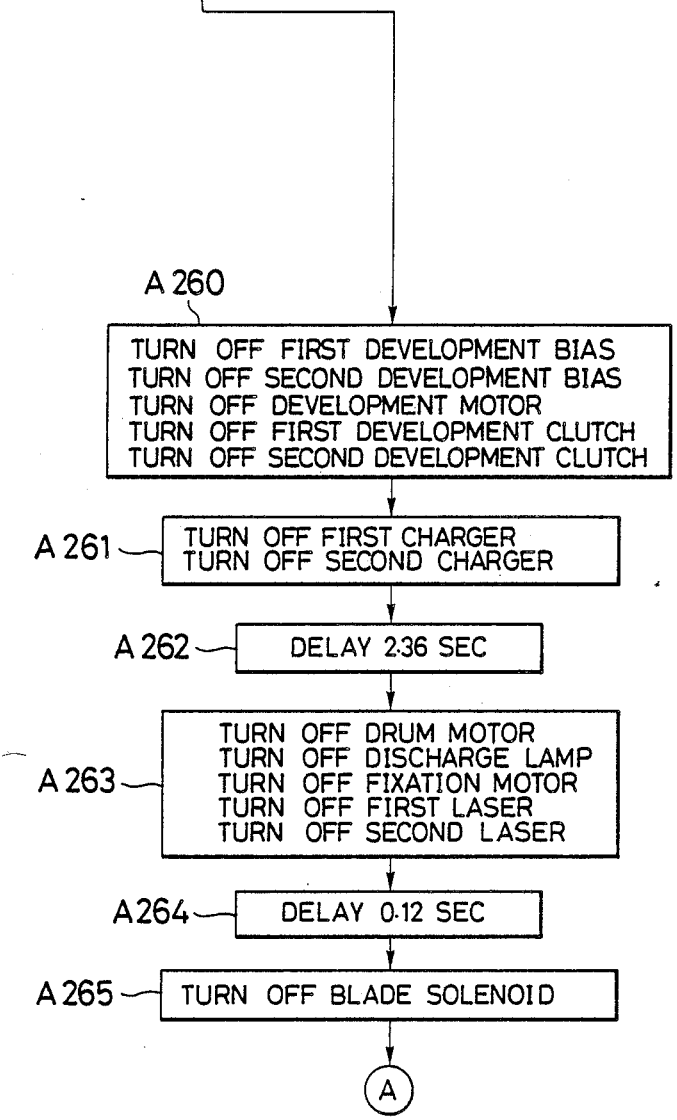

If step A221 judges that it is the second color mode and if step A224 judges that it is not the first color mode, the second color image transferring of the status 1 is reset when the second page end is detected in step A225. And the IATN1 of status 1 is set in step A226 to proceed to step A227. If the status 1 is the second color mode in step A227 and if there is no second color toner in the second development unit 206 in step A240 and if there is the first color toner in the first development unit 203 in step A241 and if the first color is the same as the second color in step A242 and if a command specifying the first color print mode is given in step A243, the development bias 409 and clutch of the second development unit 206 are turned OFF in step A244. Thus, the charge potential control of the second charger 204 is stopped, and the second charger 204 is turned OFF in step A245a. The first color mode of status 1 is set in step A245b, and the PRINT request and IATN1 of the status 1 are set in step A248 as shown in FIG. 26.

In step A227, if the status 1 is other than the second color mode, it is judged in step A228 whether or not there is the first color toner according to the status 5, and it is judged in step A229 whether or not there is the second color toner according to the status 5. If it is judged in steps A228 and A229 that there is no toner, the print ready IPRDY is turned OFF in step A252 as shown in FIG. 26.

Figure 29:
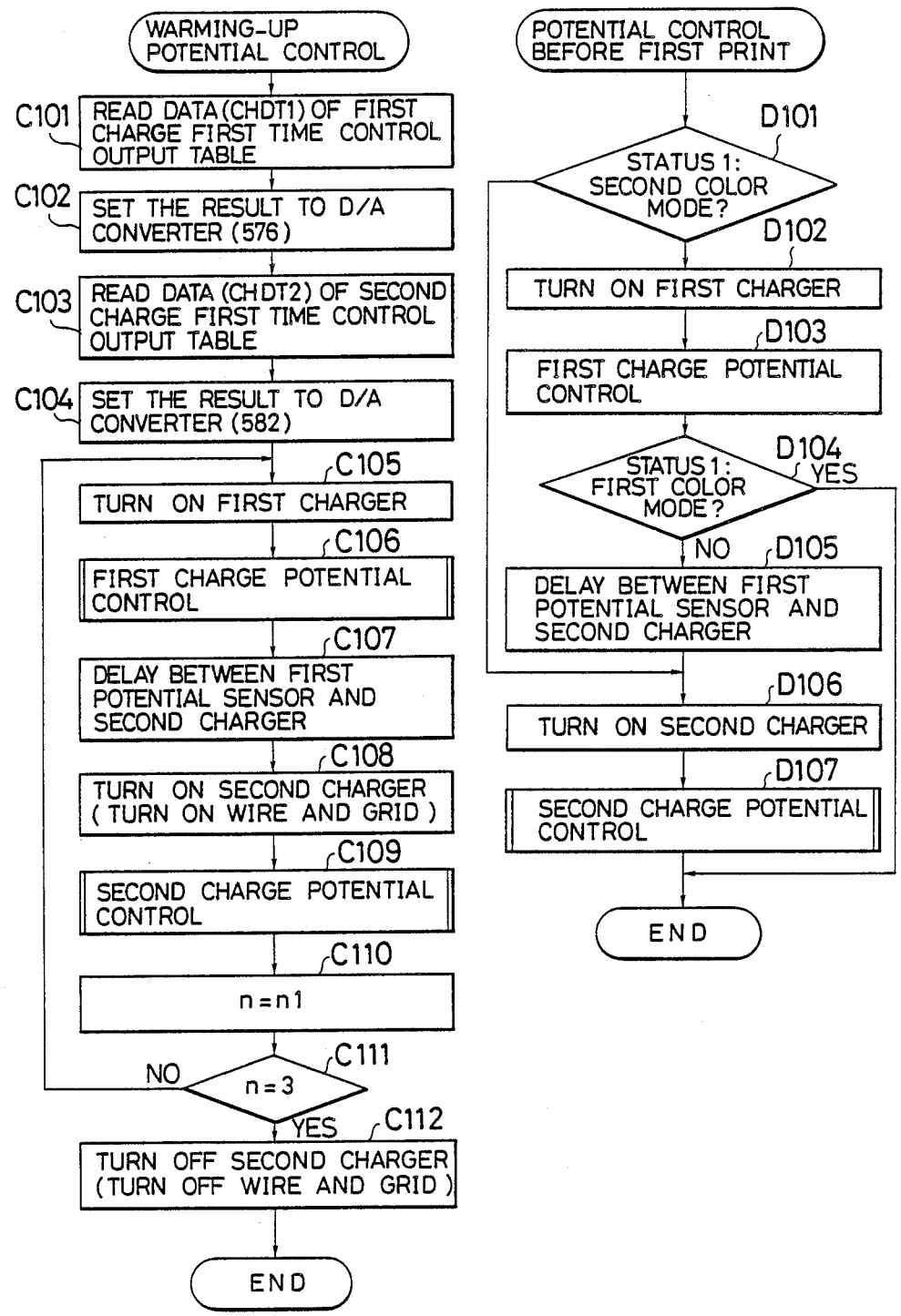
FIG. 29 is a flowchart showing subroutines of a warming up potential control and a potential control before first print, respectively.

If there are the first and second toners in steps A228 and A229, it proceeds to step A248, and the second charge potential control shown in FIG. 29 is carried out two times in step A230.

In the routine of steps A221 to A248, the steps A232 and A242 may be omitted to continue the developing operation by switching the development units even if the toner colors of the first development unit 203 and second development unit 206 are not the same.

In step A249 after the set process in step A248, it is judged whether or not a PRINT command exists. If there is the PRINT command in step A249, the PRINT request and IATN1 of the status 1 are set in step A251, and it is judged in step A266 whether or not the print mod has been changed.

If the print mode has been changed in step A266, it returns to step A177. Between steps A177 to A194, the status 1 is monitored to enable the first development unit 203 or the second development unit 206.

If the print mode has not been changed in step A266, it returns to step A194 to omit the processes of steps A177 to A193.

For any print mode, the processes are repeated excluding steps A142 to A174 so that the two-color LBP 199 is not stopped, and the recording operation is continuously done.

If step A249 judges that there is no PRINT command and, in step A250, if five seconds have not elapsed after the PRINT request has been set, the judgments of steps A249 and A250 are repeated. If five seconds have elapsed in step A250 after the PRINT request has been set, stop processes of steps A253 to A265 are carried out. Then, it proceeds to step A142 to wait for a command from the host system 500.

If the print ready IPRDY is OFF in step A252, a print operation is not needed. Therefore, the stopping processes are done in steps A253 to A265, and it proceeds to step A142 to wait for a command from the host system 500.

Figure 27A:
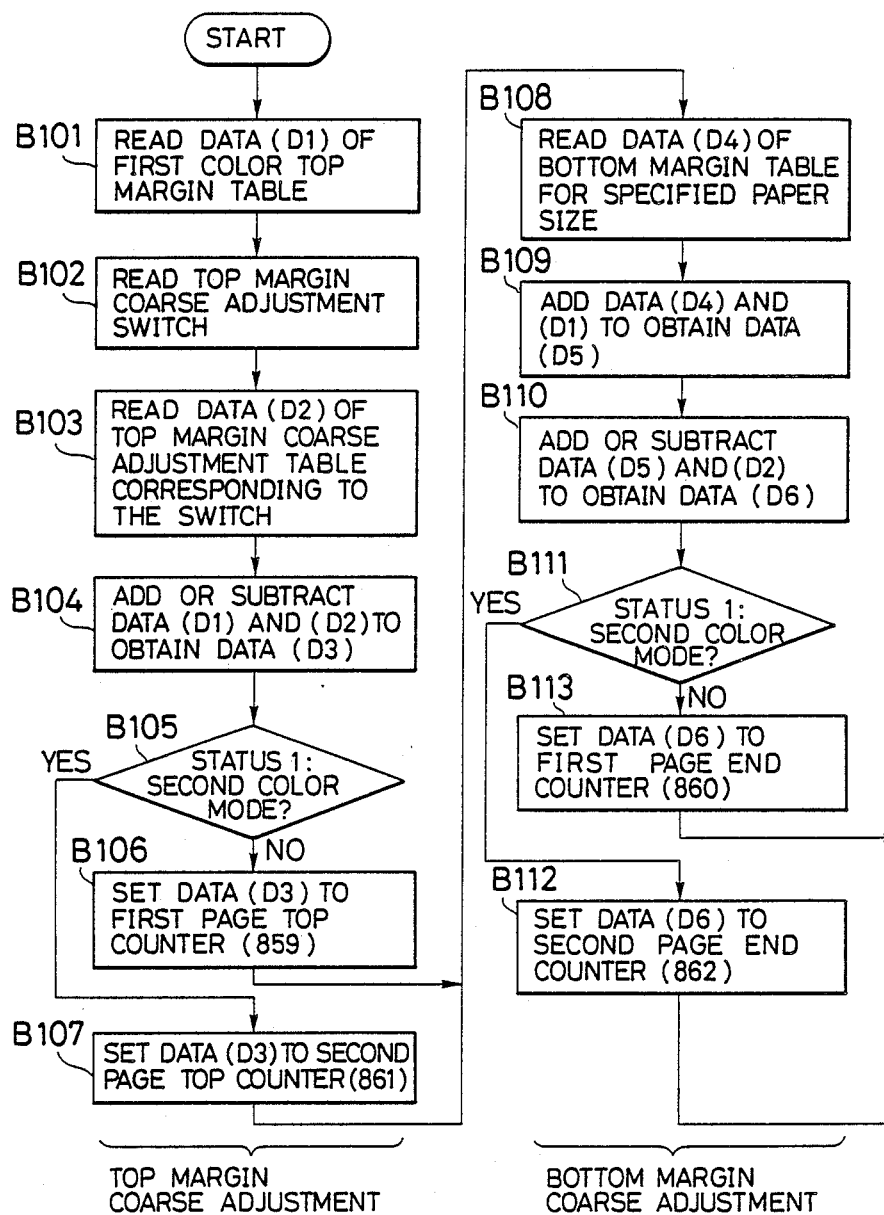
Figure 27B:
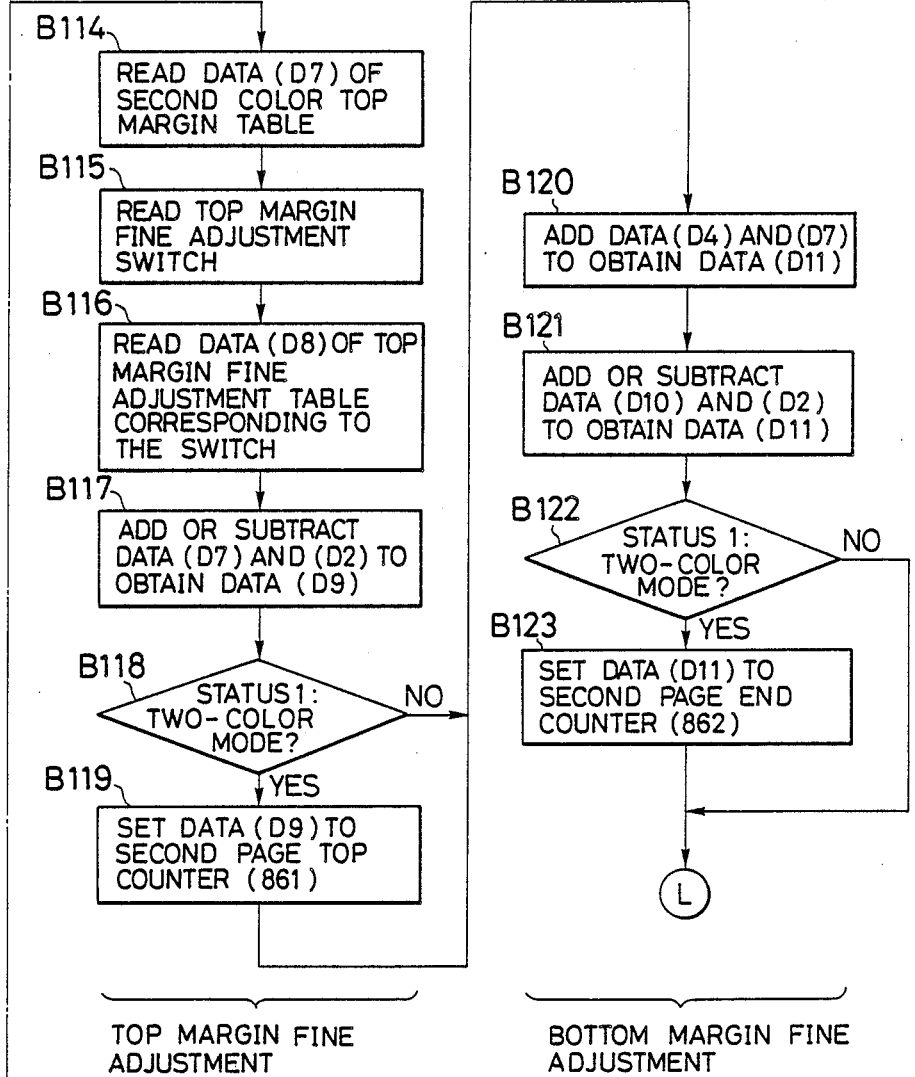

FIGS. 27 and 29 are flowcharts showing the process of the step A204 shown in FIG. 24.

Figure 28:
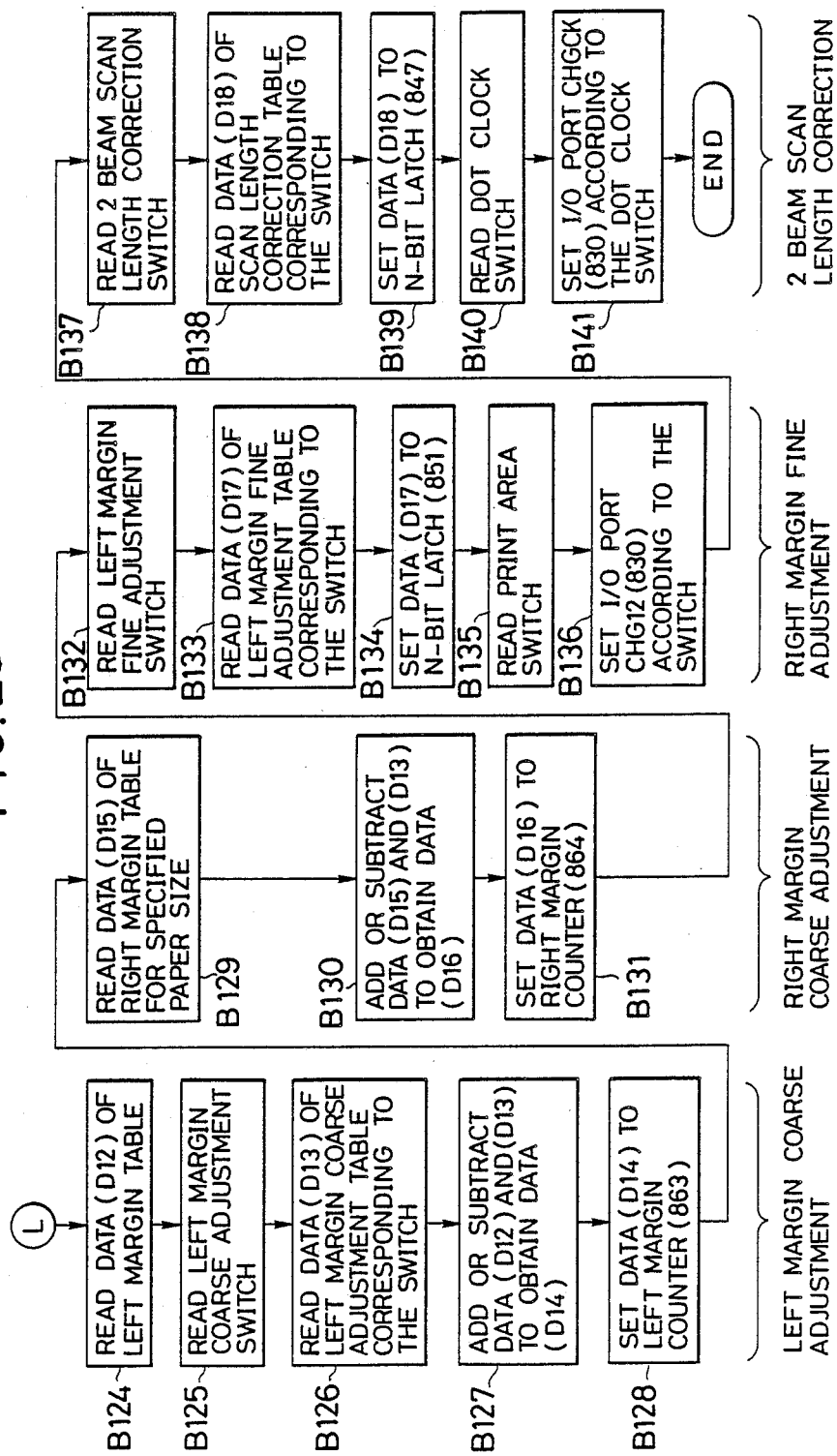

In subroutines shown in FIGS. 27 and 28, there are a process of coarsely adjusting a top margin in steps B101 to B107, a process of finely adjusting the top margin in steps B114 to B119, a process of finely adjusting a bottom margin in steps B120 to B123, a process of coarsely adjusting a left margin in steps B124 to B128, a process of coarsely adjusting a right margin in steps B129 to B131, a process of finely adjusting the right margin in steps B132 to B136, and a process of correcting a two-beam scan length in steps B137 to B141.

In the process of coarsely adjusting the top margin in steps B101 to B107, a data D1 of a first color top margin table is read in step B101, and a top margin coarse adjusting switch is read in step B102. A data D2 of a top margin coarse adjustment table corresponding to the switch is read in step B103.

In step B104, a value of the data D1 of the first top margin table and a value of the data D2 of the top margin coarse adjustment table are added to each other or subtracted one from another to obtain a data D3.

If the status 1 is not the two-color mode in step B105, the data D3 is set to the first page top counter 859 in step B106 to proceed to the routine of steps B108 to B113 for coarsely adjusting the bottom margin. If the status 1 is the two-color mode in step B105, the data D3 is set to the second page top counter 861 in step B107 to proceed to the routine of steps B108 to B113.

In step B108, a data D4 of a bottom margin table for a specified paper size is read. In step B109, the data D4 of the bottom margin table is added to the data D1 of the first color top margin table to obtain a data D6.

If the status 1 is not the second color mode in step B111, the data D6 is set to the first page end counter 860 in step B113 to proceed to the routine of steps B114 to B119 for finely adjusting the top margin. If the status 1 is the second color mode in step B111, the data D6 is set to the second page end counter 862 in step B112 to proceed to the routine of steps B114 to B119.

In step B114, a data D7 of a second color top margin table is read. In step B115, a top margin fine adjustment switch is read. In step B116, a data D8 of a top margin fine adjustment table corresponding to the switch is read.

In step B117, the data D7 of the second top margin table and the data D2 of the margin coarse adjustment table are added to each other or subtracted one from another to obtain a data D9.

If the status 1 is not the two-color mode in step B118, it proceeds to the routine of steps B120 to B123 for finely adjusting the bottom margin. If the status 1 is the two-color mode in step B118, the data D9 is set to the second page top counter 861 in step B119 and then proceeds to the routine of steps B120 to B123.

In step B120, the data D4 of the bottom margin table is added to the data D7 of the top margin table to obtain a data D10. In step B121, the data D10 and D8 are added to each other or subtracted one from another to obtain a data D11.

If the status 1 is not the two-color mode in step B122, it proceeds to a routine of steps B124 to B128 for coarsely adjusting the left margin. If the status 1 is the two-color mode in step B122, the data D11 is set to the second page end counter in step B123, and then proceeds to the routine of steps B124 to B128.

In step B124, a data D12 of a left margin table is read, and, in step B125, a left margin coarse adjustment switch is read. In step B126, a data D13 of a left margin coarse adjustment table corresponding to the switch is read.

In step B127, the data D12 of the left margin table and the data D13 of the margin coarse adjustment table are added to each other or subtracted one from another to obtain a data D14.

In step B128, the data D14 is set to the left margin counter 863, and it proceeds to the routine of steps B129 to B131 for coarsely adjusting the right margin.

In step B129, a data D15 of a right margin table for the specified paper size is read, and, in step B130, the data D15 of the right margin table and the data D13 of the left margin coarse adjustment table are added to each other or subtracted one from another to obtain a data D16.

In step B131, the data D16 is set to the right margin counter 864, and it proceeds to the routine of steps B132 to B136 for finely adjusting the right margin.

In step B132, a left margin fine adjustment switch is read, and, in step B133, a data D17 of a left margin fine adjustment table corresponding to the switch is read. In step B134, the data D17 is set to the n-bit latch 851.

In step B135, a print area switch is read. In step B136, the I/O port 830 is set according to the print area switch, and it proceeds to the routine of steps B137 to B141 for correcting the two-beam scan length.

In step B137, a two-beam scan length correction switch is read. In step B138, a data D18 of a scan length correction table corresponding to the switch is read. The data D18 is set to the n-bit latch 847 in step B139.

In step B140, a dot clock switch is read, and the I/O port 830 is set according to the dot clock switch in step B141, thus completing the step A204 of FIG. 24.

FIG. 29 is a flowchart showing the warming-up potential control and the potential control before first print.

In the warming-up potential control, a first charge first time control output CHDT1 is read out of a table in step C101, and the read value is set to the D/A converter 576 in step C102. Similarly, a second charge first time control output value CHDT2 is read out of a table in step C103, and the read value is set to the D/A converter 582 in step C104.

Figure 30B:
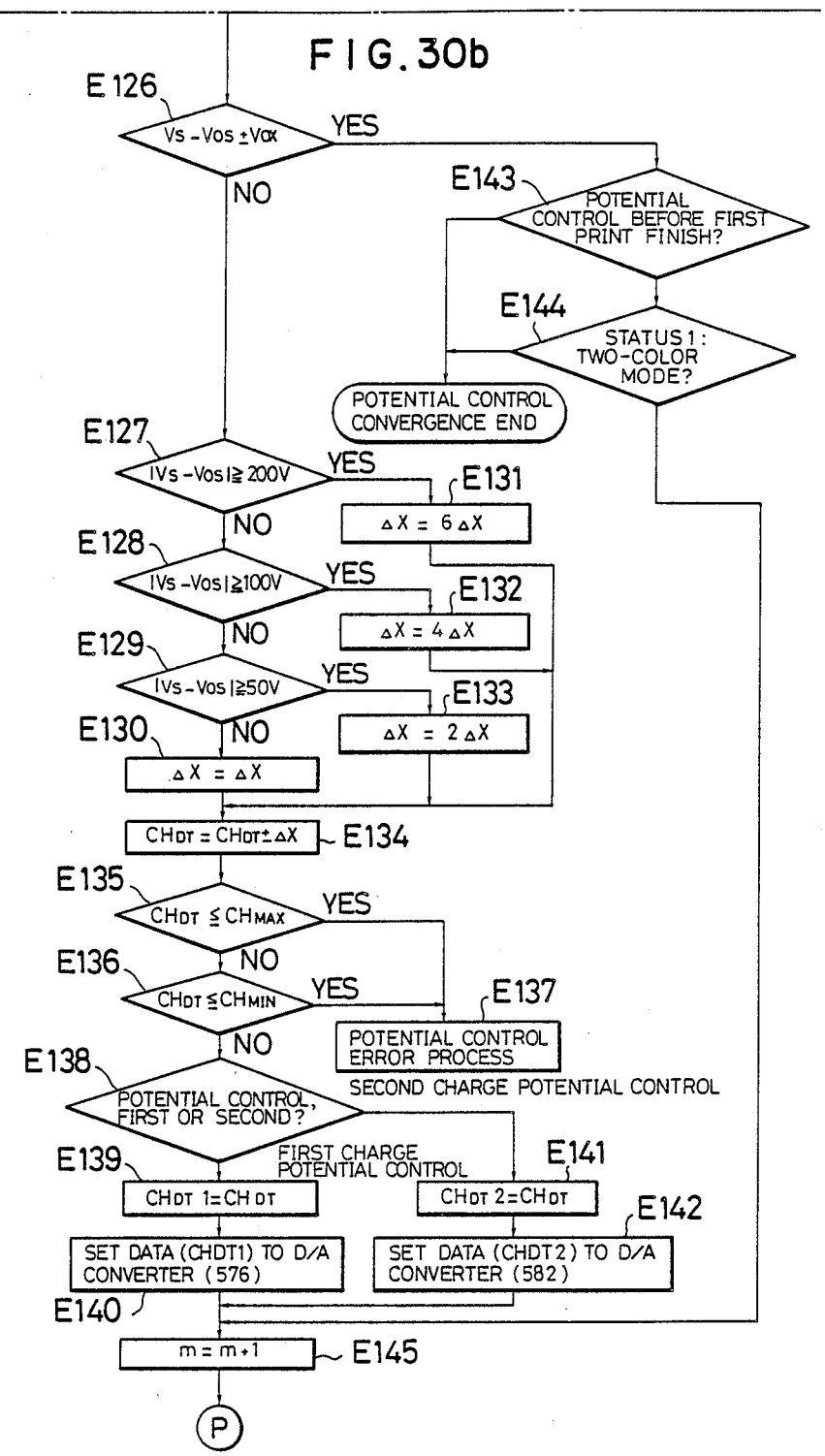

In step C105, the first charger 201 is turned ON, and the first charge potential control is executed as shown in FIGS. 30 and 31 in step C106. After a delay process in step C107, the second charge 204 is turned ON in step C108. Then, the second charge potential control is executed as shown in FIGS. 30 and 31 in step C109.

The number "n" of potential control times is incremented in step C110. Steps C105 to C111 are repeated until the number "n" reaches three. Then, the first charger 201 and second charger 204 are turned OFF in step C112 to complete the warming-up potential control.

According to the potential control before first print, if the status 1 is not the second color mode in step D101, the first charger 201 is turned ON in step D102, and the first charge potential control is executed as shown in FIGS. 30 and 31 in step D103. If it is the first color mode in step D104, the potential control before first print is completed.

If it is the second color mode in step D104, a delay process is executed in step D105, and the second charger 204 is turned ON. The, the second charge potential control is executed as shown in FIGS. 30 and 31 in step D107 to complete the potential control before first print.

If the status 1 is the second color mode in step D101, the second charger 204 is turned ON in step D106, and the second charge potential control is executed as shown in FIGS. 30 and 31 in step D107 to complete the potential control before first print.

FIGS. 30 and 31 are flowcharts showing the details of the charge potential control process.

Firstly, the A/D converter 593 selects the drum temperature detector 570 in step E101 to measure a temperature of the photoconductor drum 200 in step E102. The first or the second charge potential control is selected in step E103. According to the data tables stored in the ROM 503, steps E104 to E109 are executed if the first charge potential control is selected, and steps E113 to E118 are executed if the second charge potential control is selected.

In steps E110 and E119, to meet an actual temperature of the photoconductor drum 200, a first target surface potential data VOS1 and a second target surface potential data VOS2 are corrected to obtain correction data VOS1' and VOS2', respectively.

In steps E111 and E120, the values obtained in steps E104 to E110 and the values obtained in steps E113 to E119 are subjected to operation processes to store the values in common registers, respectively.

In steps E112 and E131, the A/D converter 593 selects the first potential sensor 202 and the second potential sensor 205.

With respect to the first and second charge potential controls, processes following the step E122 are commonly executed.

A delay process is executed in step E122 for time intervals corresponding to distances between the first and second chargers 201 and 204 and the first and second surface potential sensors 202 and 205. Then, the first and second surface sensors 202 and 205 measure a surface potential Vs in step E123.

After that, processes are executed according to the data shown in steps E111 and E120.

In step E124, a self-diagnosis is executed according to the following operation formula:

$$Vs \geq Vos + Vomax.$$

If the result is YES in step E124, a potential control error process is executed in step E125. If the result is NO in step E124, it proceeds to step E126.

In step E126, it is judged whether or not the read value is in a control range of an error table with respect to the target value according to the following operation formula:

$$Vs = Vos \pm Voz.$$

If the result is NO in step E126, a shift (200 V, 100 V, or 50 V) with respect to the target value is checked in steps E127, E128 and E129 to set a control amount equal to, or double, or four times, or six times $\Delta X1$ or $\Delta X2$ in steps E130, E132 and E133.

Then, a charge output is set in step E134, and it is judged whether or not the charge output is larger than a maximum value in step E135. The, in step E136, it is judged whether or not the charge output is smaller than a minimum value. If the result in step E135 is YES or if the result of step E136 is YES, a potential control error process is executed in step E137.

If the charge output is within an allowable range in steps E135 and E136, it is judged in step E138 which of the first and second chargers 201 and 204 is potential-controlled.

If the result of the judgment is the first charger 201, "CHDT1=CHDT" is set in step E139, and the data CHDT1 is set to the D/A converter 576. Then, step E145 is done.

If the result of the judgment is the second charger 204, "CHDT2=CHDT" is set in step E141, and the data CHDT2 is set to the D/A converter 582. The, step E145 is done.

In step E145, the number of charge potential controls is incremented to execute a routine following the step E146 of FIG. 25.

If it is the potential control before first print in step E146, nonconvergence due to the potential control is ended when the number "m" of potential controls is three in step E151. If the number is two or less, it returns to step E122.

If it is the warming-up potential control in step E147 and if the number "m" of potential controls is ten in step E151, a potential control error process is executed in step E153. If the number is nine or less, it returns to step E122.

If the status 1 is not the two-color mode in step E148, it returns to step E122. If the status 1 is the two-color mode in step E148, it is determined which of the first and second chargers 201 and 204 is subjected to the potential control. If it is the first charger 201, the potential control is executed five times (YES in step E150) to finish the potential control. If it is the second charger 204, the potential control is executed two times (YES in step E154) to finish the potential control.

As described with reference to FIGS. 4 to 15 and FIGS. 21 to 25, according to the embodiment of the present invention, the attention signal IATN that changes in response to changes in urgent statuses such as the PRINT request status, VSYNC request status, first color image transferring status and second color image transferring status is transmitted from the two-color LBP 199 to the host system 500 through a common exclusive line. The host system 500 always ministors the urgent statuses through the attention signal IATN.

Therefore, according to the embodiment of the present invention, additional interface signal lines are not needed, a load increase on the host system avoided, and the urgent statuses of the printer easily checked by the host side.

Although the embodiment has been explained in connection with the laser beam printer, the present invention is also applicable for thermal printers, wire dot-matrix printers, ink-jet printers, etc.

As describe in the above, the image forming apparatus of the present invention uses a common exclusive line to indicate changes in the urgent statuses of a printing side for a host side. Due to this arrangement, additional interface signal lines are not needed, and a load increase on the host side is avoided. Further, the urgent statuses of the printing side can easily be checked by the host side.

According to another embodiment of the present invention explained with reference to FIGS. 2, 4 and 15, a change of recording density in the print data write control portion 513 of the two-color LBP 199 causes a proportional change in the frequency of a video clock signal (IVCLK1, IVCLK2). The interface circuit 519 sends the video clock signal (IVCLK1, IVCLK2) to the host system 500 to request the host system 500 to send one dot of print data. According to the video clock signal, the host system 500 transmits a video data signal (IVDAT1, IVDAT2) of dot image to the interface circuit 519.

As a result, it is not necessary in the host system 500 to carry out a special changing process in sending the video data signal (IVDAT1, IVDAT2) to the two-color LBP 199 at a transmission timing corresponding to the recording density of the two-color LBP 199.

Although the above-mentioned embodiment has been explained in connection with the laser printer, the embodiment is also applicable for thermal printers, wire dot-matrix printers, ink-jet printers, etc.

As explained in the above, according to the image forming apparatus of the present invention, a printing side transmits a video clock signal having a frequency that changes in response to a change in a recording density of the printing side. According to the video clock signal, the host system transmits a video data signal to the printing side. Therefore, the host side is not needed to execute a special changing process even if the recording density of the printing side changes.

Various modifications will become possible for those skilled in the art after receiving the teachings of the present disclosure without departing from the scope thereof.

What is claimed is:

1. A system for forming images comprising:
    printer means for printing an image information, said printer means outputting a status signal indicating a state of said printer;
    host computer means for controlling said printer in accordance with said status signal; and
    interface means for providing a connection between said printer means and said host computer means, said interface means including status lines for transmitting said status signal to said host computer means and an attention line between said printer and said computer system, said attention line being indicative of at least one transition of said status signal from said printer.

2. The system as claimed in claim 1, wherein the attention line indicates a change in said status signal to a status signal representing an urgent status of said printer means.

3. A system for forming images comprising:
    printer means for printing images in synchronism with clock signals selectively at different frequencies, said frequencies corresponding to different dot densities, respectively; and
    host computer means for supplying said printer with data of visual information to be printed in synchronism with said clock signals.

4. The system as claimed in claim 1, wherein the status lines selectively transmit command data from said host computer to said printer means.

5. The image forming apparatus as claimed in claim 3, wherein said printer means has a recording density switching means for selecting one of the different recording densities.

* * * * *